United States Patent
Inoue et al.

(10) Patent No.: US 7,813,038 B2
(45) Date of Patent: *Oct. 12, 2010

(54) LIGHT-SCATTERING FILM, POLARIZING PLATE AND IMAGE DISPLAY

(75) Inventors: Katsumi Inoue, Minami-Ashigara (JP); Jun Watanabe, Minami-Ashigara (JP); Tetsuya Asakura, Minami-Ashigara (JP); Daiki Wakizaka, Minami-Ashigara (JP); Hideyasu Ishibashi, Ashigarakami-gun (JP); Isao Ikuhara, Minami-Ashigara (JP)

(73) Assignee: Fujifilm Corporation, Minato-Ku, Tokyo (JP)

( * ) Notice: Subject to any disclaimer, the term of this patent is extended or adjusted under 35 U.S.C. 154(b) by 844 days.

This patent is subject to a terminal disclaimer.

(21) Appl. No.: 11/727,581

(22) Filed: Mar. 27, 2007

(65) Prior Publication Data

US 2007/0229804 A1    Oct. 4, 2007

(30) Foreign Application Priority Data

Mar. 28, 2006    (JP)    ............................. 2006-089032

(51) Int. Cl.
  *G02B 5/30*    (2006.01)
(52) U.S. Cl. ...................................... 359/485; 359/599
(58) Field of Classification Search ........................ None
  See application file for complete search history.

(56) References Cited

U.S. PATENT DOCUMENTS

| 7,144,608 | B2 | 12/2006 | Pakshto et al. |
| 7,176,995 | B2 * | 2/2007 | Jang et al. ................... 349/113 |
| 7,201,510 | B2 | 4/2007 | Yamashita et al. |
| 7,327,413 | B2 | 2/2008 | Hwang et al. |
| 7,502,088 | B2 | 3/2009 | Suzuki et al. |
| 2005/0162592 | A1 | 7/2005 | Hirakata et al. |
| 2005/0195348 | A1 | 9/2005 | Saitoh et al. |
| 2007/0229804 | A1 | 10/2007 | Inoue et al. |
| 2008/0259246 | A1 * | 10/2008 | Watanabe et al. ............. 349/64 |
| 2008/0291371 | A1 | 11/2008 | Sato |
| 2009/0079910 | A1 | 3/2009 | Ito et al. |

FOREIGN PATENT DOCUMENTS

| JP | 2003-270409 A | 9/2003 |
| JP | 3507719 B2 | 12/2003 |
| JP | 3507719 B2 | 3/2004 |

OTHER PUBLICATIONS

Office Action dated Oct. 23, 2009 issued in U.S. Appl. No. 12/100,226.

* cited by examiner

*Primary Examiner*—Lee Fineman
(74) *Attorney, Agent, or Firm*—Buchanan Ingersoll & Rooney PC

(57)    ABSTRACT

A light-scattering film is provided and includes a transparent support having thereon at least a light-scattering layer. When substantially parallel light is incident on a surface of the film at an incident angle of 5°, the reflectance for an angle θ in the light-receiving part measured in a plane containing the film normal line and the incident direction is R(θ), the value obtained by normalizing R(θ) by the reflectance of regular reflection is Rrel(θ), and the value calculated from the maximum variation |dRrel(θ)/dθ|max for the angle θ is a scattering coefficient A (formula 1), the reflection coefficient B (formula 2) calculated from the scattering coefficient A and the 5° specular reflectance Rs is from 2.0 to 5.0.

Scattering coefficient $A=1/(10\times|dRrel(\theta)/d\theta|max)$    (Formula 1)

Reflection coefficient $B=2.2\times\log 10(Rs)-7.5\times\log 10(A)+5.9$    (Formula 2)

22 Claims, 9 Drawing Sheets

LIGHT-SCATTERING FILM, POLARIZING PLATE AND IMAGE DISPLAY

BACKGROUND OF THE INVENTION

1. Field of the Invention

The present invention relates to a light-scattering film, a polarizing plate and an image display.

2. Description of Related Art

In an image display such as CRT, plasma display panel (PDP), electroluminescent display (ELD), field emission display (FED), surface-conduction electron-emitter display (SED) and liquid crystal display (LCD), the display performance in a bright-room environment can be enhanced by preventing reflection of an image due to reflection of outside light.

As for the method of preventing reflection of an image in the display surface of an image display, there are disclosed (1) a method where performance of making unclear the reflected image by surface scattering (antiglare property) is imparted to let the reflected image be less recognizable, and (2) a method where performance of reducing the amount of reflected light by providing a low refractive index layer on the outermost surface of the display surface (antireflection property) is imparted to let the reflected image be less recognizable (see, Japanese Patent No. 3507719 and JP-A-2003-270409).

In recent years, the market for an application using a display having a large screen and allowing a user to watch a high-quality moving picture from a relatively distant position as represented by a liquid crystal television or the like is abruptly expanding. In such an application, the display is required to display a clearer image. When the antiglare property is strong, the outline of a thing, a fluorescent lamp, a human being or the like placed in the periphery of the display and reflected on the display surface is blurred and the image projected on the display can be easily recognized (reflection is decreased). However, the light brownish looking of the display surface is strengthened and the contrast in a bright room (bright-room contrast) may decrease.

On the other hand, in the case of using a clear surface not imparted with antiglare property, a low refractive index layer having a low refractive index at the level enabling satisfactory reduction of reflection only by antireflection utilizing the thin-film interference of one low refractive index layer is not found at present and in the case of using thin-film interference of two or more layers differing in the refractive index, the color tint may be intensified or the cost may arise.

Accordingly, a slight-scattering film reduced in the reflection and at the same time, enhanced in the bright-room contrast is being demanded. Also, a light-scattering film best suitable for an image display with a large screen, reduced in the reflection and at the same time, enhanced in the bright-room contrast is being demanded.

SUMMARY OF THE INVENTION

One aspect of an illustrative, non-limiting embodiment of the invention is to provide a light-scattering film capable of achieving both reduction of reflection and bright-room contrast at a high level. Another aspect is to provide a polarizing plate and an image display, each using the light-scattering film.

As a result of intensive studies, the present inventors have accomplished the present invention by constructing the following constitutions. That is, aspects of the present invention is as follows.

(1) A light-scattering film comprising: a transparent support; and a light-scattering layer, wherein when substantially parallel light is incident on a surface of the light-scattering film at an incident angle of 5°, Reflection coefficient B represented by formula 2 is from 2.0 to 5.0:

Reflection coefficient $B = 2.2 \times \log 10(Rs) - 7.5 \times \log 10(A) + 5.9$      Formula 2:

wherein Rs is a 5° specular reflectance, and A is Scattering coefficient A represented by formula 1:

Scattering coefficient $A = 1/(10 \times |dR\text{rel}(\theta)/d\theta|\max)$      Formula 1:

wherein $R(\theta)$ is a reflectance at an angle $\theta$ with respect to a normal line to the light-scattering film and in a plane defined the normal line and an incident direction of the substantially parallel incident light, and $R\text{rel}(\theta)$ is a value obtained by normalizing $R(\theta)$ by the reflectance of regular reflection.

(2) The light-scattering film as described in (1), wherein the Reflection coefficient B is from 3.5 to 4.5.

(3) The light-scattering film as described in (1) or (2), wherein the Scattering coefficient A is from 1.0 to 3.0.

(4) The light-scattering film as described in any one of (1) to (3), wherein the 5° specular reflectance Rs is from 0.1 to 2.0%.

(5) The light-scattering film as described in any one of (1) to (4), having an integrated reflectance of 0.2 to 2.0% with respect to the substantially parallel light incident on the light scattering film at the incident angle of 5°.

(6) The light-scattering film as described in (5), wherein a difference between the integrated reflectance and the 5° specular reflectance Rs is from 0.1 to 1.0%.

(7) A light-scattering film comprising: a transparent support; and a light-scattering layer, wherein when substantially parallel light is incident on a surface of the light-scattering film at an incident angle of 5°, Reflection coefficient B represented by formula 2 is from 2.0 to 5.0:

Reflection coefficient $B = 2.2 \times \log 10(Rs) - 7.5 \times \log 10(A) + 5.9$      Formula 2:

wherein Rs is a 5° specular reflectance, and A is Scattering coefficient A represented by formula 1:

Scattering coefficient $A = 1/(10 \times |dR\text{rel}(\theta)/d\theta|\max)$      Formula 1:

wherein $R(\theta)$ is a reflectance at an angle $\theta$ with respect to a normal line to the light-scattering film and in a plane defined the normal line and an incident direction of the substantially parallel light, and $R\text{rel}(\theta)$ is a value obtained by normalizing $R(\theta)$ by the reflectance of regular reflection, and wherein the 5° specular reflectance Rs is from 0.1 to 2.0%, an integrated reflectance with respect to the substantially parallel light is from 0.2 to 2.0%, and a difference between the integrated reflectance and the 5° specular reflectance Rs is from 0.1 to 1.0%.

(8) The light-scattering film as described in any one of (1) to (7), wherein a* and b* values in CIE1976 L*a*b* color space of regularly reflected light for the substantially parallel light incident on the light scattering film at the incident angle of 5°, the substantially parallel light being from a CIE standard illuminant D65 and having a wavelength of 380 to 780 nm, are $-7 \leq a^* \leq 7$ and $-10 \leq b^* \leq 10$, respectively.

(9) The light-scattering film as described in any one of (1) to (8), wherein the light-scattering layer comprises light-transmitting fine particles, and a ratio of an average film thickness of the light-scattering layer to an average particle diameter of the light-transmitting fine particles is from 1.5 to 2.5.

(10) The light-scattering film as described in any one of (1) to (9), wherein the light-scattering layer comprises light-transmitting fine particles and a plurality of aggregations comprising the light-transmitting fine particles, the aggregations each having a three-dimensional steric structure and a surface irregularity shape.

(11) The light-scattering film as described in any one of (1) to (10), wherein the light-scattering layer comprises at least two layers, and layer(s) other than a top layer (i.e., a front side top layer or an outermost layer) of the at least two layers comprises light-transmitting fine particles.

(12) The light-scattering film as described in any one of (1) to (11), having a centerline average roughness Ra of 0.05 to 0.15 μm.

(13) The light-scattering film as described in any one of (1) to (12), having an average pea-to-trough distance Sm of 50 to 150 μm.

(14) The light-scattering film as described in any one of (1) to (13), having an average tilt angle of surface irregularities of 0.2 to 2.0°.

(15) The light-scattering film as described in any one of (1) to (14), further comprising a low refractive index layer having a refractive index lower than that of the transparent support, the light-scattering film having the transparent support, the light-scattering layer and the low refractive index layer in this order.

(16) The light-scattering film as described in (15), wherein the refractive index of the low refractive index layer is from 1.20 to 1.40.

(17) The light-scattering film as described in (15) or (16), wherein the low refractive index layer is formed by curing a curable composition comprising a fluorine-containing compound and inorganic fine particles having a refractive index of 1.40 or less, and the low refractive index layer has the inorganic fine particles in an amount of 30 to 55 mass % based on the total solid content concentration of the low refractive index layer.

(18) The light-scattering film as described in any one of (15) to (17), wherein the 5° specular reflectance Rs is from 0.1 to 1.5%, an integrated reflectance of the light-scattering film with respect to the substantially parallel light incident on the light scattering film at the incident angle of 5° is from 0.2 to 2.0%, a difference between the integrated reflectance and the 5° specular reflectance Rs is from 0.25 to 1.0%, and the refractive index of the low refractive index layer is from 1.20 to 1.40.

(19) The light-scattering film as described in (18), having a centerline average roughness Ra of 0.05 to 0.15 μm, an average peak-to-trough distance Sm of 50 to 150 μm, and an average tilt angle of surface irregularities of 0.2 to 2.0°.

(20) The light-scattering film as described in any one of (1) to (19), comprising: the transparent support; a light-scattering layer; and a low refractive index layer having a refractive index lower than that of the transparent support, in this order, wherein the light-scattering layer comprises light-transmitting fine particles, and a ratio of an average film thickness of the light-scattering layer to an average particle diameter of the light-transmitting fine particles is from 1.5 to 2.5.

(21) A polarizing plate comprising: a polarizer; and a pair of protective films, the polarizer being between the pair of protective films, wherein at least one of the pair of protective films is a light-scattering film described in any one of (1) to (20).

(22) An image display comprising a light-scattering film described in any one of (1) to (20) or a polarizing plate described in (21).

Figure 1A:
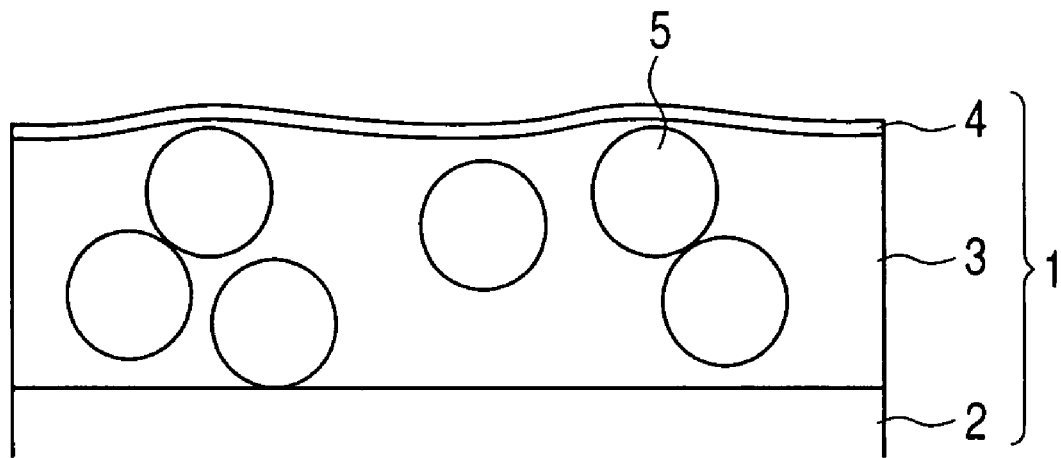
FIGS. 1A and 1B are cross-sectional views schematically showing a light-scattering film according to one exemplary embodiment of the present invention.

Reference numerals and symbols are identified as the followings:

1 Light-scattering film
2 Transparent support
3 Light-scattering layer
4 Low refractive index layer
5 Light-transmitting particle
6 Overcoat layer
10 Coater
11 Backup roll
W web
13 Slot die
14 Coating solution
14a Bead
14b Coating film
15 Pocket
16 Slot
16a Slot opening
17 End lip
18 Land
18a Upstream lip land
18b Downstream lip land
$I_{UP}$ Land length of upstream lip land 18a
$I_{LO}$ Land length of downstream lip land 18b
LO Overbite length (difference between the distance from the downstream lip land 18b to the web W and the distance from the upstream lip land 18a to the web)
$G_L$ Gap between the end lip 17 and the web W (gap between the downstream lip land 18b and the web W)
30 Conventional slot die
31a Upstream lip land 31b Downstream lip land
32 Pocket
33 Slot
40 Low-pressure chamber
40a Back plate
40b Side plate
40c Screw
$G_B$ Gap between the back plate 40a and the web W
$G_S$ Gap between the side plate 40b and the web W
FIG. 8 A: Light-scattering Film A
FIG. 8 B: Surface of Light-scattering Film A
FIG. 8 C: Face containing the normal line direction D of light-scattering film and the incident direction E of light
FIG. 8 D: Normal line direction of light-scattering film
FIG. 8 E: Incident direction of light
FIG. 8 F: Light source
FIG. 8 G: Light-receiving part of detector
FIG. 8 H: Tilt angle

DETAILED DESCRIPTION OF THE EXEMPLARY EMBODIMENTS

Although the invention will be described below with reference to the exemplary embodiments thereof, the following exemplary embodiments and modifications do not restrict the invention.

According to an exemplary embodiment of the invention, a light-scattering film and a polarizing plate, which are assured of reduced reflection and enhanced bright-room contrast, can be provided. Also, in a certain exemplary embodiment, a light-scattering film having a reflection profile and a specular reflectance ensuring that when used on an image display surface, reflection is reduced and light brownish looking is improved, can be provided. Furthermore, by using the light-scattering film or a polarizing plate using the light-scattering film on a surface of the display part of an image display, an image display reduced in the reflection and assured of enhanced bright-room contrast can be provided.

Exemplary embodiments of the present invention is described in detail below. Incidentally, when a numerical value indicates a physical value, a characteristic value or the like in the present invention, the description "from (numerical value 1) to (numerical value 2)" means "not less than (numerical value 1) and not more than (numerical value 2)". Also, the term "(meth)acrylate" as used in the present invention means "at least either one of acrylate and methacrylate". The same applies to "(meth)acrylic acid".

The light-scattering film of the present invention (in the specification, sometimes referred to as a "film of the present invention") is a light-scattering film comprising a transparent support having thereon at least a light-scattering layer, wherein assuming that when substantially parallel light is incident on a surface of the film at an incident angle of 5°, the reflectance for an angle θ in the light-receiving part measured in a plane containing the film normal line and the incident direction is R(θ), the value obtained by normalizing R(θ) by the reflectance of regular reflection is Rrel(θ), and the value calculated from the maximum variation |dRrel(θ)/dθ|max for the angle θ is a scattering coefficient A (formula 1), the reflection coefficient B (formula 2) calculated from the scattering coefficient A and the 5° specular reflectance Rs is from 2.0 to 5.0:

Scattering coefficient $A = 1/(10 \times |dR\text{rel}(\theta)/d\theta|\text{max})$ (Formula 1)

Reflection coefficient $B = 2.2 \times \log 10(Rs) - 7.5 \times \log 10(A) + 5.9$ (Formula 2)

The light-scattering film of the present invention has at least a light-scattering layer on a transparent support. The light-scattering layer is sufficient if it has a function of scattering light, and may have other functions. The light-scattering film may has internal scattering property and/or surface scattering property, and preferably antiglare property due to surface scattering and hardcoat property. As for the light-scattering film, the film is an antireflection film having a layer such as low refractive index layer, which use optical principles to reduce its reflectance, other than the light-scattering layer. Hereinafter, the light-scattering film includes the above antireflection film.

The light-scattering film of the present invention according to one preferred embodiment is described below by referring to the drawings. The present invention is not limited to this one preferred embodiment.

FIG. 1A is a cross-sectional view schematically showing one preferred embodiment of the film of the present invention. The film 1 of this embodiment shown in FIG. 1A comprises a transparent support 2, a light-scattering layer 3 formed on the transparent support 2, and a low refractive index layer 4 formed on the light-scattering layer 3. By forming a low refractive index layer on the light-scattering layer to a thickness of around ¼ of the light wavelength, surface reflection can be reduced based on the principle of thin-film interference. The antireflection film of the present invention more preferably has at least a light-scattering layer 3 and a low refractive index layer 4 on a transparent support 2. The light-scattering layer 3 preferably comprises a light-transmitting resin and a light-transmitting particle 5 dispersed in the light-transmitting resin. The refractive indexes of respective layers constituting the light-scattering film of the present invention preferably satisfy the following relationship:

refractive index of light-scattering layer>refractive index of transparent support>refractive index of low refractive index layer.

Figure 1B:
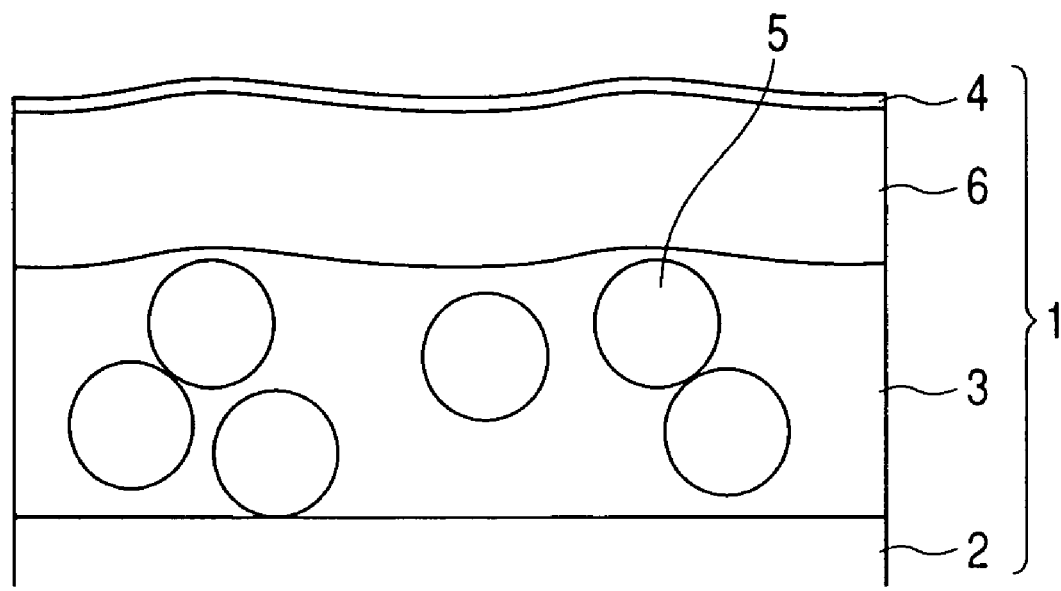

In the present invention, the light-scattering layer has internal scattering property and/or surface scattering property, preferably has both antiglare property ascribable to surface scattering and hardcoat property. In FIG. 1A, a light-scattering layer comprising one layer is shown, and the light-scattering layer is preferably formed in one layer in view of cost and simplification of the process but may comprise a plurality of layers, for example, from two to four layers. In order to reduce the light brownish looking due to surface irregularities, as shown in FIG. 1B, an overcoat layer is preferably provided on the light-scattering layer having surface irregularities (a layer containing a light-transmitting particle). Also, for the antistatic purpose, a transparent electrically conducting layer is preferably provided between the light-scattering layer 3 and the transparent support 2 or between the light-scattering layer 3 and the low refractive index layer 4, more preferably between the light-scattering layer 3 and the transparent support 2. It is still more preferred to have a transparent electrically conducting layer between the light-scattering layer 3 and the transparent support 2 and at the same time, has an electrically conducting particle in the light-scattering layer. Between the light-scattering layer 3 and the transparent support 2, a functional layer such as moisture-preventing layer may be provided other than the transparent electrically conducting layer.

Figure 2A:
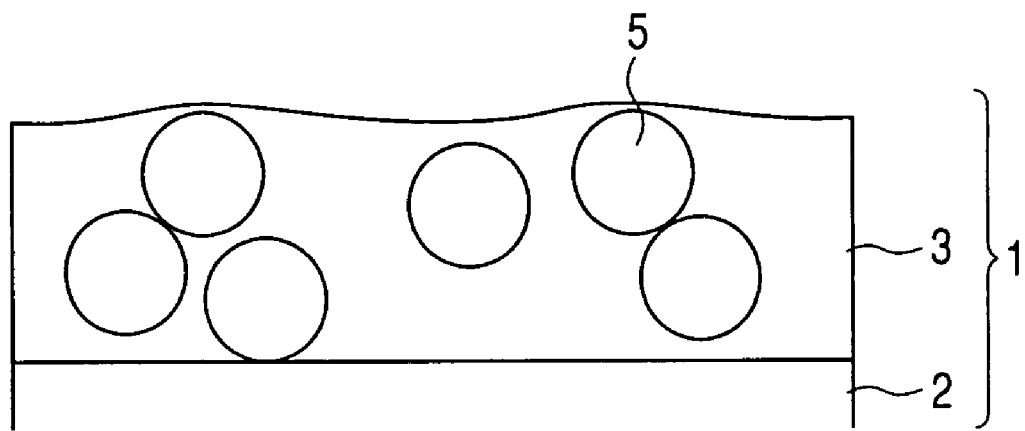
FIGS. 2A and 2B are cross-sectional views schematically showing a light-scattering film according to one exemplary embodiment of the present invention.
Figure 2B:
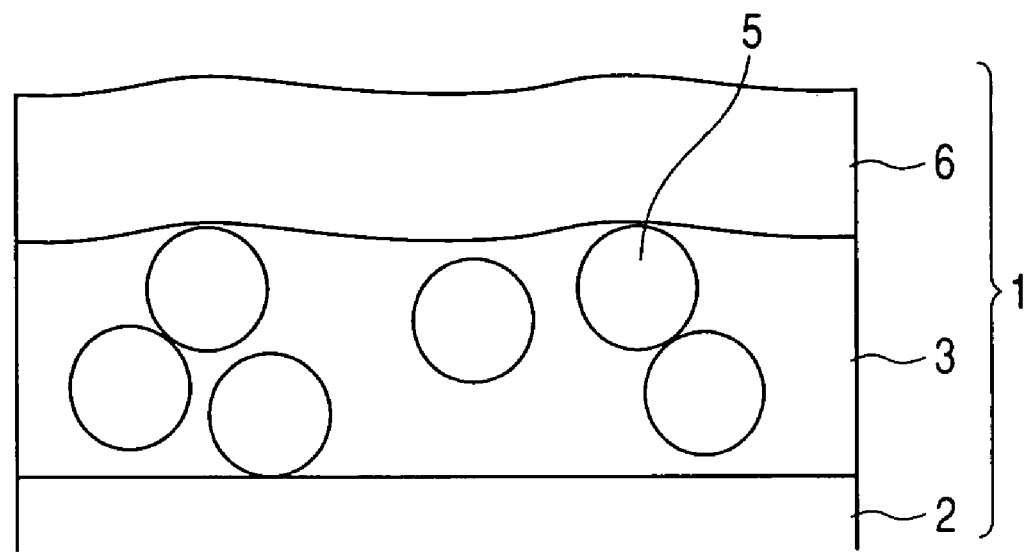

FIGS. 2A and 2B are cross-sectional views schematically showing an embodiment where a low refractive index layer is not provided. Even in embodiments of FIGS. 2A and 2B, the effect of the present invention may be obtained, but it is preferred to provide a low refractive index layer as shown in FIG. 1.

The light-scattering film of the present invention has a high effect of reducing reflection. The reflection is affected by two optical properties of antiglare property and antireflection property, but these properties have been heretofore specified each by an independent range and a satisfactory index cannot be provided by such a property in an independently specified range. In the present invention, it has been found that the outline visibility level of a reflected image is determined by the size of characteristic function based on antiglare property and antireflection property. That is, the present inventors have found that the scattering coefficient A (formula 1) showing surface scattering related to the antiglare property and the reflection coefficient B (formula 2) calculated from the 5° specular reflectance Rs are preferably in specific ranges.

(Scattering Coefficient A)

Figure 8A:
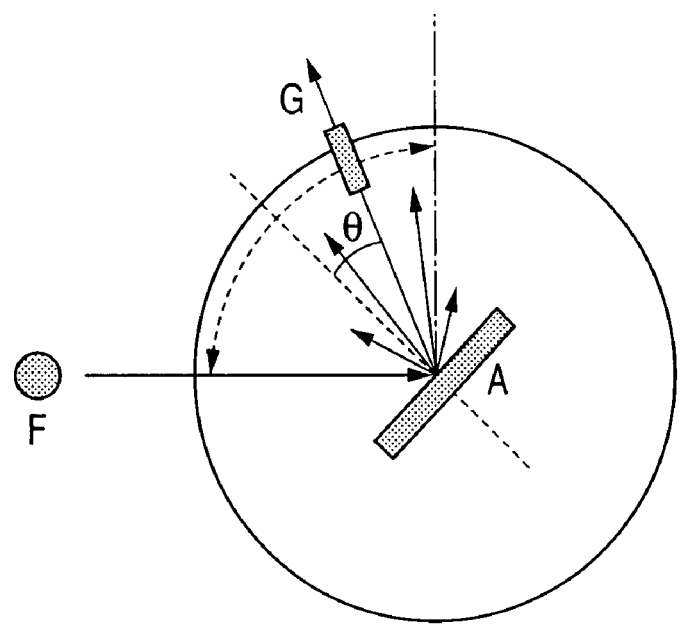
FIGS. 8A and 8B are views showing one example of the method for measuring the angle dependency of reflected light intensity at the calculation of the scattering coefficient A.
Figure 8B:
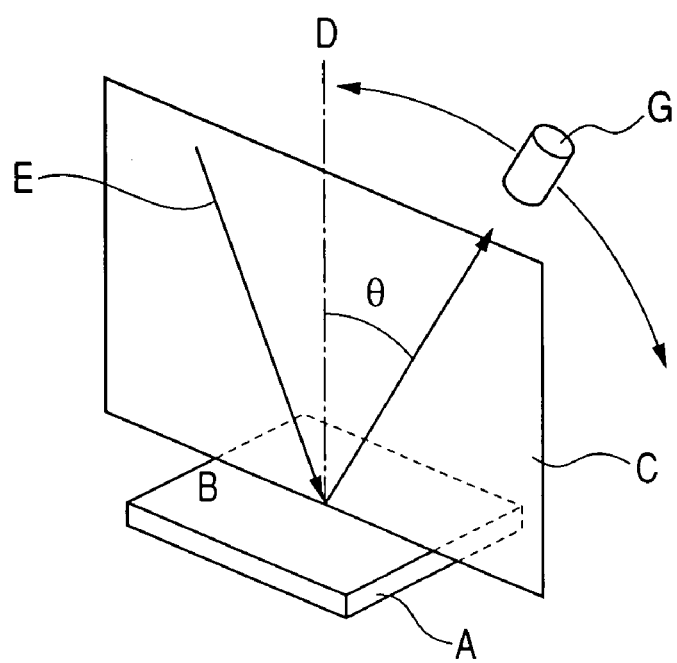
Figure 9:
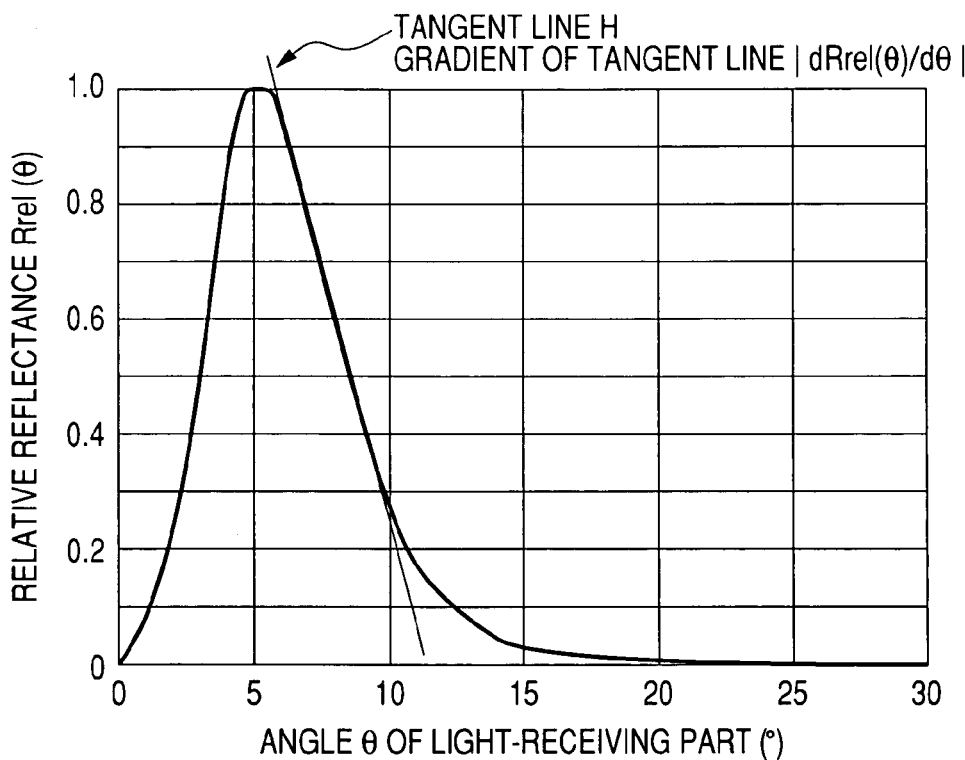
FIG. 9 is one example of the graph showing the relative reflectance dRrel(θ) with respect to the angle θ in the light-receiving part and a schematic view showing the calculation of |dRrel(θ)/dθ|max.

FIGS. 8A and 8B each is a view showing one example of the method for measuring the angle dependency of reflected light intensity at the calculation of the scattering coefficient A. Also, FIG. 9 is one example of the graph showing the relative reflectance dRrel(θ) for the angle θ in the light-receiving part and a schematic view showing the calculation of |dRrel(θ)/dθ|max.

Assuming that when substantially parallel light is incident at an incident angle of 5° on a surface of a light-scattering film having at least a light-scattering layer on a transparent support, the reflectance for an angle θ in the light-receiving part measured in a plane containing the film normal line and the incident direction is R(θ) and the value obtained by normalizing R(θ) by the reflectance of regular reflection is Rrel(θ), the value calculated from the maximum variation |dRrel(θ)/dθ|max for the angle θ is defined as a scattering coefficient A and the scattering coefficient A is calculated according to (formula 1). When the blurring degree of the image reflected on the film surface is small, the maximum variation |dRrel(θ)/dθ|max for the angle θ becomes large, and when the blurring degree is large, the maximum variation becomes small. The scattering property can be expressed by a reciprocal of the blurring degree and the scattering coefficient A is calculated according to formula 1. Incidentally, the θ measured is from 0 to 45°.

Scattering coefficient $A=(1/(10\times|dRrel(\theta)/d\theta|max))$ (Formula 1)

The term "substantially parallel light rays" means light rays progressing in parallel within the range of ±3.

The scattering coefficient A is one parameter showing the scattering degree of light incident on the film surface and particularly, as an index showing the blurring degree of the outline of an image reflected on the film surface, is strongly correlated more than the glossiness or surface haze. That is, this is a parameter exactly indicating the blurring degree of the outline of a reflected image, which is a factor of the reduction of reflection. Furthermore, the scattering coefficient A is related to the light brownish looking of the film surface and is a parameter having an effect also on the enhancement of bright-room contrast.

(Reflection Coefficient B)

Figure 10:
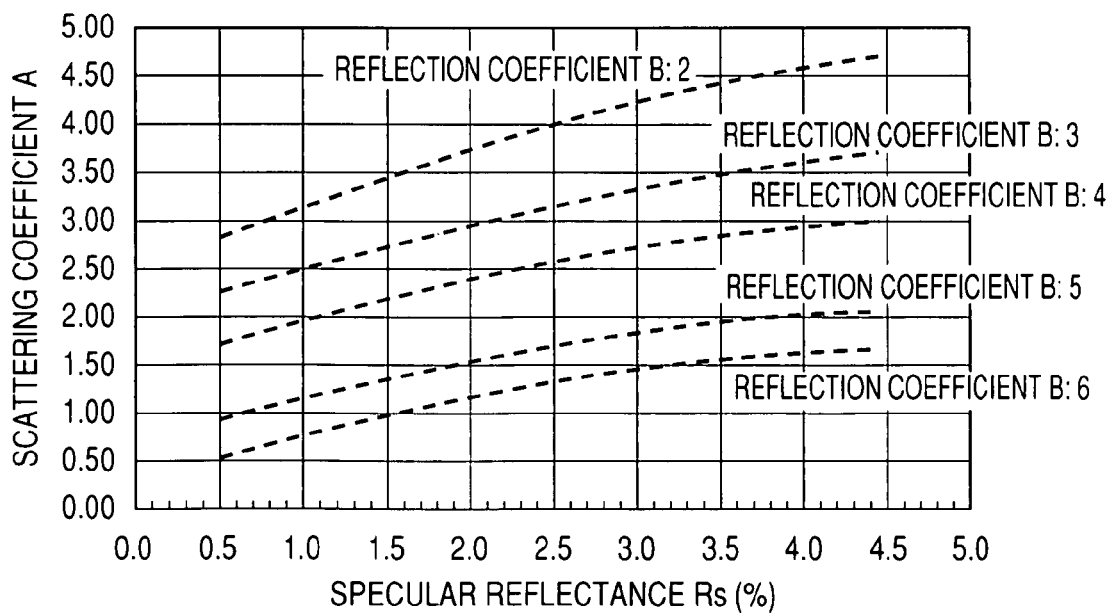
FIG. 10 is a view showing the relationship of the reflection coefficient B with the scattering coefficient A and the specular reflectance Rs.

FIG. 10 is a view showing the relationship of the reflection coefficient B with the scattering coefficient A and the specular reflectance Rs.

The reflection coefficient B is calculated using (formula 2) from the scattering coefficient A determined by (formula 1) and the 5° specular reflectance Rs:

Reflection coefficient $B=2.2\times\log 10(Rs)-7.5\times\log 10(A)+5.9$ (Formula 2)

The reflection coefficient B is a parameter showing the strength of reflection. The strength of reflection indicates the level at which a viewer (a person watching an image display) recognizes the image reflected on the surface of a film provided on the surface of an image display. The reflected image becomes less recognizable as its outline is more blurred and/or the reflected light intensity is smaller. It has been found that the contribution degree of the outline blurring and reflected light intensity varies depending on the screen size, viewing distance (distance from the screen to the viewer) and the like.

The formula for calculating the reflection coefficient B can be obtained by preparing samples differing in the scattering coefficient A and specular reflectance Rs and evaluating the reflection strength using a size (a large screen of 20 inches or more, preferably 32 inches or more) and a viewing distance (2 m or more) suitable for an image display with a large screen. FIG. 10 shows the relationship of the reflection coefficient B with the scattering coefficient A and specular reflectance Rs. Incidentally, the reflection coefficient B is a sensory evaluation value and therefore, based on the Weber-Fechner low specifying that "the human perception is proportional to the logarithm of stimulus intensity", the scattering coefficient A which is a stimulus value correlates to the logarithm of the 5° specular reflectance Rs. The reflection coefficient B is related also to the light brownish looking of the film surface and is a parameter having an effect also on the enhancement of bright-room contrast.

In the present invention, the reflection coefficient B is from 2.0 to 5.0, preferably from 2.5 to 4.8, more preferably from 3.0 to 4.5, still more preferably from 3.5 to 4.5. If the reflection coefficient exceeds 5.0, the light-scattering film cannot satisfactorily exert the effect of reducing reflection, whereas if it is less than 2.0, the bright-room contrast of the light-scattering film tends to be worsened.

In order to prevent worsening of the bright-room contrast due to surface scattering, the scattering coefficient A is preferably set to a specific range, as well as the reflection coefficient B. The scattering coefficient A is preferably from 1.0 to 3.0, more preferably from 1.3 to 2.7, still more preferably from 1.5 to 2.5, yet still more preferably from 1.7 to 2.3. If the scattering coefficient is excessively large, the bright-room contrast is worsened, whereas if too small, the effect of preventing reflection tends to decrease.

In order to sufficiently reduce the reflection, the 5° specular reflectance is also preferably set to a specific range. The 5° specular reflectance is preferably from 0.1 to 2.0%, more preferably from 0.1 to 1.5%, still more preferably from 0.1 to 1.2%, yet still more preferably from 0.1 to 1.0%, and most preferably from 0.1 to 0.8%. If the 50 specular reflectance is excessively high, the reflection is worsened.

In order to provide a surface film best suitable for an image display having a large screen, the bright-room contrast is preferably enhanced. For enhancing the bright-room contrast, the integrated reflectance is preferably from 0.2 to 2.0%, more preferably from 0.2 to 1.8%, still more preferably from 0.2 to 1.5%, and most preferably from 0.2 to 1.3%. If the integrated reflectance is excessively high, the reflection and bright-room contrast are worsened. Particularly, in the case where a whitish thing is reflected from the regular reflection position of a person watching the display, the bright-room contrast is significantly worsened.

In order to enhance the bright-room contrast, in addition to the integrated reflectance, the difference between the integrated reflectance and the specular reflectance is preferably set to a specific range. The difference between the integrated reflectance and the specular reflectance is preferably from 0.1 to 1.0%, more preferably from 0.15 to 0.8%, still more preferably from 0.2 to 0.6%. If the difference between the integrated reflectance and the specular reflectance is excessively large, the contrast is worsened. Particularly, in the case where a blackish thing is reflected from the regular reflection position of a person watching the display, the bright-room contrast is significantly worsened. Also, if the difference between the integrated reflectance and the specular reflectance is too small, this gives rise to insufficient surface scattering and in turn, insufficient effect of reducing the reflection.

In the present invention, the bright-room contrast is preferably enhanced irrespective of the viewing environment of a display. For this purpose, the above-described preferred ranges of the integrated reflectance and the difference between the integrated reflectance and the specular reflectance are preferably satisfied at the same time. It is ideal to satisfy the reflection coefficient B, the scattering coefficient A and the 5° specular reflectance at the same time. In this case, both the effect of reducing the reflection and the enhancement of bright-room contract are achieved and a surface film best suitable for an image display having a large screen can be provided.

In order to provide a surface film best suitable for an image display having a large screen, the neutrality of the color tine of reflected light is also preferably set to a specific range. The a* and b* values in the CIE1976 L*a*b* color space of regularly reflected light for 5° incident light of a CIE standard illuminant D65 in the wavelength region of 380 to 780 nm are preferably $-7 \leq a^* \leq 7$ and $-10 \leq b^* \leq 10$, more preferably $-5 \leq a^* \leq 5$ and $-7 \leq b^* \leq 7$, still more preferably $0 \leq a^* \leq 5$ and $-7 \leq b^* \leq 0$, respectively. By setting a* and b* to preferred ranges, when outside light is reflected, the reflection tint becomes neutral and does not annoy the viewer. Most preferably, various reflection performances described above and the a* and b* values all are set to preferred ranges.

In order to realize such reflection performance and color tint, the refractive index (na) of the light-scattering layer and the refractive index (nb) of the low refractive index layer are preferably set to preferred ranges. The difference na–nb between the refractive index (na) of the light-scattering layer and the refractive index (nb) of the low refractive index layer is 0.04 or more, preferably from 0.08 to 0.35, more preferably from 0.10 to 0.30, still more preferably from 0.14 to 0.25. When the difference of refractive index is in this range, the reflectance can be sufficiently reduced, the reflection of an image on the surface can be satisfactorily prevented, the film strength is increased, and the color tint can be prevented from being intensified.

The refractive index (na) of the light-scattering layer is preferably from 1.48 to 1.70, more preferably from 1.50 to 1.60, still more preferably from 1.50 to 1.55. if the refractive index of the light-scattering layer is too small, the difference of refractive index from the low refractive index layer becomes small and the antireflection property decreases, whereas if the refractive index is excessively high, the usable material is limited and this disadvantageously incurs cost rising or intensification of color tint. Incidentally, in the present invention, the refractive index of the light-scattering layer is a value obtained from a refractive index of a coating film containing solid contents excluding a light-transmitting particle.

The refractive index (nb) of the low refractive index layer is preferably from 1.20 to 1.46, more preferably from 1.20 to 1.40, still more preferably from 1.30 to 1.38, and for providing a surface film best suitable for a display having a large screen, yet still more preferably from 1.31 to 1.37. If the refractive index of the low refractive index layer is excessively high, the reflectance becomes high and it is disadvantageously required to, for example, elevate the refractive index of the light-scattering layer for reducing the reflectance, whereas if the refractive index is too low, this is not preferred in that the strength of the low refractive index decreases, the usable material is limited and the cost rises.

Furthermore, in view of reducing the reflectance, the low refractive index layer preferably satisfies the following mathematical formula (I):

$$(m\lambda/4) \times 0.7 < n1 \times d1 < (m\lambda/4) \times 1.3 \qquad \text{Mathematical Formula (I)}$$

In mathematical formula (I), m is a positive odd number, n1 is the refractive index of the low refractive index layer, d1 is the film thickness (nm) of the low refractive index layer, and λ is a wavelength and a value in the range of 500 to 550 nm. When mathematical formula (I) is satisfied, this means that m (a positive odd number; usually 1) satisfying mathematical formula (I) is present in the above-described wavelength range.

The refractive index of the light-scattering layer and the refractive index of the low refractive index layer both are preferably controlled to specific ranges. An embodiment where the refractive index of the light-scattering layer is from 1.50 to 1.60 and at the same time, the refractive index of the low refractive index layer is from 1.20 to 1.40 is preferred, an embodiment where the refractive index of the light-scattering layer is from 1.50 to 1.55 and at the same time, the refractive index of the low refractive index layer is from 1.20 to 1.40 is more preferred, an embodiment where the refractive index of the light-scattering layer is from 1.50 to 1.55 and at the same time, the refractive index of the low refractive index layer is from 1.30 to 1.38 is still more preferred, and an embodiment where the refractive index of the light-scattering layer is from 1.50 to 1.55 and at the same time, the refractive index of the low refractive index layer is from 1.31 to 1.37 is yet still more preferred, The light-scattering film of the present invention may have a constitution that a layer (high refractive index layer) having a refractive index layer higher than that of the light-scattering layer and a low refractive index layer are stacked, or may have a constitution that a layer (medium refractive index layer) having a refractive index between the light-scattering layer and the high refractive index layer, a high refractive index layer and a low refractive index layer are stacked. The medium refractive index layer, high refractive index layer and low refractive index layer each preferably has a film thickness of 200 nm or less. As regards the film thickness and refractive index of each of the medium refractive index layer, high refractive index layer and low refractive index layer, the layer structure described, for example, JP-A-2003-121606 may be used. However, in view of cost, unevenness, productivity and the like, the reflection performance is preferably controlled by not providing a medium refractive index layer or a high refractive index layer between the light-scattering layer and the low refractive index layer and setting the low refractive index layer to the above-described range.

In order to realize the above-described reflection performance and color tint, the surface irregularities of the light-scattering film are preferably controlled to a specific range. As for the surface irregularity shape of the light-scattering film of the present invention, the centerline average roughness Ra is from 0.02 to 0.35 μm, preferably from 0.02 to 0.20 μm, more preferably from 0.03 to 0.15 μm, still more preferably from 0.05 to 0.15 μm. If Ra is excessively large, the bright-room contrast is worsened, whereas if Ra is too small, the reflection is worsened. The ten-point average roughness Rz is 10 times or less of Ra, and the average peak-to-trough distance Sm is preferably from 30 to 200 µm, more preferably from 50 to 180 µm, still more preferably from 50 to 150 µm, yet still more preferably from 80 to 120 µm. The surface irregularities are preferably designed such that the standard deviation of the convex height from the deepest part of irregularities becomes 0.5 µm or less and the surface at a tilt angle of 0 to 5° occupies 10% or more.

In order to enhance the bright-room contrast, it is also preferred to control the average tilt angle. The average tilt angle is preferably from 0.1 to 4.0°, more preferably from 0.2 to 3.0°, still more preferably from 0.2 to 2.0°, and most preferably from 0.2 to 1.2°. If the average tilt angle is large, the bright-room contrast is worsened, whereas if it is small, the reflection is worsened. For making both good properties, as well as the average tilt angle, the Sm value preferably satisfies the above-described range and it is more preferred that the average tilt angle is from 0.2 to 1.2° and at the same time, the Sm value is from 50 to 150 µm.

In order to provide a surface film having good bright-room contrast and good effect of reducing reflection and being best suitable for an image display having a large screen, the reflection performance and color tine need to be optimally designed. For this purpose, it is most preferred that the refractive index of the light-scattering layer, the refractive index of the low refractive index and the surface irregularities all are set to specific ranges. More specifically, it is most preferred to satisfy all the conditions that the refractive index of the light-scattering layer is from 1.50 to 1.55, the refractive index of the low refractive index is from 1.31 to 1.37 and Ra is from 0.08 to 0.13 µm. More preferably, Sm and the average tilt angle are set to the above-described ranges at the same time.

In the light-scattering film of the present invention, the haze ascribable to surface scattering (hereinafter referred to as a "surface haze") is preferably from 0.3 to 20%, more preferably from 0.5 to 10%, still more preferably from 0.5 to 5%, yet still more preferably from 0.5 to 2%. If the surface haze is excessively large, the bright-room contrast is worsened, whereas if too small, the reflection is worsened.

The light-scattering film of the present invention preferably has optical property that the haze ascribable to internal scattering (hereinafter referred to as an "internal haze") is from 0 to 60%, more preferably from 1 to 40%, still more preferably from 5 to 35%, yet still more preferably from 7 to 30%. If the internal haze is excessively large, the front contrast decreases and light brownish looking is intensified, whereas if too small, the combination of usable materials is limited, making it difficult to combine the antiglare property and other characteristic values, and also the cost rises.

The surface haze and internal haze can be measured according to the following procedure.

(1) The entire haze value (H) of the film is measured according to JIS-K7136.

(2) After adding several silicone oil drops on the low refractive index side surface and back surface of the film, the film is sandwiched from front and back by two 1 mm-thick glass plates (Microslide Glass No. S 9111, produced by Matsunami K.K.) and put into optically complete contact with two glass plates to provide a surface haze-removed state, and the haze is measured. From this value, the haze separately measured by interposing only the silicone oil between two glass plates is subtracted, and the value obtained is calculated as the internal haze (Hi).

(3) The internal haze (Hi) calculated in (2) above is subtracted from the entire haze (H) measured in (1) above, and the value obtained is calculated as the surface haze (Hs).

In the light-scattering film of the present invention, the image sharpness according to JIS K7105 is, as measured with an optical comb width of 0.5 mm, preferably from 30 to 99%, more preferably from 40 to 95%, still more preferably from 50 to 90%, yet still more preferably from 60 to 80%. If the image sharpness is low, the bright-room contrast is worsened, whereas if it is high, the reflection is worsened.

(Light-Scattering Layer)

The light-scattering layer is formed for the purpose of providing the film with the antiglare property by surface scattering, the internal scattering property and preferably the hardcoat property for enhancing the scratch resistance of the film. Accordingly, the light-scattering layer preferably contains a light-transmitting resin capable of imparting hardcoat property and a light-transmitting particle for imparting antiglare property and internal scattering property.

<Light-Transmitting Particle>

The average particle diameter of the light-transmitting particle is preferably from 0.5 to 10 µm, more preferably from 3 to 10 µm, still more preferably from 5 to 10 µm, yet still more preferably from 6 to 8 µm. If the average particle diameter is small, the average tilt angle on the surface becomes large and the bright-room contrast tends to be worsened. Also, scattering in the high-angle direction ascribable to internal scattering of light is increased and this is not preferred in that, for example, the dark-room contrast is worsened or character blurring of the display is brought about. On the other hand, if the particle diameter is excessively large, the film thickness increases for obtaining a preferred surface form and the curling is worsened. Also, this is not preferred in that, for example, the material cost rises.

Specific preferred examples of the light-transmitting particle include a resin particle such as poly((meth)acrylate) particle, crosslinked poly((meth)acrylate) particle, polystyrene particle, crosslinked polystyrene particle, crosslinked poly(acryl-styrene) particle, melamine resin particle and benzoguanamine resin particle. Among these, a crosslinked resin particle such as crosslinked polystyrene particle, crosslinked poly((meth)acrylate) particle and crosslinked poly(acryl-styrene) particle are more preferred, and a crosslinked poly((meth)acrylate) particle is still more preferred. By adjusting the refractive index of the light-transmitting resin in accordance with not only the particle size and kind but also the refractive index of the light-transmitting particle selected from these particles, the internal haze and surface haze of the present invention as well as the centerline average roughness can be achieved. More specifically, a combination of a light-transmitting resin (refractive index after curing: from 1.50 to 1.53) mainly comprising a trifunctional or greater (meth)acrylate monomer which is preferably used for the light-scattering layer of the present invention as described later, with a light-transmitting particle comprising a crosslinked poly(meth)acrylate-based polymer having an acryl content of 50 to 100 mass % (weight %) is preferred, and a combination with a crosslinked poly((meth)acrylate) particle is more preferred. A cohesive silica can also be used as a light-transmitting particle as described below.

In the present invention, the difference of the refractive index between the light-transmitting resin and the light-transmitting particle (refractive index of light-transmitting particle–refractive index of light-transmitting resin) is preferably, in terms of the absolute value, from 0.001 to 0.100, more preferably from 0.001 to 0.050, still more preferably from 0.001 to 0.040, yet still more preferably from 0.001 to 0.030, and most preferably from 0.001 to 0.025. Within this range, problems such as film character burring, reduction in the dark-room contrast, and surface clouding, can hardly occur. It is particularly preferred that a light-transmitting particle comprising a crosslinked poly(meth)acrylate-based polymer and having an average particle diameter of 6 to 8 µm is used and the difference of refractive index between the light-transmitting resin and the light-transmitting particle is set to be from 0.01 to 0.025.

Here, the refractive index of the light-transmitting resin can be quantitatively evaluated by directly measuring the refractive index with use of an Abbe refractometer or by measuring the spectral reflection spectrum or a spectral ellipsometry. The refractive index of the light-transmitting particle is determined as follows. The light-transmitting particle is dispersed in an equal amount in solvents prepared by changing the mixing ratio of two kinds of solvents differing in the refractive index and thereby varying the refractive index, the turbidity is measured, and the refractive index of the solvent when the turbidity becomes minimum is measured by an Abbe refractometer.

In the present invention, two or more different kinds of particles may be used in combination. The film may be designed by utilizing the characteristic features of a plurality of particles, for example, such that surface irregularities are formed by the light-transmitting particle having a larger particle diameter to impart antiglare property and the roughened texture on the surface is reduced by the light-transmitting particle having a smaller particle diameter; that surface irregularities are formed by the light-transmitting particle having a larger particle diameter to impart antiglare property and mainly internal scattering is imparted by the light-transmitting particle having a smaller particle diameter; or that the scattering angle distribution of internal scattering is adjusted by two kinds of particles. Also in the case of using two or more different particles, the above-described particle is preferably used as one of these particles.

The light-transmitting resin particle is preferably blended to account for 5 to 40 mass %, more preferably from 5 to 25 mass %, still more preferably from 7 to 20 mass %, in the entire solid content of the light-scattering layer. If the proportion is less than 5 mass %, the addition effect is insufficient, whereas if it exceeds 40 mass %, problems such as image blurring or surface clouding or glaring are liable to occur.

The coated amount of the light-transmitting particle is preferably from 30 to 2,500 mg/m², more preferably from 100 to 2,400 mg/m², still more preferably from 600 to 2,300 mg/m², yet still more preferably from 1,000 to 2,000 mg/m².

The average film thickness of the light-scattering layer is preferably from 2 to 30 µm, more preferably from 7.5 to 30 µm, still more preferably from 8 to 20 µm, yet still more preferably from 10 to 16 µm. If the thickness is too small, the hardcoat property is insufficient, whereas if it is too large, the curling or brittleness is worsened and the processing suitability may decrease. Therefore, the film thickness is preferably in the above-described range. The average film thickness of the diffusing layer is determined by enlarging the cross-sectional surface at a magnification of 5,000 times by an electron microscope, copying down the light-scattering layer by tracing paper (Se-TD58, 50 g/m²) produced by Kokuyo Co., Ltd., and measuring the mass.

The average film thickness of the light-scattering layer is from 1.4 to 3.5 times, preferably from 1.5 to 3.0 times, more preferably from 1.5 to 2.5 times, still more preferably from 1.6 to 2.0 times, the average particle diameter of the light-transmitting particle. When the average film thickness of the light-scattering layer is from 1.4 to 3.5 times the average particle diameter of the light-transmitting particle, the film thickness dependency or particle diameter dependency of the antiglare property is reduced. Therefore, even when the film thickness is fluctuated due to steaks or drying unevenness generated at the coating, the surface state defect such as streaks or unevenness can be made less recognizable. The antiglare property is preferably provided by surface irregularities resulting from protrusion ascribable to a three-dimensional steric structure which is formed by an aggregate of a plurality of particles, because even when slight change is generated in the film thickness or particle diameter, the size of surface irregularities is scarcely changed and the change of the antiglare property is advantageously small. A preferred surface form can be obtained. If the ratio of average film thickness/average particle is too small, slight change in the film thickness or particle size causes great change in the surface irregularities and in turn, in the antiglare property, because the particle is present in one layer of the film. Also, the bright-room contrast is liable to be worsened. On the other hand, if the ratio is excessively large, the aggregate of a plurality of particles is buried in the film, as a result, almost no surface irregularities are formed and the required antiglare property cannot be obtained.

When the average film thickness/average particle is from 1.4 to 3.5, the average particle diameter less fluctuates among particle lots and the fluctuation of antiglare property of the film is reduced, so that a film with small lot-to-lot fluctuation can be obtained. Also, in view of the reflection and bright-room contrast which are concerned about in the present invention, if the average film thickness/average particle ratio is too small, the bright-room contrast is worsened, whereas if it is excessively large, the reflection is worsened.

In the case of using the light-scattering film of the present invention on the display surface, its pencil hardness is preferably high. The pencil hardness is preferably 2H or more, more preferably from 3H to 7H, still more preferably from 4H to 6H.

<Light-Transmitting Resin>

The light-transmitting resin is preferably a binder polymer having a saturated hydrocarbon chain or a polyether chain as the main chain, more preferably a binder polymer having a saturated hydrocarbon chain as the main chain. It is also preferred that the binder polymer has a crosslinked structure.

The binder polymer having a saturated hydrocarbon chain as the main chain is preferably a polymer of an ethylenically unsaturated monomer. The binder polymer having a saturated hydrocarbon chain as the main chain and having a crosslinked structure is preferably a (co)polymer of a monomer having two or more ethylenically unsaturated groups. In particular, the binder polymer is preferably formed by coating it as an ethylenically unsaturated monomer on a substrate and then polymerizing the monomer.

Examples of the monomer having two or more ethylenically unsaturated groups include an ester of a polyhydric alcohol and a (meth)acrylic acid (e.g., ethylene glycol di(meth)acrylate, butanediol di(meth)acrylate, hexanediol di(meth)acrylate, 1,4-cyclohexane diacrylate, pentaerythritol tetra(meth)acrylate, pentaerythritol tri(meth)acrylate, trimethylolpropane tri(meth)acrylate, trimethylolethane tri(meth)acrylate, dipentaerythritol tetra(meth)acrylate, dipentaerythritol penta(meth)acrylate, dipentaerythritol hexa(meth)acrylate, pentaerythritol hexa(meth)acrylate, 1,2,3-cyclohexane tetramethacrylate, polyurethane polyacrylate, polyester polyacrylate), an ethylene oxide-modified or caprolactone-modified product of the above-described ester, a vinylbenzene and a derivative thereof (e.g., 1,4-divinylbenzene, 2-acryloylethyl 4-vinylbenzoate, 1,4-divinylcyclohexanone), a vinylsulfone (e.g., divinylsulfone), an acrylamide (e.g., methylene-bisacrylamide), and a methacrylamide. These monomers may be used in combination of two or more thereof.

In order to sufficiently reduce the surface reflection or control the internal scattering, it is also preferred to control the refractive index of the light-scattering layer. For elevating the refractive index of the light-scattering layer, for example, a method of dispersing a high refractive index inorganic fine particle in the binder of the light-scattering layer, thereby elevating the refractive index, or a method of elevating the refractive index of the binder polymer itself, thereby elevating the refractive index of the light-scattering layer without using a high refractive index inorganic fine particle, is preferably used. In order to elevate the refractive index of the binder polymer, for example, a high refractive index monomer or oligomer containing in the monomer structure an aromatic ring or at least one atom selected from a halogen atom (except for fluorine), a sulfur atom, a phosphorus atom and a nitrogen atom, or a monomer or oligomer having a fluorene skeleton within the molecule may also be selected. Specific examples of the high refractive index monomer include (meth)acrylates having a fluorene skeleton, (meth)acrylates having a urethane structure, bis(4-methacryloylthiophenyl)sulfide, vinylnaphthalene, biphenyl sulfide and 4-methacryloxyphenyl-4'-methoxyphenyl thioether. These monomers may also be used in combination of two or more thereof.

The light-transmitting resin preferably comprises a trifunctional or greater (meth)acrylate monomer as a main component. When the light-transmitting resin is formed from such a monomer, this can provide an effect that the hardness of the light-scattering layer is increased and hardcoat property can be imparted with a smaller film thickness.

The "light-transmitting resin comprising a trifunctional or greater (meth)acrylate monomer as a main chain" as used herein means that a resin component comprising a trifunctional or greater (meth)acrylate monomer is contained at a proportion of 40 to 100 mol % in the light-transmitting resin. The content of the repeating unit comprising a trifunctional or greater (meth)acrylate monomer is preferably from 60 to 100 mol %.

The monomer having an ethylenically unsaturated group can be polymerized by the irradiation of ionizing radiation or under heating in the presence of a photoradical initiator or a thermal radical initiator.

Accordingly, the light-scattering layer can be formed by preparing a coating solution containing the above-described monomer for the formation of a light-transmitting resin, such as ethylenically unsaturated monomer, a photoradical initiator or thermal radial initiator, a light-transmitting particle and, if desired, an inorganic filler described later, applying the coating solution on a transparent, and causing a polymerization reaction by the irradiation of ionizing radiation or under heating, thereby effecting curing.

Examples of the photoradical (polymerization) initiator include acetophenones, benzoins, benzophenones, phosphine oxides, ketals, anthraquinones, thioxanthones, azo compounds, peroxides, 2,3-dialkyldione compounds, disulfide compounds, fluoroamine compounds and aromatic sulfoniums. Examples of the acetophenones include 2,2-diethoxyacetophenone, p-dimethylacetophenone, 1-hydroxydimethyl phenyl ketone, 1-hydroxycyclohexyl phenyl ketone, 2-methyl-4-methylthio-2-morpholinopropiophenone and 2-benzyl-2-dimethylamino-1-(4-morpholinophenyl)-butanone. Examples of the benzoins include benzoin benzenesulfonic acid ester, benzoin toluenesulfonic acid ester, benzoin methyl ether, benzoin ethyl ether and benzoin isopropyl ether. Examples of the benzophenones include benzophenone, 2,4-dichlorobenzophenone, 4,4-dichlorobenzophenone and p-chlorobenzophenone. Examples of the phosphine oxides include 2,4,6-trimethylbenzoyldiphenylphosphine oxide.

Various examples are also described in *Saishin UV Koka Gijutsu* (*Latest UV Curing Technologies*), page 159, Kazuhiro Takausu (publisher), Technical Information Institute Co., Ltd. (publishing office) (1991), and these are useful in the present invention.

Examples of the commercially available photocleavage-type photoradical (polymerization) initiator include IRGA-CURE (651, 184, 907) produced by Ciba Specialty Chemicals.

The photoradical (polymerization) initiator is preferably used in an amount of 0.1 to 15 parts by mass (weight), more preferably from 1 to 10 parts by mass, per 100 parts by mass of the polyfunctional monomer.

In addition to the photoradical (polymerization) initiator, a photosensitizer may be used. Specific examples of the photosensitizer include n-butylamine, triethylamine, tri-n-butylphosphine, Michler's ketone and thioxanthone.

As for the thermal radical initiator, an organic or inorganic peroxide, an organic azo or diazo compound, or the like may be used.

More specifically, examples of the organic peroxide include benzoyl peroxide, halogen benzoyl peroxide, lauroyl peroxide, acetyl peroxide, dibutyl peroxide, cumene hydroperoxide and butyl hydroperoxide; examples of the inorganic peroxide include hydrogen peroxide, ammonium persulfate and potassium persulfate; examples of the azo compound include 2-azo-bis-isobutyronitrile, 2-azo-bis-propionitrile and 2-azo-bis-cyclohexanedinitrile; and examples of the diazo compound include diazoaminobenzene and p-nitrobenzenediazonium.

The binder polymer having a polyether as the main chain is preferably a ring-opening polymer of a polyfunctional epoxy compound. The ring-opening polymerization of a polyfunctional epoxy compound can be performed by the irradiation of ionizing radiation or under heating in the presence of a photoacid generator or a heat-acid generator.

Accordingly, the light-scattering layer can be formed by preparing a coating solution containing a polyfunctional epoxy compound, a photoacid or heat-acid generator, a light-transmitting particle and an inorganic fine particle, applying the coating solution on a transparent support, and causing a polymerization reaction under ionizing radiation or heat, thereby effecting curing.

In place of or in addition to the monomer having two or more ethylenically unsaturated groups, a monomer having a crosslinking functional group may be used to introduce a crosslinking functional group into the polymer and introduce a crosslinked structure into the binder polymer by the reaction of this crosslinking functional group.

Examples of the crosslinking functional group include an isocyanate group, an epoxy group, an aziridine group, an oxazoline group, an aldehyde group, a carbonyl group, a hydrazine group, a carboxyl group, a methylol group and an active methylene group. Also, a vinylsulfonic acid, an acid anhydride, a cyanoacrylate derivative, a melamine, an etherified methylol, an ester, a urethane or a metal alkoxide such as tetramethoxysilane can be used as a monomer for introducing a crosslinked structure. A functional group which exhibits crosslinking property as a result of the decomposition reaction, such as block isocyanate group, may also be used. In other words, the crosslinking functional group for use in the present invention may be a group which does not directly cause a reaction but exhibits reactivity as a result of the decomposition.

The binder polymer having such a crosslinking functional group is coated and then heated, whereby a crosslinked structure can be formed.

(Inorganic Fine Particle)

In the light-scattering layer, in addition to the light-transmitting particle, an inorganic fine particle may also be used so as to adjust the haze value ascribable to internal scattering to the range of the present invention by adjusting the refractive index of the layer or obtain a preferred surface form by adjusting the viscosity of the coating solution. In the case of using an inorganic fine particle, the inorganic fine particle is preferably an inorganic fine particle mainly comprising an oxide of at least one metal selected from silicon, titanium zirconium aluminum, indium, zinc, tin and antimony and having an average particle diameter of 1 μm or less, preferably 0.2 μm or less, more preferably 0.1 μm or less, still more preferably 0.06 μm or less, yet still more preferably 0.02 μm or less. The specific gravity of such an inorganic fine particle is generally higher than that of an organic material and the density of the coating composition can be increased, so that an effect of retarding the precipitation rate of the light-transmitting particle can also be obtained.

As for the inorganic fine particle, in view of elevating the refractive index, at least one metal oxide selected from metal oxides mainly comprising an oxide of at least one metal selected from titanium, zirconium, indium zinc, tin and antimony is preferred, and at least one metal oxide selected from metal oxides mainly comprising an oxide of at least one metal selected from titanium and zirconium is more preferred. Out of these two metals, zirconium not having a photocatalytic action is preferred in terms of light resistance of the light-scattering layer, but it is also preferred to use titanium having suppressed photocatalytic activity.

In view of the antistatic property, an electrically conducting inorganic fine particle is preferably used, and at least one metal oxide selected from inorganic fine particles mainly comprising an oxide of at least one metal selected from indium, zinc, tin and antimony is preferred.

Also for the purpose of enhancing the hardness or adjusting the refractive index, at least one inorganic particle having a refractive index lower than that of the light-transmitting resin may be added. The inorganic particle having a low refractive index is preferably a silica particle.

In another preferred embodiment of the silica particle, a cohesive silica resulting from formation of an aggregate of particles having a primary particle diameter of several tens of nm is used. The cohesive silica can stably impart appropriate surface haze and can also be used as the above-described light-transmitting particle for imparting antiglare property. The cohesive silica may be used alone or may be used in combination with another light-transmitting particle or inorganic fine particle. The cohesive silica can be obtained by a so-called wet process of synthesizing it through a neutralization reaction of sodium silicate and sulfuric acid, but the present invention is not limited thereto. The wet process is roughly classified into a precipitation process and a gelling process, and either process may be used in the present invention. The secondary particle diameter of the cohesive silica is preferably from 0.1 to 10.0μ but is selected according to the combination with the thickness of the light-scattering layer containing the particle. The secondary particle diameter is adjusted by the dispersity of particles (this is controlled by mechanical dispersion using a sand mill or the like or by chemical dispersion using a dispersant or the like).

It is also preferred that the surface of the inorganic fine particle for use in the light-scattering layer is subjected to a silane coupling treatment or a titanium coupling treatment. A surface treating agent having a functional group capable of reacting with the binder species on the filler surface is preferably used. Without performing the coupling treatment, the surface treating agent may be used by mixing it in the coating composition.

In the case of using such an inorganic fine particle, the amount added thereof is preferably from 10 to 90%, more preferably from 20 to 80%, still more preferably from 30 to 75%, based on the entire mass of the light-scattering layer.

Incidentally, such an inorganic fine particle has a particle diameter sufficiently smaller than the wavelength of light and therefore, causes no scattering, and the dispersion obtained by dispersing the filler in the binder polymer behaves as an optically uniform substance.

Also, an organosilane compound or a derivative thereof which can be used in the low refractive index layer described later may be used in the light-scattering layer. The amount added of the organosilane compound or a derivative thereof is preferably from 0.001 to 50 mass %, more preferably from 0.01 to 20 mass %, still more preferably from 3 to 15 mass %, based on the entire solid content of the light-scattering layer.

<Leveling Agent>

For the purpose of preventing unevenness, various leveling agents are preferably used in the light-scattering layer. Specifically, the leveling agent is preferably a fluorine-based leveling agent or a silicone-based leveling agent, more preferably a fluorine-based leveling agent because of its high unevenness-preventing ability.

Also, the leveling agent is preferably an oligomer or a polymer more than a low molecular compound.

When a leveling agent is added to the light-scattering layer, the leveling agent swiftly causes disproportionate distribution to the surface of the coated liquid film and since the leveling agent remains disproportionately distributed to surface after drying of the light-scattering layer film, the surface energy of the light-scattering layer film is reduced by the leveling agent.

From the standpoint of preventing unevenness of the light-scattering layer, the surface energy of the light-scattering layer is preferably low.

The surface energy ($\gamma s^v$, unit: $mJ/m^2$) of the light-scattering layer is an energy-reduced surface tension value (a value obtained by converting mN/m unit into $mJ/m^2$ unit) of the antiglare light-scattering layer, and the surface tension is defined as a value $\gamma s^v$ ($=\gamma s^d + \gamma s^h$) which is a sum of $\gamma s^d$ and $\gamma s^h$ obtained according to the following simultaneous equations (1) and (2) from respective contact angles $\theta_{H_2O}$ and $\theta_{CH_2I_2}$ with pure water $H_2O$ and methylene iodide $CH_2I_2$ experimentally determined on the antiglare light-scattering layer by referring to D. K. Owens, *J. Appl. Polym. Sci.*, 13, 1741 (1969). Before the measurement, the sample needs to be subjected to humidity conditioning under predetermined temperature-humidity conditions for a fixed time or more. At this time, the temperature is preferably from 20 to 27° C., the humidity is preferably from 50 to 65 RH %, and the humidity conditioning time is preferably 2 hours or more.

$$1+\cos\theta_{H_2O}=2\sqrt{\gamma s^d}(\sqrt{\gamma H_2Od}/\gamma H_2Ov)+ 2\sqrt{\gamma s^h}(\sqrt{\gamma H_2Oh}/\gamma H_2Ov) \quad (1)$$

$$1+\cos\theta_{CH_2I_2}=2\sqrt{\gamma s^d}(\sqrt{\gamma CH_2I_2d}/\gamma CH_2I_2v)+ 2\sqrt{\gamma s^h}(\sqrt{\gamma CH_2I_2h}/\gamma CH_2I_2v) \quad (2)$$

wherein $\gamma_{H2O}{}^d=21.8°$, $\gamma_{H2O}{}^h=51.0°$, $\gamma_{H2O}{}^v=72.8°$, $\gamma_{CH2I2}{}^d=49.50°$, $\gamma_{CH2I2}{}^h=1.3°$ and $\gamma_{CH2I2}{}^v=50.8°$.

The surface energy of the light-scattering layer is 45 mJ/m² or less, preferably from 20 to 45 mJ/m², more preferably from 22 to 40 mJ/m².

By setting the surface energy of the light-scattering layer to 45 mJ/m² or less, an effect that coating unevenness of the light-scattering layer hardly occurs can be obtained.

However, an upper layer such as low refractive index layer is further coated on the light-scattering layer and therefore, the leveling agent is preferably dissolved out into the upper layer. The surface energy of the light-scattering layer after the scattering layer is impregnated with the solvent (e.g., methyl ethyl ketone) of the coating solution of the upper layer on the light-scattering layer is preferably rather high. The surface energy here is preferably from 35 to 70 mJ/m².

The fluorine-based leveling agent preferred as the leveling agent for the light-scattering layer is described below. The silicone-based leveling agent is described later.

The fluorine-based leveling agent is preferably a polymer having a fluoroaliphatic group. Furthermore, the useful polymer is a polymer comprising a repeating unit (polymerization unit) corresponding to the monomer of (i) below, or a copolymer of an acrylic or methacrylic resin comprising a repeating unit corresponding to the monomer of (i) below and a repeating unit corresponding to the monomer of (ii) below, with a vinyl-based monomer copolymerizable therewith. As for these monomers, those described in J. Brandrup, *Polymer Handbook*, 2nd ed., Chapter 2, pp. 1-483, Wiley Interscience (1975) may be used.

Examples thereof include compounds having one addition-polymerizable unsaturated bond selected from acrylic acid, methacrylic acid, acrylic acid esters, methacrylic acid esters, acrylamides, methacrylamides, allyl compounds, vinyl ethers and vinyl esters.

(i) Fluoroaliphatic group-containing monomer represented by the following formula 1 Formula 1:

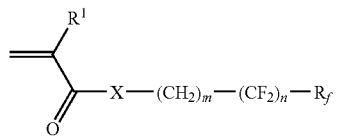

In formula 1, $R^1$ represents a hydrogen atom, a halogen atom or a methyl group, preferably a hydrogen atom or a methyl group. X represents an oxygen atom, a sulfur atom or —N($R^{12}$)—, preferably an oxygen atom or —N($R^{12}$)—, more preferably an oxygen atom. $R^{12}$ represents a hydrogen atom or an alkyl group having a carbon number of 1 to 8 which may have a substituent, more preferably a hydrogen atom or an alkyl group having a carbon number of 1 to 4, still more preferably a hydrogen atom or a methyl group. $R_f$ represents —$CF_3$ or —$CF_2H$.

In formula 1, m represents an integer of 1 to 6, preferably from 1 to 3, more preferably 1.

In formula 1, n represents an integer of 1 to 11, preferably from 1 to 9, more preferably from 1 to 6. $R_f$ is preferably —$CF_2H$.

Also, two or more kinds of polymerization units derived from the fluoroaliphatic group-containing monomer represented by formula 1 may be contained as constituent components in the fluorine-based polymer.

(ii) Monomer represented by the following formula 2, which is copolymerizable with (i) Formula 2:

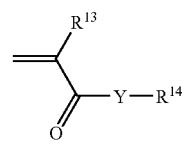

In formula 2, $R^{13}$ represents a hydrogen atom, a halogen atom or a methyl group, preferably a hydrogen atom or a methyl group. Y represents an oxygen atom, a sulfur atom or —N($R^{15}$)—, preferably an oxygen atom or —N($R^{15}$)—, more preferably an oxygen atom. $R^{15}$ represents a hydrogen atom or an alkyl group having a carbon number of 1 to 8, preferably a hydrogen atom or an alkyl group having a carbon number of 1 to 4, more preferably a hydrogen atom or a methyl group.

$R^{14}$ represents a linear, branched or cyclic alkyl group having a carbon number of 1 to 60 which may have a substituent, or an aromatic group (for example, a phenyl group or a naphthyl group) which may have a substituent. The alkyl group may contain a poly(alkyleneoxy) group. $R^{14}$ is preferably a linear, branched or cyclic alkyl group having a carbon number of 1 to 20, more preferably a linear or branched alkyl group having a carbon number of 1 to 10.

The amount of the fluoroaliphatic group-containing monomer of formula 1 used for the production of the preferred fluorine-based polymer is 10 mass % or more, preferably 50 mass % or more, more preferably from 70 to 100 mass %, still more preferably from 80 to 100 mass %, based on the entire monomer amount of the fluorine-based polymer.

Specific structure examples of the preferred fluorine-based polymer are set forth below, but the present invention is not limited thereto.

In the formulae, the numeral indicates a molar ratio of respective monomer components, and Mw indicates a mass average molecular weight.

$$-(CH_2-\underset{\underset{CO_2-CH_2-(CF_2)_n-H}{|}}{\overset{\overset{R}{|}}{C}})_{100}-$$

|       | R    | n  | Mw    |
|-------|------|----|-------|
| FP-1  | H    | 4  | 8000  |
| FP-2  | H    | 4  | 16000 |
| FP-3  | H    | 4  | 33000 |
| FP-4  | CH₃  | 4  | 12000 |
| FP-5  | CH₃  | 4  | 28000 |
| FP-6  | H    | 6  | 8000  |
| FP-7  | H    | 6  | 14000 |
| FP-8  | H    | 6  | 29000 |
| FP-9  | CH₃  | 6  | 10000 |
| FP-10 | CH₃  | 6  | 21000 |
| FP-11 | H    | 8  | 4000  |
| FP-12 | H    | 8  | 16000 |
| FP-13 | H    | 8  | 31000 |
| FP-14 | CH₃  | 8  | 3000  |
| FP-15 | CH₃  | 8  | 10000 |
| FP-16 | CH₃  | 8  | 27000 |
| FP-17 | H    | 10 | 5000  |
| FP-18 | H    | 10 | 11000 |
| FP-19 | CH₃  | 10 | 4500  |
| FP-20 | CH₃  | 10 | 12000 |
| FP-21 | H    | 12 | 5000  |
| FP-22 | H    | 12 | 10000 |
| FP-23 | CH₃  | 12 | 5500  |
| FP-24 | CH₃  | 12 | 12000 |

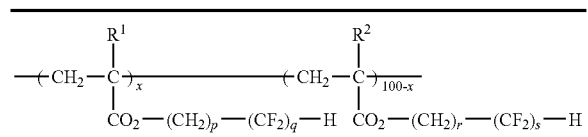

| | x | R¹ | p | q | R² | r | s | Mw |
|---|---|---|---|---|---|---|---|---|
| FP-25 | 50 | H | 1 | 4 | $CH_3$ | 1 | 4 | 10000 |
| FP-26 | 40 | H | 1 | 4 | H | 1 | 6 | 14000 |
| FP-27 | 60 | H | 1 | 4 | $CH_3$ | 1 | 6 | 21000 |
| FP-28 | 10 | H | 1 | 4 | H | 1 | 8 | 11000 |
| FP-29 | 40 | H | 1 | 4 | H | 1 | 8 | 16000 |
| FP-30 | 20 | H | 1 | 4 | $CH_3$ | 1 | 8 | 8000 |
| FP-31 | 10 | $CH_3$ | 1 | 4 | $CH_3$ | 1 | 8 | 7000 |
| FP-32 | 50 | H | 1 | 6 | $CH_3$ | 1 | 6 | 12000 |
| FP-33 | 50 | H | 1 | 6 | $CH_3$ | 1 | 6 | 22000 |
| FP-34 | 30 | H | 1 | 6 | $CH_3$ | 1 | 6 | 5000 |
| FP-35 | 40 | $CH_3$ | 1 | 6 | H | 3 | 6 | 8000 |
| FP-36 | 10 | H | 1 | 6 | H | 1 | 8 | 7000 |
| FP-37 | 30 | H | 1 | 6 | H | 1 | 8 | 17000 |
| FP-38 | 50 | H | 1 | 6 | H | 1 | 8 | 16000 |
| FP-39 | 50 | $CH_3$ | 1 | 6 | H | 3 | 8 | 19000 |
| FP-40 | 50 | H | 1 | 8 | $CH_3$ | 1 | 8 | 5000 |
| FP-41 | 80 | H | 1 | 8 | $CH_3$ | 1 | 8 | 10000 |
| FP-42 | 50 | $CH_3$ | 1 | 8 | H | 3 | 8 | 14000 |
| FP-43 | 90 | H | 1 | 8 | $CH_3$ | 3 | 8 | 9000 |
| FP-44 | 70 | H | 1 | 8 | H | 1 | 10 | 7000 |
| FP-45 | 90 | H | 1 | 8 | H | 3 | 10 | 12000 |
| FP-46 | 50 | H | 1 | 8 | H | 1 | 12 | 10000 |
| FP-47 | 70 | H | 1 | 8 | $CH_3$ | 3 | 12 | 8000 |

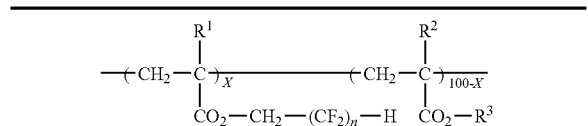

| | x | R¹ | n | R² | R³ | Mw |
|---|---|---|---|---|---|---|
| FP-48 | 90 | H | 6 | H | $C_2H_5$ | 9000 |
| FP-49 | 80 | H | 6 | H | $C_2H_5$ | 24000 |
| FP-50 | 60 | H | 6 | H | $C_2H_5$ | 36000 |
| FP-51 | 90 | H | 6 | H | $C_4H_9$ (n) | 15000 |
| FP-52 | 80 | H | 6 | H | $C_4H_9$ (n) | 17000 |
| FP-53 | 60 | H | 6 | H | $C_4H_9$ (n) | 10000 |
| FP-54 | 90 | H | 6 | H | $C_4H_9$ (iso) | 16000 |
| FP-55 | 80 | H | 6 | H | $C_4H_9$ (iso) | 18000 |
| FP-56 | 60 | H | 6 | H | $C_4H_9$ (iso) | 21000 |
| FP-57 | 90 | H | 6 | H | $C_4H_9$ (t) | 14000 |
| FP-58 | 80 | H | 6 | H | $C_4H_9$ (t) | 12000 |
| FP-59 | 60 | H | 6 | H | $C_4H_9$ (t) | 13000 |
| FP-60 | 90 | H | 6 | H | $C_6H_{13}$ (n) | 10000 |
| FP-61 | 80 | H | 6 | H | $C_6H_{13}$ (n) | 8000 |
| FP-62 | 60 | H | 6 | H | $C_6H_{13}$ (n) | 12000 |
| FP-63 | 80 | H | 4 | H | $C_2H_5$ | 25000 |
| FP-64 | 80 | H | 4 | H | $C_4H_9$ (n) | 32000 |
| FP-65 | 80 | H | 4 | H | $C_4H_9$ (iso) | 28000 |
| FP-66 | 80 | H | 4 | H | $C_4H_9$ (t) | 25000 |
| FP-67 | 80 | H | 4 | H | $C_6H_{13}$ (n) | 20000 |
| FP-68 | 80 | H | 8 | H | $C_2H_5$ | 5000 |
| FP-69 | 80 | H | 8 | H | $C_4H_9$ (n) | 6000 |
| FP-70 | 80 | H | 8 | H | $C_4H_9$ (iso) | 5000 |
| FP-71 | 80 | H | 8 | H | $C_4H_9$ (t) | 7000 |
| FP-72 | 80 | H | 8 | H | $C_6H_{13}$ (n) | 5000 |
| FP-78 | 80 | H | 4 | $CH_3$ | $C_2H_5$ | 12000 |
| FP-79 | 80 | H | 4 | $CH_3$ | $C_4H_9$ (n) | 14000 |
| FP-80 | 80 | H | 4 | $CH_3$ | $C_4H_9$ (iso) | 20000 |
| FP-81 | 80 | H | 4 | $CH_3$ | $C_4H_9$ (t) | 22000 |
| FP-82 | 80 | H | 4 | $CH_3$ | $C_6H_{13}$ (n) | 18000 |
| FP-83 | 80 | $CH_3$ | 4 | $CH_3$ | $C_2H_5$ | 6000 |
| FP-84 | 80 | $CH_3$ | 4 | $CH_3$ | $C_4H_9$ (n) | 8000 |
| FP-85 | 80 | $CH_3$ | 4 | $CH_3$ | $C_4H_9$ (iso) | 7000 |

-continued

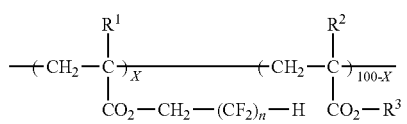

| | x | R¹ | n | R² | R³ | Mw |
|---|---|---|---|---|---|---|
| FP-86 | 80 | $CH_3$ | 4 | $CH_3$ | $C_4H_9$ (t) | 12000 |
| FP-87 | 80 | $CH_3$ | 4 | CH3 | C6H13 (n) | 5000 |

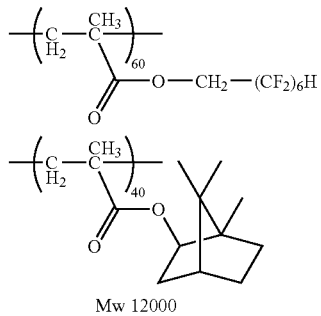

SP-1

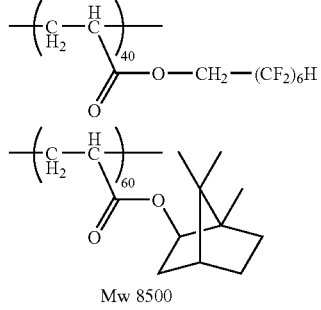

SP-2

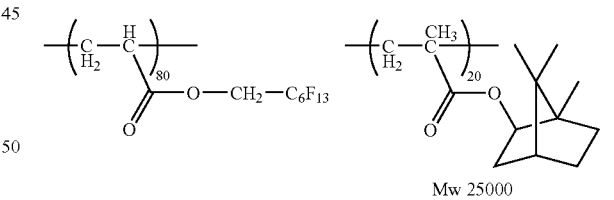

SP-3

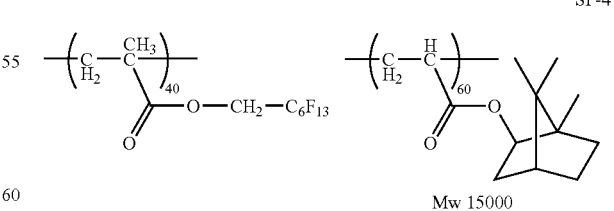

SP-4

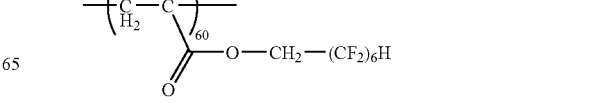

SP-5

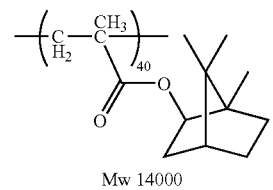
Mw 14000
SP-6
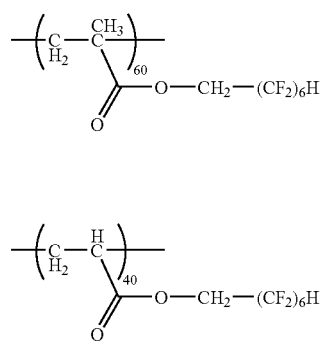
Mw 12000
Mw 15000 SP-7
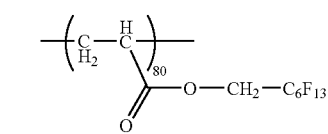
SP-8
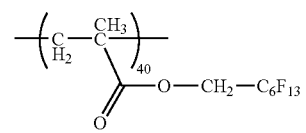
Mw 25000
SP-9
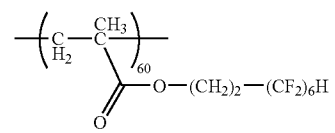
Mw 17000
SP-10
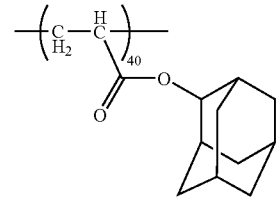
Mw 14000
SP-11
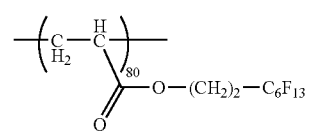
Mw 39000
SP-12
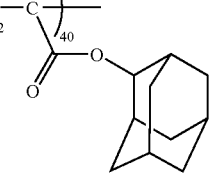
Mw 4500
SP-13
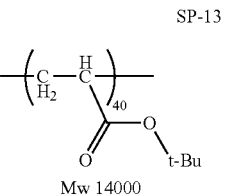
Mw 14000
SP-14
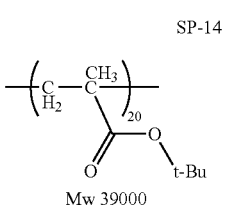
Mw 39000
SP-15
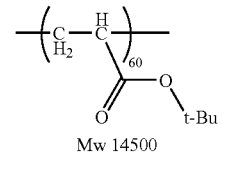
Mw 14500
SP-16
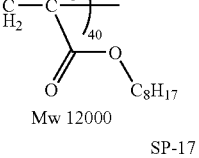
Mw 12000
SP-17
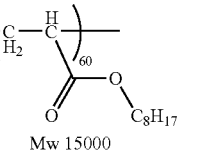
Mw 15000
SP-18
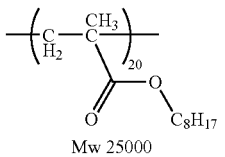
Mw 25000
SP-19

-continued

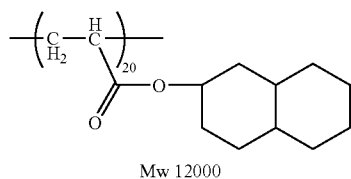
Mw 12000

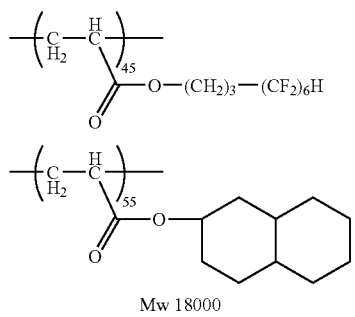
Mw 18000

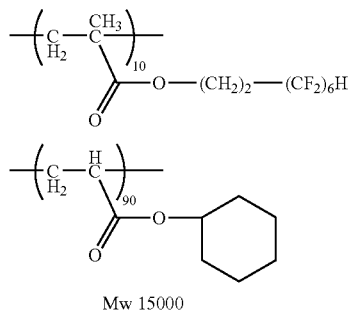
Mw 15000

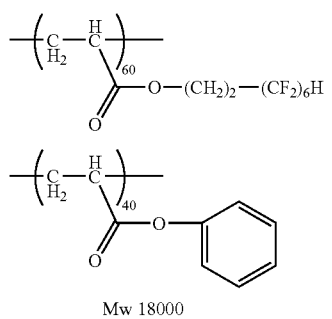
Mw 18000

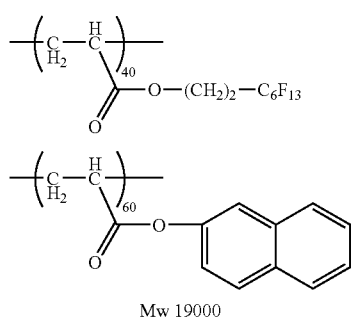
Mw 19000

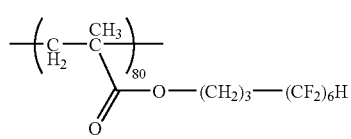

SP-20

SP-21

SP-22

SP-23

SP-24

-continued

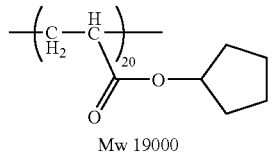
Mw 19000

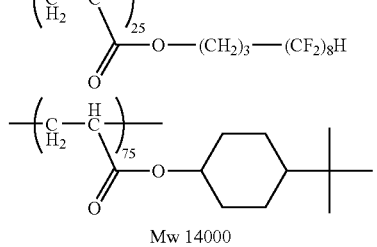
Mw 14000

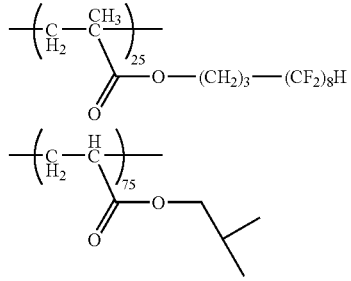
Mw 18000

SP-25

SP-26

The amount of the polymerization unit of the fluoro-aliphatic group-containing monomer constituting the fluorine-based polymer is preferably in excess of 10 mass %, more preferably from 50 to 100 mass %, and most preferably from 75 to 100 mass % when it is important to prevent unevenness of the light-scattering layer, or most preferably from 50 to 75 mass % when a low refractive index layer is coated on the light-scattering layer (the amount is based on all polymerization units constituting the fluorine-based polymer).

The silicone-based leveling agent is described. Examples of the silicone-based leveling agent include a polydimethylsiloxane modified at the side or main chain terminal with various substituents such as oligomer (e.g., ethylene glycol, propylene glycol), and examples thereof include KF-96 and X-22-945 produced by Shin-Etsu Chemical Co., Ltd.

In addition, a nonionic surfactant having a hydrophobic group composed of dimethylpolysiloxane and a hydrophilic group composed of polyoxyalkylene can also be preferably used.

Specific examples of this nonionic surfactant include SILWET L-77, L-720, L-7001, L-7002, L-7604, Y-7006, FZ-2101, FZ-2104, FZ-2105, FZ-2110, FZ-2118, FZ-2120, FZ-2122, FZ-2123, FZ-2130, FZ-2154, FZ-2161, FZ-2162, FZ-2163, FZ-2164, FZ-2166 and FZ-2191, and SUPERSILWET SS-2801, SS-2802, SS-2803, SS-2804 and SS-2805, produced by Nippon Unicar Co., Ltd.

As for the preferred structure of the nonionic surfactant having a hydrophobic group composed of dimethylpolysiloxane and a hydrophilic group composed of polyoxyalkylene, a linear block copolymer where the dimethylpolysiloxane structure moiety and the polyoxyalkylene chain are alternately and repeatedly bonded is preferred, and this is described in JP-A-6-49486.

Specific examples thereof include ABN SILWET FZ-2203, FZ-2207 and FZ-2208 produced by Nippon Unicar Co., Ltd.

The amount of the fluorine-based leveling agent or silicone-based leveling agent added to the coating solution is preferably from 0.001 to 1.0 mass %, more preferably from 0.01 to 0.2 mass %.

Also, at the coating of the light-scattering layer, the surface tension of the coating solution is reduced by using the fluorine-based leveling agent or silicone-based leveling agent to enhance the surface state uniformity and maintain the high productivity by high-speed coating and after the coating of the light-scattering layer, the reduction of the surface free energy is prevented by applying a surface treatment such as corona treatment, UV treatment, heat treatment, saponification treatment or solvent treatment, preferably a corona treatment, to control the surface energy of the light-scattering layer before coating of the low refractive index layer to fall within the above-described range, whereby the purpose can be achieved.

The mass average (weight average) molecular weight of the fluorine-based polymer is preferably from 3,000 to 100,000, more preferably from 5,000 to 80,000.

The amount of the fluorine-based polymer added is preferably from 0.001 to 5 mass %, more preferably from 0.005 to 3 mass %, still more preferably from 0.01 to 1 mass %, based on the coating solution. If the amount of the fluorine-based polymer added is less than 0.001 mass %, a sufficiently high effect cannot be obtained, whereas if it exceeds 5 mass %, the coating film cannot be satisfactorily dried and this may adversely affect the performance (e.g., reflectance, scratch resistance) as the coating film.

In the film of the present invention, a thickening agent may be used for adjusting the viscosity of the coating solution.

The thickening agent as used herein means a substance capable of increasing the viscosity of a solution when added. The increment of viscosity of the coating solution, which is brought about by the addition, is preferably from 1 to 50 cP, more preferably from 3 to 20 cP, and most preferably from 5 to 10 cP.

Examples of the thickening agent include, but are not limited to, the followings:

poly-ε-caprolactone,
poly-ε-caprolactone diol,
poly-ε-caprolactone triol,
polyvinyl acetate,
poly(ethylene adipate),
poly(1,4-butylene adipate),
poly(1,4-butylene glutarate),
poly(1,4-butylene succinate),
poly(1,4-butylene terephthalate),
poly(ethylene terephthalate),
poly(2-methyl-1,3-propylene adipate),
poly(2-methyl-1,3-propylene glutarate),
poly(neopentyl glycol adipate),
poly(neopentyl glycol sebacate),
poly(1,3-propylene adipate),
poly(1,3-propylene glutarate),
polyvinylbutyral,
polyvinylformal,
polyvinylacetal,
polyvinylpropanal,
polyvinylhexanal,
polyvinylpyrrolidone,
polyacrylic acid ester,
polymethacrylic acid ester,
polystyrene
cellulose acetate,
cellulose propionate, and
cellulose acetate butyrate.

Other than these, a known viscosity adjusting agent or thixotropy imparting agent may be used, and examples thereof include a layered compound (e.g., smectite, mica, bentonite, silica montmorillonite) and a sodium polyacrylate described in JP-A-8-325491; and an ethyl cellulose, a polyacrylic acid and an organic clay describe in JP-A-10-219136. As for the thixotropy imparting agent, those obtained by organic-treating a layered compound having a particle diameter of 0.3 μm or less are preferred. A layered compound having a particle diameter of 0.1 μm or less is more preferred. For the particle diameter of the layered compound, the length of the long axis can be used. Usually, the amount of the compound is preferably on the order of 1 to 10 parts by mass per 100 parts by mass of the ultraviolet-curable resin.

The light-scattering layer of the present invention is wet-coated directly on a transparent support in many cases and therefor, the solvent used for the coating composition is an important factor. The properties required of the solvent are to satisfactorily dissolve various solutes such as light-transmitting resin, not to dissolve the light-transmitting particle, and to less cause coating unevenness or drying unevenness in the process from coating to drying. Also, for example, not to dissolve the support (necessary for preventing troubles such as worsening planarity or whitening) or conversely, to swell the support to a minimum extent (necessary for adhesion) is a preferred property. One kind of a solvent may be used, but it is preferred to adjust the swelling property of support, the solubility of material, the drying property, the aggregation of particle, and the like by using two or more kinds of solvents.

Specific preferred examples of the solvent include various ketones (e.g., methyl ethyl ketone, acetone, methyl isobutyl ketone, cyclohexanone) and various cellosolves (e.g., ethyl cellosolve, butyl cellosolve, propylene glycol monomethyl ether). Other preferred examples include various alcohols (e.g., propylene glycol, ethylene glycol, ethanol, methanol, isopropanol, 1-butanol, 2-butanol) and toluene.

In the case of using a triacetyl cellulose for the support, specific preferred examples of the main solvent include various ketones (e.g., methyl ethyl ketone, acetone, methyl isobutyl ketone, cyclohexanone) and various cellosolves (e.g., ethyl cellosolve, butyl cellosolve, propylene glycol monomethyl ether) and toluene. When a small amount of a solvent having a hydroxyl group is added to the main solvent selected from those above, the antiglare can be adjusted and this is preferred. The small-amount solvent having a hydroxyl group can increase the antiglare property by remaining later than the main solvent in the step of drying the coating composition and therefore, the vapor pressure of the small-amount solvent is preferably low as compared with the main solvent at an arbitrary temperature in the range from 20 to 30° C. One preferred example is a combination of methyl isobutyl ketone (vapor pressure at 21.7° C.: 16.5 mmHg) as the main solvent and propylene glycol (vapor pressure at 20.0° C.: 0.08 mmHg) as the small-amount solvent having a hydroxyl group. As for the mixing ratio of the main solvent and the small-amount solvent having a hydroxyl group, the former:latter in terms of the mass ratio is preferably from 99:1 to 50:50, more preferably from 95:5 to 70:30. Within this range, the coating solution can have good stability. In the case of using three or more kinds of solvents, the ratio (amount of solvent in a largest amount): (total of other solvents) is preferably in the above-described range.

When a small amount of a solvent having high swelling property is added to the main solvent having low swelling property for the transparent support selected from the above-described solvents, the adhesion to the transparent support can be enhanced without deteriorating other performances or surface state. Specifically, when methyl isobutyl ketone or toluene is used as the main solvent, examples of the small-amount solvent which can be used include methyl ethyl ketone, acetone, cyclohexanone, propylene glycol, ethylene glycol, ethanol, methanol, isopropanol alcohol, 1-butanol and 2-butanol. It is particularly preferred to use methyl isobutyl ketone or toluene as the main solvent and use methyl ethyl ketone or cyclohexanone as the small-amount solvent. Also, propylene glycol, ethylene glycol, ethanol, methanol, isopropyl alcohol, 1-butanol, 2-butanol or the like may be added so as to control the hydrophilicity of the solvent, and propylene glycol or ethylene glycol can be preferably used.

The mixing ratio between the main solvent and the small-amount solvent is, in terms of the weight ratio, preferably from 99:1 to 50:50, more preferably from 95:5 to 60:40. Within this range, the surface quality can be prevented from fluctuating in the drying step after coating. In the case of using three or more kinds of solvents, the ratio (amount of solvent in a largest amount):(total of other solvents) is preferably in the above-described range.

(Low Refractive Index Layer)

The low refractive index layer for use in the present invention is preferably formed by coating a composition having heat curability and/or photocurability and mainly comprising a fluorine-containing compound containing a fluorine atom in the range from 35 to 80 mass % and containing a crosslinking or polymerizable functional group.

The low refractive index layer is a cured film formed by coating, drying and curing, for example, a curable composition comprising a fluorine-containing compound as a main component.

The curable composition used for the formation of the low refractive index layer preferably contains at least two members out of (A) a fluorine-containing compound, (B) an inorganic fine particle and (C) an organosilane compound, more preferably contains all of these three members. As for the fluorine-containing compound, a fluorine-containing monomer, oligomer or polymer having a low refractive index, or a fluorine-containing sol-gel material is preferably used. The fluorine-containing monomer, oligomer or polymer or the fluorine-containing sol-gel material is preferably a material capable of forming a low refractive index layer through crosslinking by the effect of heat or ionizing radiation such that the surface has a dynamic friction coefficient of 0.03 to 0.30 and a contact angle with water of 85 to 120°.

The materials forming the low refractive index layer are described below.

<Fluorine-Containing Polymer for Low Refractive Index Layer>

The fluorine-containing polymer is preferably a polymer undergoing crosslinking by the effect of heat or ionizing radiation, because the productivity is enhanced, for example, in the case of coating and curing the coating solution on a roll film while transporting the film as a web.

Also, when the light-scattering film of the present invention is applied to an image display, as the peel force with a commercially available adhesive tape is lower, a seal or memo attached can be more easily peeled off. Therefore, the peel force is preferably 500 gf (4.9N) or less, more preferably 300 gf (2.9N) or less, and most preferably 100 gf (0.98N) or less. Furthermore, as the surface hardness measured by a micro-hardness tester is higher, the light-scattering film is less scratched. Therefore, the surface hardness is preferably 0.3 GPa or more, more preferably 0.5 GPa or more.

The fluorine-containing polymer for use in the low refractive index layer is preferably a fluorine-containing polymer containing a fluorine atom in the range from 35 to 80 mass % and containing a crosslinking or polymerizable functional group, and examples thereof include a hydrolysate or dehydration-condensate of a perfluoroalkyl group-containing silane compound (e.g., (heptadecafluoro-1,1,2,2-tetrahydrodecyl)triethoxysilane), and a fluorine-containing copolymer having a fluorine-containing monomer unit and a crosslinking reactive unit as the constituent units. In the case of a fluorine-containing copolymer, the main chain preferably comprises only a carbon atom. In other words, an oxygen atom, a nitrogen atom or the like is preferably not present in the main chain skeleton.

Specific examples of the fluorine-containing monomer unit include fluoroolefins (e.g., fluoroethylene, vinylidene fluoride, tetrafluoroethylene, perfluorooctyl ethylene, hexafluoropropylene, perfluoro-2,2-dimethyl-1,3-dioxol), partially or completely fluorinated alkyl ester derivatives of (meth)acrylic acid (e.g., BISCOTE 6FM (produced by Osaka Organic Chemical Industry Ltd.), M-2020 (produced by Daikin Industries, Ltd.)), and completely or partially fluorinated vinyl ethers. Among these, perfluoroolefins are preferred and in view of refractive index, solubility, transparency and easy availability, hexafluoropropylene is more preferred.

Examples of the crosslinking reactive unit include a constituent unit obtained by the polymerization of a monomer previously having a self-crosslinking functional group within the molecule, such as glycidyl (meth)acrylate and glycidyl vinyl ether; and a constituent unit which is obtained by the polymerization of a monomer having a carboxyl group, a hydroxy group, an amino group, a sulfo group or the like (a monomer such as (meth)acrylic acid, methylol (meth)acrylate, hydroxyalkyl (meth)acrylate, allyl acrylate, hydroxyethyl vinyl ether, hydroxybutyl vinyl ether, maleic acid and crotonic acid) and into which a crosslinking reactive group such as (meth)acryloyl group is introduced by a polymer reaction (the crosslinking reactive group can be introduced, for example, by causing an acrylic acid chloride to act on a hydroxy group).

In addition to those fluorine-containing monomer unit and crosslinking reactive unit, in view of solubility in solvent, transparency of film or the like, a monomer not containing a fluorine atom may also be appropriately copolymerized to introduce another polymerization unit. The monomer unit which can be used in combination is not particularly limited, and examples thereof include olefins (e.g., ethylene, propylene, isoprene, vinyl chloride, vinylidene chloride), acrylic acid esters (e.g., methyl acrylate, methyl acrylate, ethyl acrylate, 2-ethylhexyl acrylate), methacrylic acid esters (e.g., methyl methacrylate, ethyl methacrylate, butyl methacrylate, ethylene glycol dimethacrylate), styrene derivatives (e.g., styrene, divinylbenzene, vinyltoluene, α-methylstyrene), vinyl ethers (e.g., methyl vinyl ether, ethyl vinyl ether, cyclohexyl vinyl ether), vinyl esters (e.g., vinyl acetate, vinyl propionate, vinyl cinnamate), acrylamides (e.g., N-tert-butylacrylamide, N-cyclohexylacrylamide), methacrylamides and acrylonitrile derivatives.

With this fluorine-containing polymer, a curing agent may be appropriately used in combination as described in JP-A-10-25388 and JP-A-10-147739.

The fluorine-containing polymer particularly useful in the present invention is a random copolymer of a perfluoroolefin and a vinyl ether or ester. In particular, the fluorine-containing polymer preferably has a self-crosslinking reactive group (for example, a radical reactive group such as (meth)acryloyl group, or a ring-opening polymerizable group such as epoxy group and oxetanyl group).

The crosslinking reactive group-containing polymerization unit preferably occupies from 5 to 70 mol %, more preferably from 30 to 60 mol %, in all polymerization units of the polymer.

The preferred embodiment of the fluorine-containing polymer for the low refractive index layer used in the present invention includes a copolymer represented by formula L-1:

Formula L-1:

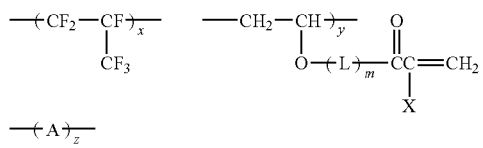

In formula L-1, L represents a linking group having a carbon number of 1 to 10, preferably from 1 to 6, more preferably from 2 to 4, which may have a linear, branched or cyclic structure and may contain a heteroatom selected from O, N and S.

Preferred examples thereof include *—(CH$_2$)$_2$—O—**, *—(CH$_2$)$_2$—NH—**, *—(CH$_2$)$_4$—O—**, *—(CH$_2$)$_6$—O—**, *—(CH$_2$)$_2$—O—(CH$_2$)$_2$—**, *—CONH—(CH$_2$)$_3$—O—**, *—CH$_2$CH(OH)CH$_2$—O—** and *—CH$_2$CH$_2$OCONH(CH$_2$)$_3$—O—** (wherein * denotes a linking site on the polymer main chain side and ** denotes a linking site on the (meth)acryloyl group side). m represents 0 or 1.

In formula L-1, X represents a hydrogen atom or a methyl group and in view of curing reactivity, preferably a hydrogen atom.

In formula L-1, A represents a repeating unit derived from an arbitrary vinyl monomer. The repeating unit is not particularly limited as long as it is a constituent component of a monomer copolymerizable with hexafluoropropylene, and may be appropriately selected from various viewpoints such as adhesion to substrate, Tg (contributing to film hardness) of polymer, solubility in solvent, transparency, slipperiness and dust-protecting/antifouling property. The repeating unit may comprise a single vinyl monomer or a plurality of vinyl monomers according to the purpose.

Preferred examples of A include vinyl ethers such as methyl vinyl ether, ethyl vinyl ether, tert-butyl vinyl ether, cyclohexyl vinyl ether, isopropyl vinyl ether, hydroxyethyl vinyl ether, hydroxybutyl vinyl ether, glycidyl vinyl ether and allyl vinyl ether; vinyl esters such as vinyl acetate, vinyl propionate and vinyl butyrate; (meth)acrylates such as methyl (meth)acrylate, ethyl(meth)acrylate, hydroxyethyl(meth) acrylate, glycidyl methacrylate, allyl(meth)acrylate and (meth)acryloyloxypropyltrimethoxysilane; styrene derivatives such as styrene and p-hydroxymethylstyrene; and unsaturated carboxylic acids and derivatives thereof, such as crotonic acid, maleic acid and itaconic acid. Among these, vinyl ether derivatives and vinyl ester derivatives are preferred, and vinyl ether derivatives are more preferred.

x, y and z represent mol % of respective constituent components and are preferably 30≦x≦60, 5≦y≦70 and 0≦z≦65, more preferably 35≦x≦55, 30≦y≦60 and 0≦z≦20, still more preferably 40≦x≦55, 40≦y≦55 and 0≦z≦10, with the proviso that x+y+z=100. Formula L-1 in the present invention is preferably formula L-2.

Formula L-2:

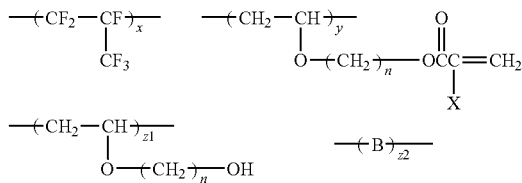

In formula L-2, X has the same meaning as in formula 1 and the preferred range is also the same. n represents an integer of 2≦n≦10, preferably 2≦n≦6, more preferably 2≦n≦4.

B represents a repeating unit derived from an arbitrary vinyl monomer and may comprise a single composition or a plurality of compositions. Examples thereof include those described above as examples of A in formula L-1.

x, y, z1 and z2 represent mol % of respective repeating units. x and y preferably satisfy 30≦x≦60 and 5≦y≦70, more preferably 35≦x≦55 and 30≦y≦60, still more preferably 40≦x≦55 and 40≦y≦55, and z1 and z2 preferably satisfy 0≦z1≦65 and 0≦z2≦65, more preferably 0≦z1≦30 and 0≦z2≦10, still more preferably 0≦z1≦10 and 0≦z2≦5, with the proviso that x+y+z1+z2=100.

The copolymer represented by formula L-1 or L-2 can be synthesized, for example, by introducing a (meth)acryloyl group into a copolymer comprising a hexafluoropropylene component and a hydroxyalkyl vinyl ether component by any one method described above. The reprecipitation solvent used here is preferably isopropanol, hexane, methanol or the like.

Specific preferred examples of the copolymers represented by formulae L-1 and L-2 include those described in JP-A-2004-45462, paragraphs (0035) to (0047), and the copolymers can be synthesized by the method described in this patent publication.

<Inorganic Fine Particle for Low Refractive Index Layer>

The blending amount of the inorganic fine particle is preferably from 1 to 100 mg/m$^2$, more preferably from 5 to 80 mg/m$^2$, still more preferably from 10 to 60 mg/m$^2$. If the blending amount is too small, the effect of improving the scratch resistance decreases, whereas if it is excessively large, fine irregularities are generated on the low refractive index layer surface and the appearance (e.g., real black) or the integrated reflectance may deteriorate. Therefore, the blending amount is preferably in the above-described range.

The inorganic fine particle is incorporated into the low refractive index layer and therefore, preferably has a low refractive index. Examples thereof include fine particles of magnesium fluoride and silica. Among these, a silica fine particle is preferred in view of refractive index, dispersion stability and cost.

The average particle diameter of the inorganic fine particle is, for example, from 10 to 100%, preferably from 30 to 100%, more preferably from 35 to 80%, still more preferably from 40 to 60%, of the thickness of the low refractive index layer. In other words, when the thickness of the low refractive index layer is 100 nm, the particle diameter of the silica fine particle is preferably from 30 to 100 nm, more preferably from 35 to 80 nm, still more preferably from 40 to 60 nm.

If the particle diameter of the inorganic fine particle is too small, the effect of improving the scratch resistance decreases, whereas if it is excessively large, fine irregularities are generated on the low refractive index layer surface and the appearance (e.g., real black) or integrated reflectance may be deteriorated. Therefore, the particle diameter is preferably in the above-described range. The inorganic fine particle may be either crystalline or amorphous and may be a monodisperse particle or may be even an aggregated particle as long as the predetermined particle diameter is satisfied. The shape is most preferably spherical but even if infinite form, there arises no problem.

The average particle diameter of the inorganic fine particle is measured by a Coulter counter.

In order to satisfy both reflection and bright-room contrast, which is the effect of the present invention, the refractive index must be controlled to fall in the above-described range and the inorganic fine particle preferably has a hollow structure. Also, the refractive index of the inorganic fine particle is preferably from 1.17 to 1.40, more preferably from 1.17 to 1.35, still more preferably from 1.17 to 1.32. The refractive index used here indicates a refractive index of the particle as a whole and does not indicate a refractive index of only the inorganic outer shell in the case of an inorganic fine particle having a hollow structure. At this time, assuming that the radius of the cavity inside the particle is a and the radius of the outer shell of the particle is b, the porosity x represented by the following mathematical formula (II) is preferably from 10 to 60%, more preferably from 20 to 60%, and most preferably from 30 to 60%.

$$x=(4\pi a^3/3)/(4\pi b^3/3)\times 100 \qquad \text{Mathematical formula (II):}$$

If the hollow inorganic fine particle is intended to have a lower refractive index and a higher porosity, the thickness of the outer shell becomes small and the strength as a particle decreases. Therefore, in view of scratch resistance, a particle having a refractive index of less than 1.17 is not preferred. Here, the refractive index of the inorganic fine particle can be measured by an Abbe refractometer (manufactured by ATAGO K.K.).

In order to satisfy both reflection and bright-room contrast, which is the effect of the present invention, the refractive index of the low refractive index layer is preferably set to the above-described range by controlling the content of the hollow inorganic fine particle. The amount of the inorganic fine particle is preferably from 20 to 60 mass %, more preferably from 30 to 55 mass %, still more preferably from 35 to 50 mass %, based on the entire solid content of the low refractive index layer. If the amount of the hollow inorganic fine particle is excessively large, the film becomes weak, whereas if it is too small, the refractive index cannot be satisfactorily decreased.

At least one kind of an inorganic fine particle having an average particle diameter of less than 25% of the thickness of the low refractive index layer (hereinafter, referred to as a "small-size inorganic fine particle") may be used in combination with the inorganic fine particle having a particle diameter within the preferred range described above (hereinafter, referred to as a "large-size inorganic fine particle").

The small-size inorganic fine particle can be present in a gap between large-size inorganic fine particles and therefore, can contribute as a holding agent for the large-size inorganic fine particle.

When the thickness of the low refractive index layer is 100 nm, the average particle diameter of the small-size inorganic fine particle is preferably from 1 to 20 nm, more preferably from 5 to 15 nm, still more preferably from 8 to 15 nm. Use of such an inorganic fine particle is preferred in view of the raw material cost and the holding agent effect.

The inorganic fine particle may be subjected to a physical surface treatment such as plasma discharge treatment and corona discharge treatment, or a chemical surface treatment with a surfactant, a coupling agent or the like, so as to stabilize the dispersion in a liquid dispersion or a coating solution or to enhance the affinity for or the binding property with a binder component. Use of a coupling agent is particularly preferred. As for the coupling agent, an alkoxy metal compound (e.g., titanium coupling agent, silane coupling agent) is preferably used. Among these treatments, a silane coupling treatment is preferred.

The coupling agent is used as a surface treating agent for previously applying a surface treatment to the inorganic fine particle of the low refractive index layer before the coating solution for the layer is prepared, but the coupling agent is preferably further added as an additive at the preparation of the coating solution for the low refractive index layer and incorporated into the layer.

The inorganic fine particle is preferably dispersed in a medium in advance of the surface treatment so as to reduce the load of the surface treatment.

<Organosilane Compound for Low Refractive Index Layer>

In view of scratch resistance, particularly in view of satisfying both antireflection ability and scratch resistance, the curable composition preferably contains at least one species selected from an organosilane compound, a hydrolysate of the organosilane, and a partial condensate of the hydrolysate of organosilane (hereinafter, the obtained reaction solution is sometimes referred to as a "sol component").

This component is condensed to form a cured product during drying and heating after coating of the curable composition and functions as a binder of the layer. In the present invention, the above-described fluorine-containing polymer is used as the fluorine-containing compound and therefore, a binder having a three-dimensional structure is formed by the irradiation of actinic rays.

The organosilane compound is preferably represented by the following formula (1):

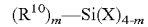 Formula (1):

In formula (1), $R^{10}$ represents a substituted or unsubstituted alkyl group or a substituted or unsubstituted aryl group. Examples of the alkyl group include methyl, ethyl, propyl, isopropyl, hexyl, decyl and hexadecyl. The alkyl group is preferably an alkyl group having a carbon number of 1 to 30, more preferably from 1 to 16, still more preferably from 1 to 6. Examples of the aryl group include phenyl and naphthyl, with a phenyl group being preferred.

X represents a hydroxyl group or a hydrolyzable group such as an alkoxy group (preferably an alkoxy group having a carbon number of 1 to 5, e.g., methoxy, ethoxy), a halogen atom (e.g., Cl, Br, I) and a group represented by $R^2COO$ (wherein $R^2$ is preferably a hydrogen atom or an alkyl group having a carbon number of 1 to 5, e.g., $CH_3COO$, $C_2H_5COO$), preferably an alkoxy group, more preferably a methoxy group or an ethoxy group. m represents an integer of 1 to 3, preferably 1 or 2, more preferably 1.

When a plurality of $R^{10}$s or Xs are present, the plurality of $R^{10}$s or Xs may be the same or different.

The substituent contained in $R^{10}$ is not particularly limited, but examples thereof include a halogen atom (e.g., fluorine, chlorine, bromine), a hydroxyl group, a mercapto group, a carboxyl group, an epoxy group, an alkyl group (e.g., methyl, ethyl, i-propyl, propyl, tert-butyl), an aryl group (e.g., phenyl, naphthyl), an aromatic heterocyclic group (e.g., furyl, pyrazolyl, pyridyl), an alkoxy group (e.g., methoxy, ethoxy, i-propoxy, hexyloxy), an aryloxy group (e.g., phenoxy), an alkylthio group (e.g., methylthio, ethylthio), an arylthio group (e.g., phenylthio), an alkenyl group (e.g., vinyl, 1-propenyl), an acyloxy group (e.g., acetoxy, acryloyloxy, methacryloyloxy), an alkoxycarbonyl group (e.g., methoxycarbonyl, ethoxycarbonyl), an aryloxycarbonyl group (e.g., phenoxycarbonyl), a carbamoyl group (e.g., carbamoyl, N-methylcarbamoyl, N,N-dimethylcarbamoyl, N-methyl-N-octylcarbamoyl) and an acylamino group (e.g., acetylamino, benzoylamino, acrylamino, methacrylamino). These substituents each may be further substituted.

When a plurality of $R^{10}$s are present, at least one is preferably a substituted alkyl group or a substituted aryl group. Among the organosilane compounds represented by formula (1), an organosilane compound having a vinyl polymerizable substituent represented by the following formula (2) is preferred.

Formula (2):

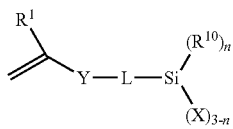

In formula (2), $R^1$ represents a hydrogen atom, a methyl group, a methoxy group, an alkoxycarbonyl group, a cyano group, a fluorine atom or a chlorine atom. Examples of the alkoxycarbonyl group include a methoxycarbonyl group and an ethoxycarbonyl group. $R^1$ is preferably a hydrogen atom, a methyl group, a methoxy group, a methoxycarbonyl group, a cyano group, a fluorine atom or a chlorine atom, more preferably a hydrogen atom, a methyl group, a methoxycarbonyl group, a fluorine atom or a chlorine atom, still more preferably a hydrogen atom or a methyl group.

Y represents a single bond, *—COO—**, *—CONH—** or *—O—**, preferably a single bond, *—COO—** or *—CONH—**, more preferably a single bond or *—COO—**, still more preferably *—COO—**. * denotes the position bonded to =C($R^1$)— and ** denotes the position bonded to L.

L represents a divalent linking chain. Specific examples thereof include a substituted or unsubstituted alkylene group, a substituted or unsubstituted arylene group, a substituted or unsubstituted alkylene group having in the inside thereof a linking group (e.g., ether, ester, amido), and a substituted or unsubstituted arylene group having in the inside thereof a linking group. L is preferably a substituted or unsubstituted alkylene group, a substituted or unsubstituted arylene group or an alkylene group having in the inside thereof a linking group, more preferably an unsubstituted alkylene group, an unsubstituted arylene group or an alkylene group having in the inside thereof an ether or ester linking group, still more preferably an unsubstituted alkylene group or an alkylene group having in the inside thereof an ether or ester linking group. Examples of the substituent include a halogen, a hydroxyl group, a mercapto group, a carboxyl group, an epoxy group, an alkyl group and an aryl group. These substituents each may be further substituted.

n represents 0 or 1. When a plurality of Xs are present, the plurality of Xs may be the same or different. n is preferably 0.

$R^{10}$ has the same meaning as in formula (1) and is preferably a substituted or unsubstituted alkyl group or an unsubstituted aryl group, more preferably an unsubstituted alkyl group or an unsubstituted aryl group.

X has the same meaning as in formula (1) and is preferably a halogen atom, a hydroxyl group or an unsubstituted alkoxy group, more preferably a chlorine atom, a hydroxyl group or an unsubstituted alkoxy group having a carbon number of 1 to 6, still more preferably a hydroxyl group or an alkoxy having a carbon number of 1 to 3, yet still more preferably a methoxy group.

(0145)

The compounds represented by formulae (1) and (2) may be used in combination of two or more thereof. Specific examples of the compounds represented by formulae (1) and (2) are set forth below, but the present invention is not limited thereto.

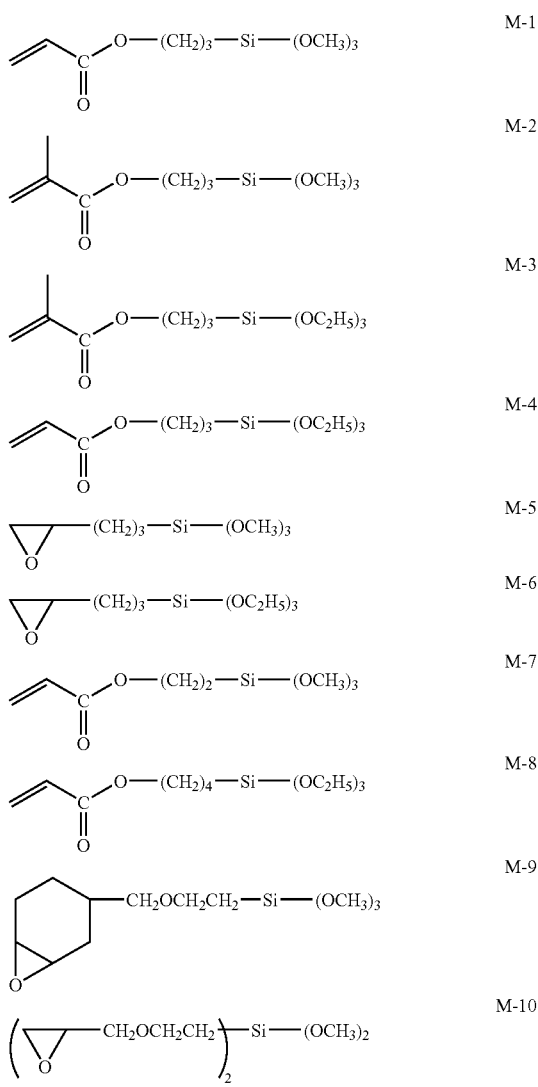

Among these compounds M-1 to M-10, preferred are M-1, M-2 and M-5.

The hydrolysate and/or partial condensate of the organosilane compound is generally produced by processing the above-described organosilane compound in the presence of a catalyst. Examples of the catalyst include inorganic acids such as hydrochloric acid, sulfuric acid and nitric acid; organic acids such as oxalic acid, acetic acid, formic acid, methanesulfonic acid and toluenesulfonic acid; inorganic bases such as sodium hydroxide, potassium hydroxide and ammonia; organic bases such as triethylamine and pyridine; metal alkoxides such as triisopropoxyaluminum and tetrabutoxyzirconium; and metal chelate compounds with the center metal being a metal such as Zr, Ti or Al. In the present invention, an acid catalyst such as metal chelate compound, inorganic acid and organic acids is preferably used. Among the inorganic acids, a hydrochloric acid and a sulfuric acid are preferred. Among the organic acids, an organic acid having an acid dissociation constant (pKa value (25° C.)) of 4.5 or less in water are preferred, a hydrochloric acid, a sulfuric acid and an organic acid having an acid dissociation constant of 3.0 or less in water are more preferred, a hydrochloric acid, a sulfuric acid and an organic acid having an acid dissociation constant of 2.5 or less in water are still more preferred, and an organic acid having an acid dissociation constant of 2.5 or less in water is yet still more preferred. Specifically, a methanesulfonic acid, an oxalic acid, a phthalic acid and a malonic acid are preferred, and an oxalic acid is more preferred.

Any metal chelate compound can be suitably used without particular limitation as long as it is a metal chelate compound where an alcohol represented by the formula: $R^3OH$ (wherein $R^3$ represents an alkyl group having a carbon number of 1 to 10) and a compound represented by the formula: $R^4COCH_2COR^5$ (wherein $R^4$ represents an alkyl group having a carbon number of 1 to 10 and $R^5$ represents an alkyl group having a carbon number of 1 to 10 or an alkoxy group having a carbon number of 1 to 10) are present as ligands and the center metal is a metal selected from Zr, Ti and Al. Within this category, two or more kinds of metal chelate compounds may be used in combination. The metal chelate compound for use in the present invention is preferably a compound selected from the compounds represented by the formulae: $Zr(OR^3)_{p1}(R^4COCHCOR^5)_{p2}$, $Ti(OR^3)_{q1}(R^4COCHCOR^5)_{q2}$ and $Al(OR^3)_{r1}(R^4COCHCOR^5)_{r2}$, and these compounds have an activity of accelerating the condensation reaction of the hydrolysate and/or partial condensate of the organosilane compound.

In the metal chelate compounds, $R^3$ and $R^4$ may be the same or different and each represents an alkyl group having a carbon number of 1 to 10, and specific examples thereof include an ethyl group, an n-propyl group, an i-propyl group, an n-butyl group, a sec-butyl group, a tert-butyl group, an n-pentyl group and a phenyl group. $R^5$ represents an alkyl group having a carbon number of 1 to 10 similarly to the above or an alkoxy group having a carbon number of 1 to 10, such as methoxy group, ethoxy group, n-propoxy group, i-propoxy group, n-butoxy group, sec-butoxy group or tert-butoxy group. In the metal chelate compounds, p1, p2, q1, q2, r1 and r2 each represents an integer determined to satisfy the relationships of p1+p2=4, q1+q2=4 and r1+r2=3.

Specific examples of the metal chelate compound include a zirconium chelate compound such as zirconium tri-n-butoxyethylacetoacetate, zirconium di-n-butoxy-bis(ethylacetoacetate), zirconium n-butoxy-tris(ethylacetoacetate), zirconium tetrakis(n-propylacetoacetate), zirconium tetrakis(acetylacetoacetate) and zirconium tetrakis(ethylacetoacetate); a titanium chelate compound such as titanium diisopropoxy.ebis(ethylacetoacetate), titanium diisopropoxy.bis(acetylacetate) and titanium diisopropoxy.bis(acetylacetone); and an aluminum chelate compound such as aluminum diisopropoxyethylacetoacetate, aluminum diisopropoxyacetylacetonate, aluminum isopropoxybis(ethylacetoacetate), aluminum isopropoxybis(acetylacetonate), aluminum tris(ethylacetoacetate), aluminum tris(acetylacetonate) and aluminum monoacetylacetonato.bis(ethylacetoacetate).

Among these specific examples of the metal chelate compound, preferred are zirconium tri-n-butoxyethylacetoacetate, titanium diisopropoxybis(acetylacetonate), aluminum diisopropoxyethylacetoacetate and aluminum tris(ethylacetoacetate). One of these meal chelate compounds may be used alone, or two or more species thereof may be used as a mixture. A partial hydrolysate of such a metal chelate compound may also be used.

In the present invention, a β-diketone compound and/or a β-ketoester compound are preferably further added to the curable composition. This is described below.

The compound used in the present invention is a β-diketone compound and/or β-ketoester compound represented by the formula: $R^4COCH_2COR^5$, and this compound functions as a stability enhancer for the curable composition used in the present invention. In the formula, $R^4$ represents an alkyl group having a carbon number of 1 to 10, and $R^5$ represents an alkyl group having a carbon number of 1 to 10 or an alkoxy group having a carbon number of 1 to 10. That is, this compound is considered to coordinate to a metal atom in the metal chelate compound (zirconium, titanium and/or aluminum compound) and inhibit the metal chelate compound from exerting the activity of accelerating the condensation reaction of the hydrolysate and/or partial condensate of the organosilane compound, thereby improving the storage stability of the composition obtained. $R^4$ and $R^5$ constituting the β-diketone compound and/or β-ketoester compound have the same meanings as $R^4$ and $R^5$ constituting the metal chelate compound.

Specific examples of the β-diketone compound and/or β-ketoester compound include acetylacetone, methyl acetoacetate, ethyl acetoacetate, n-propyl acetoacetate, i-propyl acetoacetate, n-butyl acetoacetate, sec-butyl acetoacetate, tert-butyl acetoacetate, 2,4-hexane-dione, 2,4-heptane-dione, 3,5-heptane-dione, 2,4-octane-dione, 2,4-nonane-dione and 5-methyl-hexane-dione. Among these, ethyl acetoacetate and acetylacetone are preferred, and acetylacetone is more preferred. One of these β-diketone compounds and/or β-ketoester compounds may be used alone, or two or more species thereof may be mixed and used. In the present invention, the β-diketone compound and/or β-ketoester compound is preferably used in an amount of 2 mol or more, more preferably from 3 to 20 mol, per mol of the metal chelate compound. Within this range, good storage stability is obtained.

The blending amount of the organosilane compound is preferably from 0.1 to 50 mass %, more preferably from 0.5 to 20 mass %, and most preferably from 1 to 10 mass %, based on the entire solid content of the low refractive index layer.

The organosilane compound may be added directly to the curable composition (e.g., coating solution of light-scattering layer or low refractive index layer), but it is preferred to previously prepare a hydrolysate and/or partial condensate of the organosilane compound by processing the organosilane compound in the presence of a catalyst and prepare the curable composition by using the obtained reaction solution (sol solution). In the present invention, it is preferred to first prepare a composition containing the hydrolysate and/or partial condensate of the organosilane compound and the metal chelate compound, add the β-diketone compound and/or β-ketoester compound thereto, incorporate the resulting solution into a coating solution for at least one layer of the light-scattering layer and the low refractive index layer, and apply the coating solution.

In the present invention, the light-scattering layer and the low refractive index layer both are preferably a cured film formed by coating and curing a curable coating composition containing a hydrolysate of the organosilane represented by formula (1) and/or a partial condensate thereof.

The amount of the sol component of organosilane used in the low refractive index layer is preferably from 5 to 100 mass %, more preferably from 5 to 40 mass %, still more preferably from 8 to 35 mass %, yet still more preferably from 10 to 30 mass %, based on the fluorine-containing polymer. If the amount used is too small, the effect of the present invention can be hardly obtained, whereas if the amount used is excessively large, this may disadvantageously cause increase of the refractive index or worsening of the film shape/surface state.

In the curable composition, an inorganic filler other than the above-described inorganic fine particle may be added in an amount in the range of not impairing the desired effects of the present invention. The inorganic filler is preferably the inorganic fine particle described above for the light-scattering layer, and an inorganic filler capable of imparting electrical conductivity, such as indium, tin and antimony, is preferably added within the range of not greatly affecting the refractive index.

(Sol-Gel Material)

Various sol-gel materials may also be used as the material for the low refractive index layer. As for the sol-gel material, a metal alkolate (alkolate of silane, titanium, aluminum, zirconium or the like), an organoalkoxy metal compound, and a hydrolysate thereof may be used. In particular, an alkoxysilane, an organosilane and a hydrolysate thereof are preferred. Specific examples thereof include a tetraalkoxysilane (e.g., tetramethoxysilane, tetraethoxysilane, an alkyltrialkoxysilane (e.g., methyltrimethoxysilane, ethyltrimethoxysilane), an aryltrialkoxysilane (e.g., phenyltrimethoxysilane), a dialkyldialkoxysilane and a diaryidialkoxysilane. Also, various functional group-containing organoalkoxysilanes (e.g., vinyltrialkoxysilane, methylvinyidialkoxysilane, γ-glycidyloxypropyltrialkoxysilane, γ-glycidyloxypropylmethyldialkoxysilane, β-(3,4-epoxydicyclohexyl)ethyltrialkoxysilane, γ-methacryloyloxypropyltrialkoxysilane, γ-aminopropyltrialkoxysilane, γ-mercaptopropyltrialkoxysilane, γ-chloropropyltrialkoxysilane), and perfluoroalkyl group-containing silane compounds (e.g., (heptadecafluoro-1,1,2,2-tetradecyl)triethoxysilane, 3,3,3-trifluoropropyltrimethoxysilane) may also be preferably used. In particular, a fluorine-containing silane compound is preferably used from the standpoint of decreasing the refractive index of the layer or imparting water-repellent/oil-repellent property, and it is also preferred to incorporate this compound as the (A) fluorine-containing compound described above.

(Other Substances Contained in Low Refractive Index Layer)

The curable composition is prepared by adding various additives required and a radial or cationic polymerization initiator to those (A) fluorine-containing compound, (B) inorganic fine particle and (C) organosilane compound and then dissolving these components in an appropriate solvent. At this time, the concentration of the solid content is appropriately selected according to usage but is generally on the order of 0.01 to 60 mass %, preferably from 0.5 to 50 mass %, more preferably on the order of 1 to 20 mass %.

From the standpoint of enhancing the interface adhesion to the lower layer in direct contact with the low refractive index layer and the hardness of the low refractive index layer, a curing agent such as polyfunctional (meth)acrylate compound, polyfunctional epoxy compound, polyisocyanate compound, aminoplast, polybasic acid and anhydrate thereof may be added in a small amount to the low refractive index layer. In the case of adding such a curing agent, the amount added thereof is preferably 40 mass % or less, more preferably 30 mass % or less, still more preferably 20 mass % or less, based on the entire solid content of the low refractive index layer film.

For the purpose of imparting properties such as antifouling property, water resistance, chemical resistance and slipperiness, a known antifouling agent, slipping agent and the like such as silicon-based or fluorine-based compound may be appropriately added to the low refractive index layer. In the case of adding such an additive, the additive is preferably added in an amount of 0.01 to 20 mass %, more preferably from 0.05 to 10 mass %, still more preferably from 0.1 to 5 mass %, based on the entire solid content of the low refractive index layer.

Preferred examples of the silicone-based compound include those containing a plurality of dimethylsilyloxy repeating units and having a substituent at the compound chain terminal and/or in the side chain. In the compound chain containing dimethylsilyloxy repeating units, a structural unit other than dimethylsilyloxy may be contained. A plurality of substituents, which may be the same or different, are preferably present. Preferred examples of the substituent include a group containing an acryloyl group, a methacryloyl group, a vinyl group, an aryl group, a cinnamoyl group, an epoxy group, an oxetanyl group, a hydroxyl group, a fluoroalkyl group, a polyoxyalkylene group, a carboxyl group or an amino group. The molecular weight is not particularly limited but is preferably 100,000 or less, more preferably 50,000 or less, and most preferably from 3,000 to 30,000. The silicone atom content of the silicone-based compound is not particularly limited but is preferably 18.0 mass % or more, more preferably from 25.0 to 37.8 mass %, and most preferably from 30.0 to 37.0 mass %. Preferred examples of the silicone-based compound include, but are not limited to, X-22-174DX, X-22-2426, X-22-164B, X-22-164C, X-22-170DX, X-22-176D and X-22-1821 (all trade names) produced by Shin-Etsu Chemical Co., Ltd.; FM-0725, FM-7725, FM-4421, FM-5521, FM6621 and FM-1121 produced by Chisso Corporation; and DMS-U22, RMS-033, RMS-083, UMS-182, DMS-H21, DMS-H31, HMS-301, FMS121, FMS123, FMS131, FMS141 and FMS221 (all trade names) produced by Gelest.

The fluorine-based compound is preferably a compound having a fluoroalkyl group. The fluoroalkyl group preferably has a carbon number of 1 to 20, more preferably from 1 to 10, and may be linear (e.g., $-CF_2CF_3$, $-CH_2(CF_2)_4H$, $-CH_2(CF_2)_8CF_3$, $-CH_2CH_2(CF_2)_4H$), may have a branched structure (e.g., $-CH(CF_3)_2$, $-CH_2CF(CF_3)_2$, $-CH(CH_3)CF_2CF_3$, $-CH(CH_3)(CF_2)_5CF_2H$) or an alicyclic structure (preferably a 5- or 6-membered ring, for example, a perfluorocyclohexyl group, a per-fluorocyclopentyl group or an alkyl group substituted by such a group), or may have an ether bond (e.g., $-CH_2OCH_2CF_2CF_3$, $-CH_2CH_2OCH_2C_4F_8H$, $-CH_2CH_2OCH_2CH_2C_8F_{17}$, $-CH_2CH_2OCF_2CF_2OCF_2CF_2H$). A plurality of the fluoroalkyl groups may be contained within the same molecule.

The fluorine-based compound preferably further has a substituent which contributes to the bond formation or compatibility with the low refractive index layer film. A plurality of substituents, which may be the same or different, are preferably present. Preferred examples of the substituent include an acryloyl group, a methacryloyl group, a vinyl group, an aryl group, a cinnamoyl group, an epoxy group, an oxetanyl group, a hydroxyl group, a polyoxyalkylene group, a carboxyl group and an amino group. The fluorine-based compound may be a polymer or oligomer with a compound containing no fluorine atom, and the molecular weight is not particularly limited. The fluorine atom content of the fluorine-based compound is not particularly limited but is preferably 20 mass % or more, more preferably from 30 to 70 mass %, and most preferably from 40 to 70 mass %. Preferred examples of the fluorine-based compound include, but are not limited to, R-2020, M-2020, R-3833 and M-3833 (all trade names) produced by Daikin Kogyo Co., Ltd.; and Megafac F-171, F-172, F-179A and DYFENSA MCF-300 (all trade names) produced by Dai-Nippon Ink & Chemicals, Inc.

It is also preferred that the molecular structure of the silicone-based compound or fluorine-based compound which can be appropriately added for the purpose of imparting properties such as antifouling property, water resistance, chemical resistance and slipperiness is contained in the molecular structure of the (A) fluorine-containing compound in the curable composition for the low refractive index layer. That is, the silicone-based compound or fluorine-based compound is preferably contained in the block or graft form in the molecular structure of the fluorine-containing polymer or fluorine-containing sol-gel.

For the purpose of imparting properties such as dust protection and antistatic property, a known dust inhibitor, antistatic agent or the like, such as cationic surfactant and polyoxyalkylene-based compound, may be appropriately added. A structural unit of such a dust inhibitor or antistatic agent may be contained as a part of the function in the above-described silicone-based compound or fluorine-based compound. In the case of adding such an additive, the additive is preferably added in an amount of 0.01 to 20 mass %, more preferably from 0.05 to 10 mass %, still more preferably from 0.1 to 5 mass %, based on the entire solid content of the low-n layer. Preferred examples of the compound include, but are not limited to, Megafac F-150 (trade name) produced by Dai-Nippon Ink & Chemicals, Inc.; and SH-3748 (trade name) produced by Toray Dow Corning. As for the inorganic fine particle here, those described above may be used.

(Solvent for Low Refractive Index Layer)

As for the solvent used in the coating composition for forming the low refractive index layer of the present invention, various solvents selected from the standpoint, for example, that the solvent can dissolve or disperse each component, readily provides a uniform surface state in the coating step and drying step, can ensure liquid storability or has an appropriate saturated vapor pressure, may be used. In view of drying load, a solvent having a boiling point of 100° C. or less at room temperature under atmospheric pressure is preferably used as the main component, and it is more preferred to contain a small amount of a solvent having a boiling point of 100° C. or more for adjusting the drying speed.

Examples of the solvent having a boiling point of 100° C. or less include hydrocarbons such as hexane (boiling point: 68.7° C.), heptane (98.4° C.), cyclohexane (80.7° C.) and benzene (80.1° C.); halogenated hydrocarbons such as dichloromethane (39.8° C.), chloroform (61.2° C.), carbon tetrachloride (76.8° C.), 1,2-dichloroethane (83.5° C.) and trichloroethylene (87.2° C.); ethers such as diethyl ether (34.6° C.), diisopropyl ether (68.5° C.), dipropyl ether (90.5° C.) and tetrahydrofuran (66° C.); esters such as ethyl formate (54.2° C.), methyl acetate (57.8° C.), ethyl acetate (77.1° C.) and isopropyl acetate (89° C.); ketones such as acetone (56.1° C.) and 2-butanone (same as methyl ethyl ketone, 79.6° C.); alcohols such as methanol (64.5° C.), ethanol (78.3° C.), 2-propanol (82.4° C.) and 1-propanol (97.2° C.); cyano compounds such as acetonitrile (81.6° C.) and propionitrile (97.4° C.); and carbon disulfide (46.2° C.). Among these, ketones and esters are preferred, and ketones are more preferred. Out of ketones, 2-butanone is preferred.

Examples of the solvent having a boiling point of 100° C. or more include octane (125.7° C.), toluene (110.6° C.), xylene (138° C.), tetrachloroethylene (121.2° C.), chlorobenzene (131.7° C.), dioxane (101.3° C.), dibutyl ether (142.4° C.), isobutyl acetate (118° C.), cyclohexanone (155.7° C.), 2-methyl-4-pentanone (same as MIBK, 115.9° C.), 1-butanol (117.7° C.), N,N-dimethylformamide (153° C.), N,N-dimethylacetamide (166° C.) and dimethyl sulfoxide (189° C.). Among these, cyclohexanone and 2-methyl-4-pentanone are preferred. For example, in the case of using 2-butanone and cyclohexanone in combination, the mixing ratio (by mass) therebetween is preferably from 99:1 to 50:50, more preferably from 99:1 to 80:20, still more preferably from 99:1 to 90:10, yet still more preferably from 99:1 to 95:5.

(Transparent Electrically Conducting Layer)

From the standpoint of preventing electrostatic charge on the film surface, a transparent electrically conducting layer for the antistatic purpose is preferably provided in the light-scattering film of the present invention. The transparent electrically conducting layer is effective when reduction of the surface resistivity from the display side is required or when attachment of dusts to the surface or the like becomes a problem. Examples of the method for forming the transparent electrically conducting layer include conventionally known methods such as a method of coating an electrically conducting coating solution containing an electrically conducting fine particle and a reactive curable resin, and a method of vapor-depositing or sputtering a transparent film-forming metal or metal oxide or the like to form an electrically conducting thin film. In the case of coating, the method therefor is not particularly limited and the coating may be performed by selecting an optimal method from known methods such as roll coating, gravure coating, bar coating and extrusion coating, according to the property or coated amount of the coating solution. The transparent electrically conducting layer may be formed on the transparent support or the light-scattering layer directly or through a primer layer ensuring firm adhesion thereto.

The thickness of the transparent electrically conducting layer is preferably from 0.01 to 10 μm, more preferably from 0.03 to 7 μm, still more preferably from 0.05 to 5 μm. In the case of using the transparent electrically conducting layer as a layer closer to the outermost layer, satisfactory antistatic property can be obtained even when the film thickness is small. The surface resistance of the transparent electrically conducting layer is preferably from $10^5$ to $10^{12}$ Ω/sq, more preferably from $10^5$ to $10^9$ Ω/sq, and most preferably from $10^5$ to $10^8$ Ω/sq. The surface resistance of the transparent electrically conducting layer may be measured by the four-probe method.

It is preferred that the transparent electrically conducting layer is substantially transparent. To speak specifically, the haze of the transparent electrically conducting layer is preferably 10% or less, more preferably 5% or less, still more preferably 3% or less, and most preferably 1% or less. The transmittance for light at a wavelength of 550 nm is preferably 50% or more, more preferably 60% or more, still more preferably 65% or more, and most preferably 70% or more.

The transparent electrically conducting layer preferably has excellent strength. More specifically, the strength of the antistatic layer is, in terms of the pencil hardness with a load of 1 kg (specified in JIS-K-5400), preferably H or more, more preferably 2H or more, still more preferably 3H or more, and most preferably 4H or more.

(Electroconductive Particle)

The average primary particle diameter of the electroconductive particle for use in the transparent electrically conducing layer is preferably from 1 to 150 nm, more preferably from 5 to 100 nm, and most preferably from 5 to 70 nm. The average particle diameter of the electroconductive particle in the transparent electrically conducting layer formed is from 1 to 200 nm, preferably from 5 to 150 nm, more preferably from 10 to 100 nm, and most preferably from 10 to 80 nm. The average particle diameter of the electroconductive particle is an average diameter weighted with the mass of particle and can be measured by a light-scattering method or by an electron micrograph.

The specific surface area of the electroconductive particle is preferably from 10 to 400 $m^2/g$, more preferably from 20 to 200 $m^2/g$, and most preferably from 30 to 150 $m^2/g$.

The electroconductive particle is preferably an inorganic fine particle comprising a metal oxide or nitride. Examples of the metal oxide or nitride include tin oxide, indium oxide, zinc oxide and titanium nitride. Among these, tin oxide and indium oxide are preferred.

The electroconductive particle comprises such a metal oxide or nitride as the main component and may further contain other elements. The main component means a component having a largest content (mass %) out of the components constituting the particle. Examples of the other element include Ti, Zr, Sn, Sb, Cu, Fe, Mn, Pb, Cd, As, Cr, Hg, Zn, Al, Mg, Si, P, S, B, Nb, In, V and a halogen atom. In order to enhance the electrical conductivity of tin oxide or indium oxide, addition of Sb, P, B, Nb, In, V or a halogen atom is preferred. An Sb-containing tin oxide (ATO) and an Sn-containing indium oxide (ITO) are particularly preferred. The ratio of Sb in ATO is preferably from 3 to 20 mass %, and the ratio of Sn in ITO is preferably from 5 to 20 mass %.

The electroconductive particle may be surface-treated. The surface treatment can be performed using an inorganic compound or an organic compound. Examples of the inorganic compound for use in the surface treatment include alumina and silica. A silica treatment is preferred. Examples of the organic compound for use in the surface treatment include a polyol, an alkanolamine, a stearic acid, a silane coupling agent and a titanate coupling agent, with a silane coupling agent being most preferred. Two or more kinds of surface treatments may be performed in combination.

The shape of the electroconductive particle is preferably rice grain-like, spherical, cubic, spindle-like or amorphous.

The proportion of the electrically conducting inorganic fine particle in the transparent electrically conducting layer is preferably from 20 to 90 mass %, more preferably from 25 to 85 mass %, still more preferably from 30 to 80 mass %. Two or more kinds of electroconductive particles may be used in combination in the transparent electrically conducting layer.

The electroconductive particle can be used in a dispersion state for the transparent electrically conducting layer. The dispersion medium used for the electroconductive particle is preferably a liquid having a boiling point of 60 to 170° C. Examples of the dispersion medium include water, an alcohol (e.g., methanol, ethanol, isopropanol, butanol, benzyl alcohol), a ketone (e.g., acetone, methyl ethyl ketone, methyl isobutyl ketone, cyclohexanone), an ester (e.g., methyl acetate, ethyl acetate, propyl acetate, butyl acetate, methyl formate, ethyl formate, propyl formate, butyl formate), an aliphatic hydrocarbon (e.g., hexane, cyclohexane), a halogenated hydrocarbon (e.g., methylene chloride, chloroform, carbon tetrachloride), an aromatic hydrocarbon (e.g., benzene, toluene, xylene), an amide (e.g., dimethylformamide, dimethylacetamide, n-methylpyrrolidone), an ether (e.g., diethyl ether, dioxane, tetrahydrofuran) and an ether alcohol (e.g., 1-methoxy-2-propanol). Among these, preferred are toluene, xylene, methyl ethyl ketone, methyl isobutyl ketone, cyclohexanone and butanol. The electroconductive particle can be dispersed in the medium by using a disperser. Examples of the disperser include a sand grinder mill (e.g., bead mill with pin), a high-speed impeller mill, a pebble mill, a roller mill, an attritor and a colloid mill. Among these, a sand grinder mill and a high-speed impeller mill are preferred. Also, a preliminary dispersion treatment may be performed. Examples of the disperser for use in the preliminary dispersion treatment include a ball mill, a three-roll mill, a kneader and an extruder.

The electroconductive particle may also be added to the light-scattering layer.

(Binder of Transparent Electrically Conducting Layer)

In the transparent electrically conducting layer, a crosslinked polymer can be used as the binder. The crosslinked polymer preferably has an anionic group. The crosslinked polymer having an anionic group has a structure that the main chain of the polymer having an anionic group is crosslinked. The anionic group has a function of maintaining the dispersed state of the electroconductive particle, and the crosslinked structure has a function of imparting a film-forming ability to the polymer and strengthening the transparent electrically conducting layer.

Examples of the polymer main chain include a polyolefin (saturated hydrocarbon), a polyether, a polyurea, a polyurethane, a polyester, a polyamine, a polyamide and a melamine resin. A polyolefin main chain, a polyether main chain and a polyurea main chain are preferred, a polyolefin main chain and a polyether main chain are more preferred, and a polyolefin main chain is most preferred.

The polyolefin main chain comprises saturated hydrocarbon. The polyolefin main chain is obtained, for example, by the addition polymerization reaction of an unsaturated polymerizable group.

In the polyether main chain, repeating units are bonded through an ether bond (—O—). The polyether main chain is obtained, for example, by the ring-opening polymerization reaction of an epoxy group.

In the polyurea main chain, repeating units are bonded through a urea bond (—NH—CO—NH—). The polyurea main chain is obtained, for example, by the condensation polymerization reaction of an isocyanate group and an amino group. In the polyurethane main chain, repeating units are bonded through a urethane bond (—NH—CO—O—).

The polyurethane main chain is obtained, for example, by the condensation polymerization reaction of an isocyanate group and a hydroxyl group (including an N-methylol group).

In the polyester main chain, repeating units are bonded through an ester bond (—CO—O—). The polyester main chain is obtained, for example, by the condensation polymerization reaction of a carboxyl group (including an acid halide group) and a hydroxyl group (including an N-methylol group).

In the polyamine main chain, repeating units are bonded through an imino bond (—NH—). The polyamine main chain is obtained, for example, by the ring-opening polymerization reaction of an ethyleneimine group.

In the polyamide main chain, repeating units are bonded through an amide bond (—NH—CO—). The polyamide main chain is obtained, for example, by the reaction of an isocyanate group and a carboxyl group (including an acid halide group.

The melamine resin main chain is obtained, for example, by the condensation polymerization reaction of a triazine group (e.g., melamine) and an aldehyde (e.g., formaldehyde). In the melamine resin, the main chain itself has a crosslinked structure.

The anionic group is bonded directly to the main chain of the polymer or bonded to the main chain through a linking group. The anionic group is preferably bonded as a side chain to the main chain through a linking group.

Examples of the anionic group include a carboxylic acid group (carboxyl), a sulfonic acid group (sulfo) and a phosphoric acid group (phosphono), with a sulfonic acid group and a phosphoric acid group being preferred.

The anionic group may be in a salt state. The cation forming a salt with the anionic group is preferably an alkali metal ion. The proton of the anionic group may be dissociated.

The linking group connecting the anionic group and the polymer main chain is preferably a divalent group selected from —CO—, —O—, an alkylene group, an arylene group and a combination thereof.

The crosslinked structure has two or more chemically bonded (preferably covalently bonded) main chains and preferably has three or more covalently bonded main chains. The crosslinked structure preferably comprises a divalent or greater group selected from —CO—, —O—, —S—, a nitrogen atom, a phosphorus atom, an aliphatic residue, an aromatic residue and a combination thereof.

The crosslinked polymer having an anionic group is preferably a copolymer containing a repeating unit having an anionic group and a repeating unit having a crosslinked structure. The proportion of the repeating unit having an anionic group in the copolymer is preferably from 2 to 96 mass %, more preferably from 4 to 94 mass %, and most preferably from 6 to 92 mass %. The repeating unit may have two or more anionic groups. The proportion of the repeating unit having a crosslinked structure in the copolymer is preferably from 4 to 98 mass %, more preferably from 6 to 96 mass %, and most preferably from 8 to 94 mass %.

The repeating unit of the crosslinked polymer having an anionic group may have both an anionic group and a crosslinked structure. Also, other repeating units (a repeating unit having neither an anionic group nor a crosslinked structure) may be contained.

The other repeating units are preferably a repeating unit having an amino group or a quaternary ammonium group and a repeating unit having a benzene ring. The amino group or quaternary ammonium group has a function of maintaining the dispersed state of the inorganic fine particle similarly to the anionic group. Incidentally, the same effects are obtained even when the amino group, quaternary ammonium group or benzene ring is contained in the repeating unit having an anionic group or in the repeating unit having a crosslinked structure.

In the repeating unit having an amino group or a quaternary ammonium group, the amino group or quaternary ammonium group is bonded directly to the main chain of the polymer or bonded to the main chain through a linking group. The amino group or quaternary ammonium group is preferably bonded as a side chain to the main chain through a linking group.

The amino group or quaternary ammonium group is preferably a secondary amino group, a tertiary amino group or a quaternary ammonium group, more preferably a tertiary amino group or a quaternary ammonium group. The group bonded to the nitrogen atom of the secondary amino group, tertiary amino group or quaternary ammonium group is preferably an alkyl group, more preferably an alkyl group having a carbon number of 1 to 12, still more preferably an alkyl group having a carbon number of 1 to 6.

The counter ion of the quaternary ammonium group is preferably halide ion. The linking group connecting the amino group or quaternary ammonium group and the polymer main chain is preferably a divalent group selected from —CO—, —NH—, —O—, an alkylene group, an arylene group and a combination thereof. In the case where the crosslinked polymer having an anionic group contains a repeating unit having an amino group or a quaternary ammonium group, the proportion of the repeating unit is preferably from 0.06 to 32 mass %, more preferably from 0.08 to 30 mass %, and most preferably from 0.1 to 28 mass %.

The following reactive organic silicon compounds described, for example, in JP-A-2003-39586 may be used in combination with the above-described binder. The reactive organic silicon compound is used in the range from 10 to 100 wt % based on the total of the ionizing radiation-curable resin and the reactive organic silicon compound. Particularly, in the case of using the ionizing radiation-curable organic silicon compound of (3) below, the electrically conducting layer can be formed by using only this compound as the resin component.

(1) Silicon Alkoxide

This is a compound represented by $R_m Si(OR')_n$, wherein R and R' each represents an alkyl group having a carbon number of 1 to 10, and m and n each is an integer satisfying m+n=4. Examples of the compound include tetramethoxysilane, tetraethoxysilane, tetra-iso-propoxysilane, tetra-n-propoxysilane, tetra-n-butoxysilane, tetra-sec-butoxysilane, tetra-tert-butoxysilane, tetrapentaethoxysilane, tetrapenta-iso-propoxysilane, tetrapenta-n-propoxysilane, tetrapenta-n-butoxysilane, tetrapenta-sec-butoxysilane, tetrapenta-tert-butoxysi lane, methyltrimethoxysilane, methyltriethoxysilane, methyltripropoxysilane, methyltributoxysilane, dimethyldimethoxysilane, dimethyldiethoxysilane, dimethylethoxysilane, dimethylmethoxysilane, dimethylpropoxysilane, dimethylbutoxysilane, methyldimethoxysilane, methyldiethoxysilane and hexyltrimethoxysilane.

(2) Silane Coupling Agent

Examples of the silane coupling agent include γ-(2-aminoethyl)aminopropyltrimethoxysilane, γ-(2-aminoethyl)aminopropylmethyldimethoxysilane, β-(3,4-epoxycyclohexyl)ethyltrimethoxysilane, γ-aminopropyltriethoxysilane, γ-methacryloxypropylmethoxysilane, N-β-(N-vinylbenzylaminoethyl)-γ-aminopropylmethoxysilane hydrochloride, γ-glycidoxypropyltrimethoxysilane, aminosilane, methylmethoxysilane, vinyltriacetoxysilane, γ-mercaptopropyltrimethoxysilane, γ-chloropropyltrimethoxysilane, hexa-methyldisilazane, vinyltris(β-methoxyethoxy)silane, octadecyldimethyl(3-(trimethoxysilyl)propyl)ammonium chloride, methyltrichlorosilane and dimethyldichlorosilane.

(3) Ionizing Radiation-Curable Silicon Compound

The ionizing radiation-curable silicon compound includes an organosilicon compound having a plurality of groups capable of undergoing reaction and crosslinking by the effect of ionizing radiation, for example, an organosilicon compound containing a polymerizable double bond group and having a molecular weight of 5,000 or less. Examples of the reactive organosilicon compound include a one-end vinyl functional polysilane, a both-end vinyl functional polysilane, a one-end vinyl functional polysiloxane, a both-end vinyl functional polysiloxane, and a vinyl functional polysilane or polysiloxane obtained by reacting the above-described compound.

Other examples of the compound include a (meth)acryloxysilane compound such as 3-(meth)acryloxypropyltrimethoxysilane and 3-(meth)acryloxypropylmethyldimethoxysilane.

For more successfully bringing out the antistatic function, it is also preferred to, as described in JP-A-2003-39586, disperse the electroconductive particle in the light-scattering layer of the present invention and impart a function as an anisotropic electroconductive film.

<Transparent Support>

The transparent support of the light-scattering film of the present invention is preferably a plastic film. Examples of the polymer for forming the plastic film include a cellulose acylate (e.g., triacetyl cellulose, diacetyl cellulose, cellulose acetate propionate, cellulose acetate butyrate; representatively, TAC-TD80U, TD80UL, etc. produced by Fuji Photo Film Co., Ltd.), a polyamide, a polycarbonate, a polyester (e.g., polyethylene terephthalate, polyethylene naphthalate), a polystyrene, a polyolefin, a norbornene-based resin (ARTON, trade name, produced by JSR Corp.) and an amorphous polyolefin (ZEONEX, trade name, produced by Zeon Corp.). Among these, preferred are triacetyl cellulose, polyethylene terephthalate, norbornene-based resin and amorphous polyolefin, and more preferred is triacetyl cellulose.

The cellulose acylate comprises a single layer or a plurality of layers. The single-layer cellulose acylate is prepared, for example, by drum casting disclosed in JP-A-7-11055 or band casting, and the cellulose acylate comprising a plurality of layers is prepared by a so-called co-casting method disclosed in JP-A-61-94725 and JP-B-62-43846 (the term "JP-B" as used herein means an "examined Japanese patent publication"). More specifically, these are a method where a solution (called a "dope") prepared by dissolving a raw material flake in a solvent such as halogenated hydrocarbons (e.g., dichloromethane), alcohols (e.g., methanol, ethanol, butanol), esters (e.g., methyl formate, methyl acetate) and ethers (e.g., dioxane, dioxolane, diethyl ether), and adding, if desired, various additives such as plasticizer, ultraviolet absorbent, deterioration inhibitor, lubricant and separation accelerator is cast on a support comprising a horizontal endless metal belt or a rotating drum by dope supply means (called a "die"), a single dope is cast in a single layer in the case of a single-layer cellulose acylate or a low-concentration dope is co-cast on both sides of a high-concentration cellulose ester dope in the case of a cellulose acylate comprising a plurality of layers, and the film imparted with rigidity by drying it to some extent on the support is separated from the support and passed through a drying zone by various transportation devices to remove the solvent.

A representative example of the solvent for dissolving the cellulose acylate is dichloromethane. However, in view of the global environment or working environment, the solvent preferably contains substantially no halogenated hydrocarbon such as dichloromethane. The term "contain substantially no halogenated hydrocarbon" as used herein means that the proportion of the halogenated hydrocarbon in the organic solvent is less than 5 mass % (preferably less than 2 mass %).

The cellulose acylate film (film comprising triacetyl cellulose of the like) and the production method thereof are described in *JIII Journal of Technical Disclosure*, No. 2001-1745, Japan Institute of Invention and Innovation (Mar. 15, 2001).

The thickness of the support may be usually on the order of 25 to 1,000 μm but is preferably from 25 to 250 μm, more preferably from 30 to 90 μm. In view of suitability for handling, coating and the like, the thickness is preferably around 80 μm, but needs for a thin polarizing plate are increasing to cope with the tendency toward thinning of display devices and from the standpoint of thinning the polarizing plate, the thickness is preferably on the order of 40 to 60 μm. In the case of using such a thin cellulose acylate film as the transparent support for the light-scattering film of the present invention, it is preferred to optimize, for example, the solvent, thickness or crosslinking shrinkage of the layer directly coated on the cellulose acylate film and thereby avoid the problem in the suitability for handling, coating and the like.

The support may have an arbitrary width but in view of handling, yield and productivity, the width is usually from 100 to 5,000 mm, preferably from 800 to 3,000 mm, more preferably from 1,000 to 2,000 mm.

The support may also have an arbitrary length but in view of handling, yield and productivity, the length is usually from 100 to 10,000 m, preferably from 300 to 5,000 m, more preferably from 500 to 3,000 m.

<Other Layers>

Examples of the layer which may be provided between the transparent support and the light-scattering layer of the present invention include another light-scattering layer (when the hardness is insufficient only by the light-scattering layer), a moisture-proofing layer, an adhesion-improving layer and a rainbow unevenness (interference unevenness)-preventing layer. These layers can be formed by a known method.

The light-scattering film of the present invention can be formed by the following method, but the present invention is not limited to this method.

(Preparation of Coating Solution)

A coating solution containing components for forming each layer is prepared. At this time, the percentage of water content in the coating solution can be prevented from increasing by minimizing the volatilization volume of the solvent. The percentage of water content in the coating solution is preferably 5% or less, more preferably 2% or less, still more preferably 1% or less. The volatilization volume of the solvent can be suppressed, for example, by enhancing the closeness at the stirring after materials are charged into a tank or minimizing the contact area of the coating solution with air at the liquid transfer operation. Also, means for reducing the percentage of water content in the coating solution may be provided during, before or after the coating.

The coating solution for forming the light-scattering layer is preferably subjected to filtration capable of removing almost all (90% or more) foreign matters having a size corresponding to the dry thickness (approximately from 50 to 120 nm) of the low refractive index layer formed directly on the light-scattering layer. The light-transmitting particle for imparting light-diffusing property has a size equal to or greater than the film thickness of the low refractive index layer and therefore, the filtration is preferably applied to the intermediate solution after adding all materials except for the light-transmitting particle. In the case where a filter capable of removing foreign matters having the above-described small particle diameter is not available, filtration capable of removing almost all foreign matters having a size corresponding to at least the wet film thickness (approximately from 1 to 10 μm) of the layer formed directly thereon is preferably performed. By such means, point defects of the layer formed directly thereon can be decreased.

(Coating)

Then, the coating solutions for forming the light-scattering layer and, if desired, a low refractive index layer and other layers are coated on the transparent support and heated/dried. Thereafter, the monomer or curable resin for forming each layer is cured by the irradiation of light or under heating, whereby each layer is formed.

The method for coating each layer of the film of the present invention is not particularly limited, but a known method such as dip coating method, air knife coating method, curtain coating method, roller coating method, wire bar coating method, gravure coating method, extrusion coating method (die coating method) (see, U.S. Pat. No. 2,681,294) and microgravure coating method, is used. Among these, a microgravure coating method and a die coating method are preferred. In order to supply the film with high productivity, a die coating method is preferably used. A die coater preferably usable particularly in a region having a small wet coated amount (20 ml/m² or less), as in the light-scattering layer of the present invention or the antireflection layer, is described below.

<Constitution of Die Coater>

Figure 3:
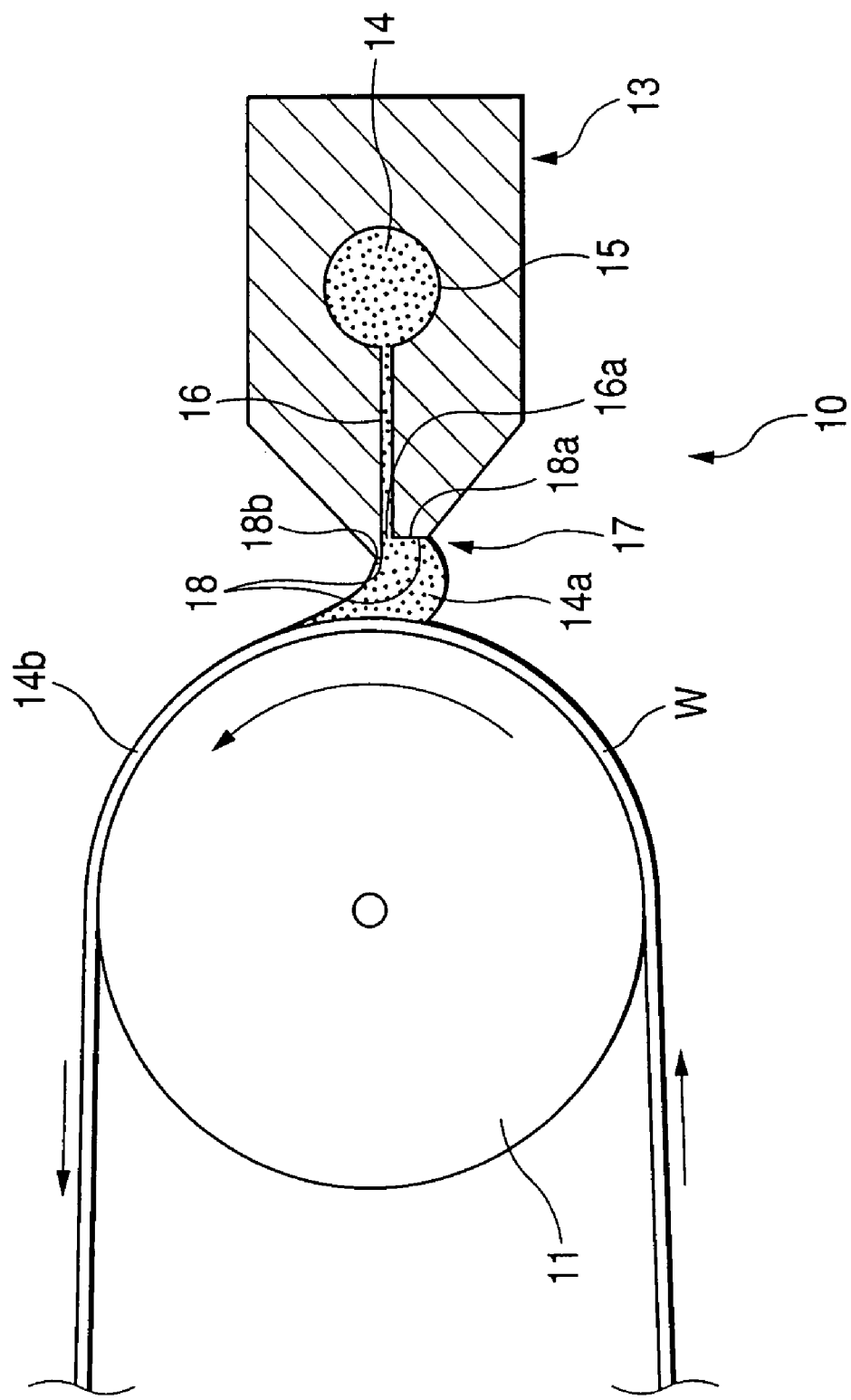
FIG. 3 is a cross-sectional view of the coater using a slot die, which is used in one exemplary embodiment of the present invention.

FIG. 3 is a cross-sectional view of a coater using a slot die, which is used in the present invention. In the coater 10, a coating solution 14 formed into a bead 14a from a slot die 13 is coated on a continuously running web W supported by a backup roll 11 to form a coating film 14b on the web W.

A pocket 15 and a slot 16 are formed inside the slot die 13. The cross section of the pocket 15 is constituted by a curve and a straight line and may have, for example, a nearly circular shape as shown in FIG. 3 or a semicircular shape. The pocket 15 is a liquid reservoir space for the coating solution and has a cross-sectional shape extended in the width direction of the slot die 13, and the length of its effective extension is generally set to be equal to or slightly longer than the coating width. The coating solution 14 is supplied to the pocket 15 from the side surface of the slot die 13 or from the center of the surface opposite the slot opening 16a. Also, in the pocket 15, a stopper for preventing leakage of the coating solution 14 is provided.

The slot 16 is a flow path of the coating solution 14 from the pocket 15 to the web W and, similarly to the pocket 15, has a cross-sectional shape extended in the width direction of the slot die 13, and the opening 16a positioned on the web side is generally adjusted to have nearly the same long width as the coating width by using a width regulating plate (not shown) or the like. The angle between the slot end of the slot 16 and the tangent line in the web running direction of the backup roll 11 is preferably from 30 to 90°.

The end lip 17 of the slot die 13, where the opening 16a of the slot 16 is positioned, is tapered and the distal end thereof forms a flat part 18 called a land. In this land 18, the upstream side in the travelling direction of the web W with respect to the slot 16 is referred to as an upstream lip land 18a, and the downstream side is referred to as a downstream lip land 18b.

Figure 4A:
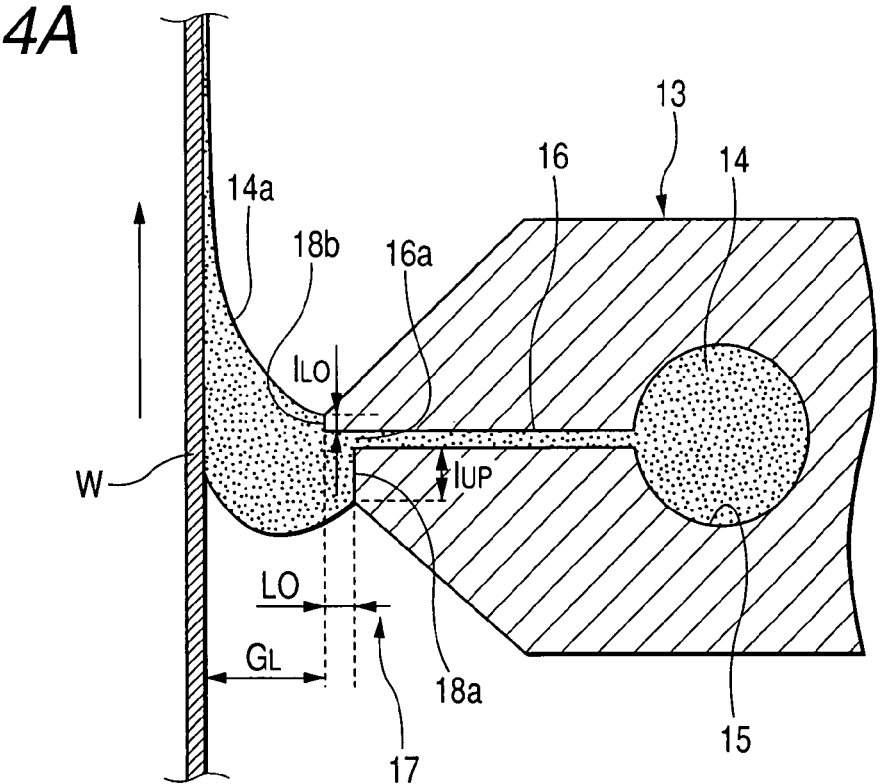
FIG. 4A is a view showing the cross-sectional shape of the slot die used in one exemplary embodiment.
Figure 4B:
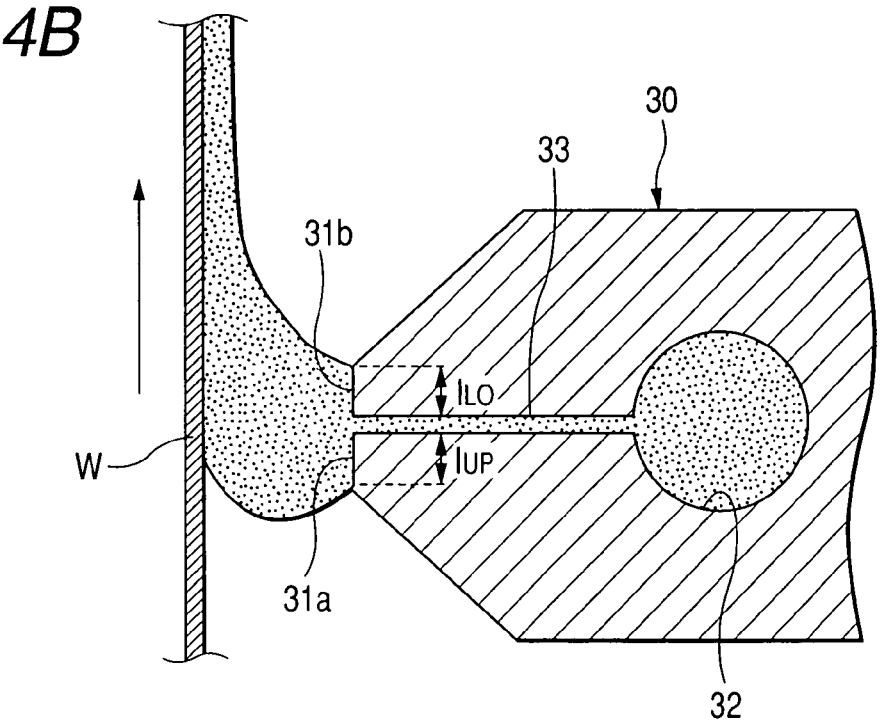
FIG. 4B is a view showing the cross-sectional shape of a slot die in the related art.

FIG. 4 shows the cross-sectional shape of the slot die 13 in comparison with a conventional one, that is, (A) shows the slot die 13 used in the present invention, and (B) shows a conventional slot die 30. In the conventional slot die 30, the distances from the web to the upstream lip land 31a and to the downstream lip land 31b are equal. Incidentally, the numeral 32 denotes a pocket and 33 denotes a slot. On the other hand, in the slot die 13 of the present invention, the length $I_{LO}$ of the downstream lip land is made shorter and by virtue of this constitution, coating for a wet film thickness of 20 μm or less can be performed with good precision.

The land length $I_{UP}$ of the upstream lip land 18a is not particularly limited but is preferably from 500 μm to 1 mm. The land length $I_{LO}$ of the downstream lip land 18b is from 30 to 100 μm, preferably from 30 to 80 μm, more preferably from 30 to 60 μm. If the length $I_{LO}$ of the downstream lip land is less than 30 μm, the edge or land of the end lip is readily chipped and generation of streaks is liable to occur in the coating film, as a result, coating cannot be continued. Also, setting of the wet line position on the downstream side becomes difficult and there arises a problem that the coating solution is liable to spread on the downstream side. The wet spreading of the coating solution on the downstream side means that the wet line becomes non-uniform, and as conventionally known, this gives rise to a problem of incurring a defective profile such as streak on the coated surface. On the other hand, if the length $I_{LO}$ of the downstream lip land exceeds 100 μm, the bead itself cannot be formed and therefore, thin-layer coating cannot be performed.

The downstream lip land 18b is in the overbite form and approaches closer to the web W than the upstream lip land 18a, so that the pressure reduction degree can be decreased and a bead suitable for thin-film coating can be formed. The difference between the distance from the web W to the downstream lip land 18b and the distance to the upstream lip land 18a (hereinafter, this difference is referred to as an "overbite length LO") is preferably from 30 to 120 μm, more preferably from 30 to 100 μm, and most preferably from 30 to 80 μm. When the slot die 13 is in an overbite shape, the gap $G_L$ between the end lip 17 and the web W indicates the gap between the downstream lip land 18b and the web W.

Figure 5:
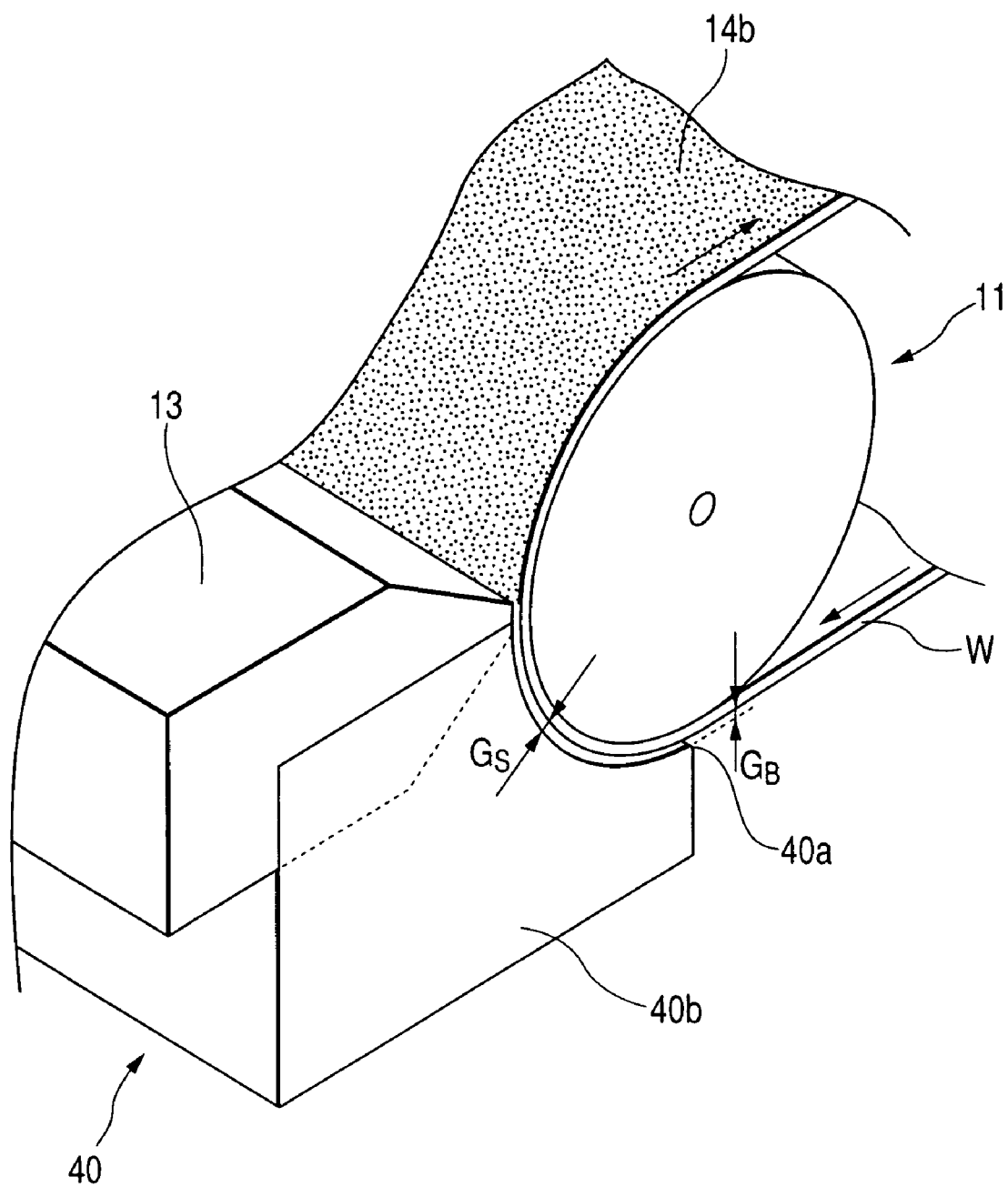
FIG. 5 is a perspective view showing the slot die and its periphery at the coating step in one exemplary embodiment of the present invention.
Figure 6:
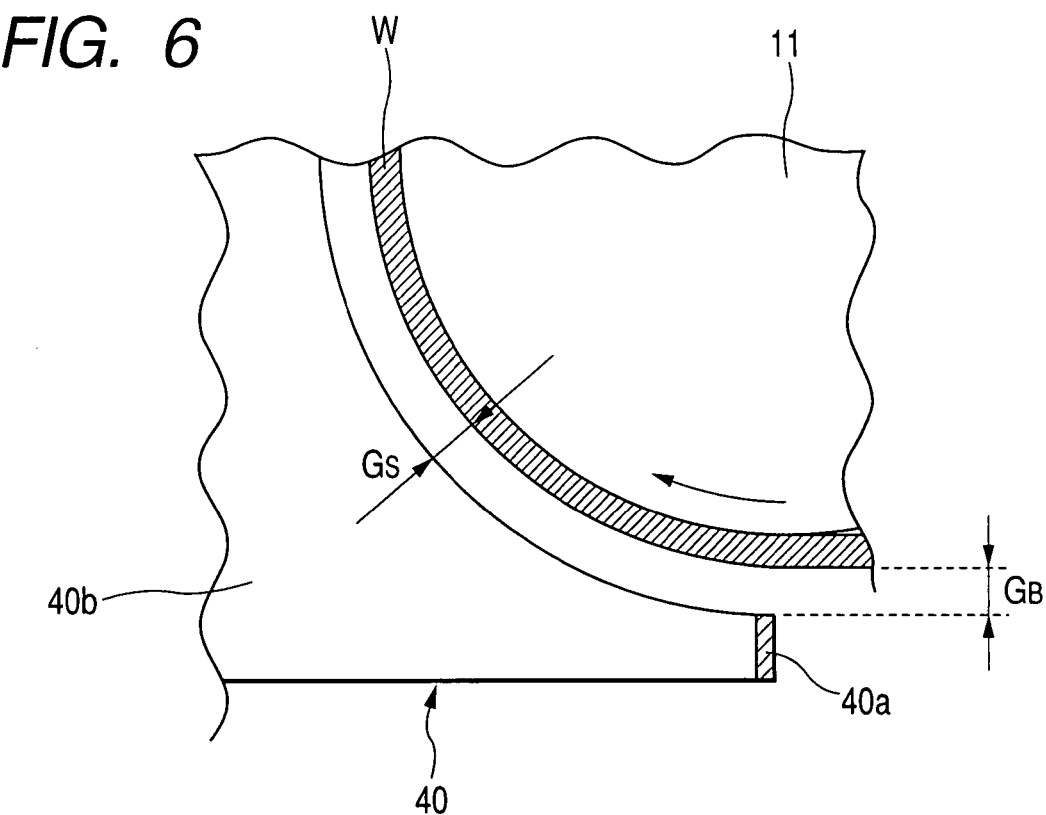
FIG. 6 is a cross-sectional view showing the low-pressure chamber and the web W approaching closer (the back plate 40a is integral with the chamber 40 body).
Figure 7:
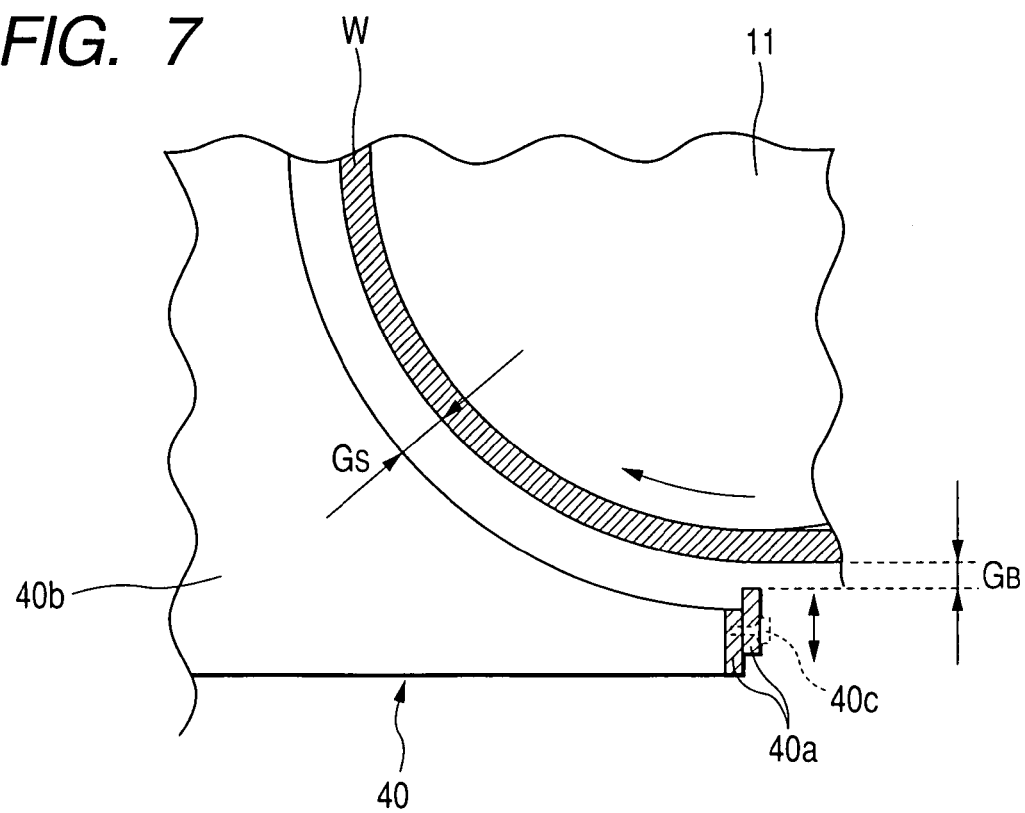
FIG. 7 is a cross-sectional view showing the low-pressure chamber and the web W approaching closer (the back plate 40a is fixed to the chamber 40 with a screw 40c).

FIG. 5 is a perspective view showing the slot die and its periphery in the coating process in the present invention. On the side opposite the web W travelling direction, a low-pressure chamber 40 is disposed at the position not coming into contact with the bead so as to satisfactorily adjust the pressure reduction for the bead 14a. The low-pressure chamber 40 comprises a back plate 40a and a side plate 40b for keeping the operation efficiency, and gaps $G_B$ and $G_S$ are present between the back plate 40a and the web W and between the side plate 40b and the web W, respectively. FIGS. 6 and 7 each is a cross-sectional view showing the low-pressure chamber 40 and the web W approaching closer. The side plate and the back plate may be integral with the chamber body as shown in FIG. 6 or may be fixed to the chamber with a screw 40c or the like as in FIG. 7 so that the gap can be appropriately changed. In any structure, the actually vacant portions between the back plate 40a and the web W and between the side plate 40b and the web W are defined as the gaps $G_B$ and $G_S$, respectively. In the case where the low-pressure chamber 40 is, as shown in FIG. 4, disposed below the web W and the slot die 13, the gap $G_B$ between the back plate 40a of the low-pressure chamber 40 and the web W indicates the gap from the top end of the back plate 40a to the web W.

The low-pressure chamber is preferably disposed such that the gap $G_B$ between the back plate 40a and the web W is larger than the gap $G_L$ between the end lip 17 of the slot die 13 and the web W. By virtue of this constitution, the pressure reduction degree in the vicinity of the bead can be prevented from changing due to eccentricity of the backup roll 11. For example, when the gap $G_L$ between the end lip 17 of the slot die 13 and the web W is from 30 to 100 μm, the gap $G_B$ between the back plate 40a and the web W is preferably from 100 to 500 μm.

<Construction Material and Precision>

As the length in the web running direction of the end lip on the web travelling direction side is longer, this is more disadvantageous to the bead formation. If this length fluctuates between arbitrary portions in the width direction of the slot die, the bead becomes unstable due to slight disturbance. Accordingly, the fluctuation margin of this length in the width direction of the slot die is preferably within 20 µm.

As for the construction material for the end lip of the slot die, if a material such as stainless steel is used, the material is worn at the die working stage and even when the end lip of the slot die is made to have a length of 30 to 100 µm in the web running direction, the precision of the end lip cannot be satisfied. Accordingly, for maintaining high working precision, it is important to use a super-hard material as described in Japanese Patent No. 2817053. Specifically, at least the end lip of the slot die is preferably formed of a cemented carbide obtained by binding carbide crystals having an average particle diameter of 5 µm or less. Examples of the cemented carbide include those obtained by binding carbide crystal particles such as tungsten carbide (hereinafter simply referred to as WC) with a binding metal such as cobalt. As for the binding metal, titanium, tantalum, niobium and a mixed metal thereof may be also used other than cobalt. The average particle diameter of WC crystal is more preferably 3 µm or less.

For realizing high-precision coating, the above-described land length on the web travelling direction side of the end lip and the fluctuation of the gap with the web in the width direction of the slot die are also important factors. It is preferred to achieve a combination of these two factors, namely, a straightness within the range where the fluctuation margin of the gap can be suppressed to a certain extent. The straightness between the end lip and the backup roll is preferably established such that the fluctuation margin of the gap in the width direction of the slot die becomes 5 µm or less.

<Coating Speed>

In the coating system preferably used in the present invention, the film thickness at high-speed coating can be made highly stable by achieving the above-described precision of the backup roll and the end lip. Furthermore, the coating system used in the present invention is a pre-measurement system and therefore, a stable film thickness can be easily ensured even at high-speed coating. According to the coating system used in the present invention, a low coated-amount coating solution as in the light-scattering film of the present invention can be coated at a high speed with good film thickness stability. The coating may be performed by other coating systems, but in a dip coating method, the coating solution in a liquid-receiving tank is inevitably vibrated and stepwise unevenness is readily generated. In a reverse roll coating method, stepwise unevenness is liable to occur due to eccentricity or deflection of the roll involved in the coating. Also, these coating systems are a post-measurement system and therefore, a stable film thickness can be hardly ensured. In view of productivity, the coating is preferably performed at a rate of 25 m/min or more by using the production method of the present invention.

<Wet Coated Amount>

At the time of forming the light-scattering layer, the coating solution is preferably coated on the substrate film directly or through another layer to a thickness of 3 to 50 µm, for example, from 3 to 40 µm, in terms of the wet coating film thickness. From the standpoint of preventing drying unevenness, the thickness is more preferably from 10 to 35 µm, still more preferably from 15 to 32 µm. Also, at the time of forming the low refractive index layer, the coating composition is preferably coated on the light-scattering layer, directly or through another layer, to a thickness of 1 to 10 µm, more preferably from 2 to 7 µm, still more preferably from 2 to 5 µm, in terms of the wet coating film thickness.

(Drying)

The light-scattering layer and low refractive index layer after coated on the substrate film directly or through another layer are transported in the form of a web to a heated zone for drying the solvent. The temperature in the drying zone is preferably from 25 to 140° C. and it is preferred that the temperature in the first half of the drying zone is relatively low and the temperature in the second half is relatively high. However, the temperature is preferably not more than a temperature at which the components other than the solvent contained in the coating composition for each layer start volatilizing. For example, some commercially available photoradical generators used in combination with an ultraviolet curable resin volatilize by about several tens of percent within several minutes in warm air at 120° C., and some monofunctional or bifunctional acrylate monomers or the like allow progress of their volatilization in warm air at 100° C. In such a case, as described above, the drying zone temperature is preferably not more than a temperature at which the components other than the solvent contained in the coating composition for each layer start volatilizing.

In order to prevent drying unevenness, the drying air after applying the coating composition for each layer on the substrate film is preferably at a wind velocity of 0.1 to 2 m/sec on the coating film surface while the solid content concentration of the coating composition is from 1 to 50%.

Also, after applying the coating composition for each layer on the support, the difference of temperature in the drying zone between the substrate film and a transport roll in contact with the surface opposite the coated surface of the substrate film is preferably set to be from 0 to 20° C., because drying unevenness due to uneven heat transfer on the transport roll can be prevented.

(Curing)

After drying the solvent in the drying zone, the coating film is cured by passing the film in the form of a web through a zone for curing each coating film by ionizing radiation and/or heat. For example, when the coating film is ultraviolet-curable, the layer is preferably cured by irradiating an ultraviolet ray in an irradiation dose of 10 to 1,000 mJ/cm$^2$ by using an ultraviolet lamp. At this time, the irradiation dose distribution in the width direction of web is preferably, including both edges, from 50 to 100%, more preferably from 80 to 100%, based on the maximum irradiation dose in the center. Furthermore, in the case where the oxygen concentration needs to be reduced by purging with a nitrogen gas or the like so as to accelerate the surface curing, the oxygen concentration is preferably 5 volume % or less, more preferably from 0.01 to 5 volume %. Particularly, the oxygen concentration in curing the low refractive index layer is preferably 0.1 volume % or less, more preferably 0.05 volume % or less, still more preferably 0.02 volume % or less. The oxygen concentration distribution in the width direction is preferably 2 volume % or less.

In the case where the curing percentage (100-residual functional group content) of the light-scattering layer reaches a certain value less than 100%, at the time of providing the low refractive index layer of the present invention thereon and curing the low refractive index layer by ionizing radiation and/or heat, the curing percentage of the light-scattering layer as the lower layer preferably becomes higher than that before providing the low refractive index layer, because the adhesion property between the light-scattering layer and the low refractive index layer is improved.

In producing a polarizing plate by using the light-scattering film of the present invention for one of protective films on both sides of the polarizer, the surface of the transparent support opposite the side having the light-scattering layer structure, that is, the surface on the side stacked with the polarizer, is preferably hydrophilized to improve the adhesive property on the adhesion surface. The hydrophilized surface is effective for improving the adhesive property with the adhesive layer comprising polyvinyl alcohol as a main component. The hydrophilizing treatment of the light-scattering film or the antireflection film including an antireflection layer is preferably the following saponification treatment.

(Saponification Treatment)

(1) Method by Dipping in Alkali Solution

This is a technique of dipping the light-scattering film or antireflection film in an alkali solution under appropriate conditions to saponify all the surface having reactivity with an alkali on the entire surface of the film. This method requires no special equipment and is preferred in view of cost. The alkali solution is preferably an aqueous sodium hydroxide solution. The concentration is preferably from 0.5 to 3 mol/L, more preferably from 1 to 2 mol/L. The liquid temperature of the alkali solution is preferably from 30 to 75° C., more preferably from 40 to 60° C.

The combination of the saponification conditions is preferably a combination of relatively mild conditions but may be selected according to the material or constitution of the light-scattering film or antireflection film or the objective contact angle. The film after dipping in an alkali solution is preferably well washed with water or dipped in a dilute acid to neutralize the alkali component and thereby not allow the alkali component to remain in the film.

By the saponification treatment, the transparent support surface opposite the surface having the light-scattering layer or antireflection layer is hydrophilized. The protective film for polarizing plate is used by bonding the hydrophilized surface of the transparent support to the polarizer.

The hydrophilized surface is effective for improving the adhesive property to the adhesive layer comprising polyvinyl alcohol as a main component.

In the saponification treatment, the contact angle with water on the transparent support surface opposite the surface having the light-scattering layer or low refractive index layer is preferably lower in view of adhesive property to the polarizer, but, on the other hand, in the dipping method, the surface having the light-scattering layer or low refractive index layer as well as the inside of the layer are also damaged by an alkali and therefore, it is important to select minimum necessary reaction conditions. Particularly in the case where the transparent support is triacetyl cellulose, the contact angle with water of the transparent support surface on the opposite side, when used as the index for the damage of each layer by an alkali, is preferably from 10 to 50°, more preferably from 30 to 50°, still more preferably from 40 to 50°. If the contact angle exceeds 50°, there arises a problem in the adhesive property to the polarizer and this is not preferred, whereas if the contact angle is less than 10°, the damage is too large and the physical strength may be disadvantageously impaired.

(2) Method by Coating of Alkali Solution

In order to avoid the damage of each film in the dipping method, an alkali solution coating method where an alkali solution is coated only on the surface opposite the surface having the light-scattering layer or low refractive index layer under appropriate conditions and the coating is then heated, water-washed and dried, is preferably used. In this case, the "coating" means to contact an alkali solution or the like only with the surface to be saponified and includes spraying or contact with a belt or the like impregnated with the solution, other than coating. When such a method is employed, equipment and step for coating the alkali solution are separately required and therefore, this method is inferior to the dipping method of (1) in view of the cost. However, since the alkali solution comes into contact only with the surface to be saponified, the film may have a layer using a material weak to an alkali solution on the opposite surface. For example, a vapor deposition film or a sol-gel film is subject to various effects such as corrosion, dissolution and separation by an alkali solution and is not preferably provided in the case of dipping method, but in this coating method, such a film does not contact with the solution and therefore, can be used without problem.

The saponification methods (1) and (2) either can be performed after unrolling a roll-form support and forming respective layers and therefore, the treatment may be added after the production step of the light-scattering film and performed in a series of operations. By continuously performing also a step of laminating the film to a polarizing plate comprising a support which is unrolled similarly, a polarizing plate can be produced with higher efficiency than in the case of performing the same operations in the sheet-fed manner.

(3) Method of Performing Saponification by Protecting Light-Scattering Layer or Antireflection Layer with Layered Film Similarly to (2) above, when the light-scattering layer and/or the low refractive index layer is insufficient in the resistance against an alkali solution, a method where after a final layer is formed, a layered film is stacked on the surface where the final layer is formed, the layered product is then dipped in an alkali solution to hydrophilize only the triacetyl cellulose surface opposite the surface where the final layer is formed, and the layered film is thereafter peeled off, may be employed. Also in this method, a hydrophilizing treatment enough as a protective film for polarizing plate can be applied only to the surface of the triacetyl cellulose film opposite the surface where the final layer is formed, without damaging the light-scattering layer or low refractive index layer. As compared with the method (2), this method is advantageous in that an apparatus for coating a special alkali solution is not necessary, though the layered film remains as a waste.

(4) Method by Dipping in Alkali Solution after Formation Up to Light-Scattering Layer In the case where the layers up to the light-scattering layer have resistance against an alkali solution but the low refractive index layer is insufficient in the resistance against an alkali solution, a method of forming the layers up to the light-scattering layer, then dipping the film in an alkali solution to hydrophilize both surfaces, and thereafter forming the low refractive index layer on the light-scattering layer, may be employed. The production process becomes cumbersome, but particularly when the low refractive index layer has a hydrophilic group, such as fluorine-containing sol-gel film, the interlayer adhesion between the light-scattering layer and the low refractive index layer is advantageously enhanced.

(5) Method of Forming Light-Scattering Layer or Antireflection Layer on Previously Saponified Triacetyl Cellulose Film After previously saponifying a triacetyl cellulose film, for example, by dipping it in an alkali solution, the light-scattering layer and the low refractive index layer may be formed on either one surface directly or through another layer. In the case of performing the saponification by dipping the film in an alkali solution, the interlayer adhesion between the light-scattering layer or other layer and the triacetyl cellulose surface hydrophilized by the saponification is sometimes worsened. Such a problem can be solved by applying, after saponification, a treatment such as corona discharge or glow discharge only to the surface where the light-scattering layer or other layer is formed, thereby removing the hydrophilized surface, and then forming the light-scattering layer or other layer. Also, when the light-scattering layer or other layer has a hydrophilic group, good interlayer adhesion may be obtained.

The polarizing plate using the light-scattering film of the present invention (preferably light-scattering film or antireflection film), and the liquid crystal display using the polarizing plate are described below.

(Polarizing Plate)

The polarizing plate of the present invention has the light-scattering film (preferably antireflection film) of the present invention as at least one protective film (protective film for polarizing plate) of the polarizer. In the protective film for polarizing plate, as described above, the contact angle with water on the surface of the transparent support opposite the side having the light-scattering layer or antireflection layer, that is, on the surface stacked with the polarizer, is preferably from 10 to 50°. For example, the light-scattering film of the present invention can be disposed on the outermost surface of the display by providing an adhesive layer on one surface of the film. The light-scattering film of the present invention is preferably sued for at least one protective film out of two protective films sandwiching the polarizer from both sides in a polarizing plate.

By virtue of using the light-scattering film of the present invention as the protective film for polarizing plate, a polarizing plate excellent in the physical strength and light resistance and having a light-scattering function or antireflection function can be produced, and great reduction in the cost and thinning of the display can be realized. Also, when the polarizing plate is produced by using the light-scattering film of the present invention as one protective film for polarizing plate and using an optically compensatory film having optical anisotropy, which is described later, as another protective film of the polarizer, a polarizing plate capable of providing a liquid crystal display improved in the visibility or contrast in a bright room and assured of remarkably widened view angle in the vertical and horizontal directions can be produced.

An image display prevented from reflection or the like of outside light and excellent in the scratch resistance, antifouling property and the like can be obtained when the light-scattering film of the present invention or a polarizing plate using the light-scattering film is used for the outermost surface layer of the display part of an image display.

(Optically Compensatory Film)

The viewing angle property of liquid crystal display screen can be improved by providing an optically compensatory film (optically anisotropic film) in the polarizing plate of the present invention. The optically compensatory film can be preferably used on the side opposite the light-scattering film of the present invention across a polarizer. The optically compensatory film may be stacked, out of the protective films for polarizing plate, to the protective film on the side opposite the film of the present invention used as the protective film, or may be used as the protective film on the opposite side. In view of the thickness of the polarizing plate, it is particularly preferred that the film of the present invention is used as the protective film on one side and an optically compensatory film is used as the protective film on the opposite side across a polarizer. The optically compensatory film itself may be made to have specific optical anisotropy by incorporating a substance having optical anisotropy into the film itself, by stretching the film or by performing both, or an optically anisotropic layer (retardation layer) may be provided on the film.

The optically compensatory film may be a known optically compensatory film but from the standpoint of widening the viewing angle, this is preferably an optically compensatory film characterized by having an optically anisotropic layer composed of a compound having a discotic structural unit, in which the disc face of the discotic compound is inclined with respect to the protective film face and the angle made between the disc face of the discotic compound and the protective film face is changing along with distance from the protective film face (changing in the depth direction of the optically anisotropic layer).

The angle is preferably increased as the distance from the protective film face side of the optically anisotropic layer composed of the discotic compound increases.

For enhancing the contrast and improving the color tint of the liquid crystal display, it is also preferred to use a cellulose acylate film being substantially optically isotropic due to small optical anisotropy (Re, Rth) and having small wavelength dispersion of the optical anisotropy (Re, Rth). In the case of a reflective display, use of a film comprising one film or a plurality of films and having a λ/4 plate function is also preferred.

In the case of using the optically compensatory film as a protection film of the polarizer, the surface to be stacked to the polarizer is preferably subjected to saponification treatment and the saponification is preferably performed according to the above-described saponification treatment.

(Polarizer)

The polarizer may be a known polarizer or a polarizer cut out from a lengthy polarizer with the absorption axis of the polarizer being neither parallel nor perpendicular to the longitudinal direction. The lengthy polarizer with the absorption axis of the polarizer being neither parallel nor perpendicular to the longitudinal direction is produced by the following method.

This is a polarizer obtained by continuously feeding a polymer film and stretching the film while holding both edges of the film with holding means and applying a tension and can be produced by a stretching method of stretching the film to from 1.1 to 20.0 times at least in the film width direction, moving the holding devices at both edges of the film to create a difference in the travelling speed of 3% or less in the longitudinal direction, and bending the film travelling direction in the state of the film being held at both edges such that the angle made by the film travelling direction at the outlet in the step of holding both edges of the film and the substantial stretching direction of the film is inclined at 20 to 70°. Particularly, a polarizer produced with an inclination angle of 45° is preferred in view of productivity.

The stretching method of a polymer film is described in detail in JP-A-2002-86554 (paragraphs (0020) to (0030)).

<Image Display>

The light-scattering film of the present invention and the polarizing plate using the film can be used in an image display such as liquid crystal display (LCD), plasma display panel (PDP), electroluminescent display (ELD), cathode ray tube display (CRT), field emission display (FED) and surface-conduction electron-emitter display (SED). The film (or polarizing plate) of the present invention has a transparent support and therefore, is used by bonding the transparent support side to the image display surface of the image display.

In the case of using the film of the present invention as one surface protective film of a polarizer, the film can be preferably used for a transmissive, reflective or transflective liquid crystal display in a mode such as twisted nematic (TN), super twisted nematic (STN), vertical alignment (VA), in-plane switching (IPS), optically compensated bend cell (OCB) and ECB. In particular, the film can be preferably used for a large-size liquid crystal television or the like in a mode such as VA, IPS and OCB. In the application to a large-size liquid crystal television or the like, the diagonal of the display screen is preferably 20 inches or more.

The VA-mode liquid crystal cell includes (1) a VA-mode liquid crystal cell in a narrow sense where rod-like liquid crystalline molecules are oriented substantially in a vertical alignment at the time of not applying a voltage and oriented substantially in a horizontal alignment at the time of applying a voltage (described in JP-A-2-176625); (2) a (MVA-mode) liquid crystal cell where the VA mode is modified to a multi-domain system for enlarging the viewing angle (described in *SID97, Digest of Tech. Papers* (preprints), 28, 845 (1997)); (3) a (n-ASM-mode) liquid crystal cell where rod-like liquid crystalline molecules are oriented substantially in a vertical alignment at the time of not applying a voltage and oriented in a twisted multi-domain alignment at the time of applying a voltage (described in preprints of Nippon Ekisho Toronkai (Liquid Crystal Forum of Japan), 58-59 (1998)); and (4) a SURVAIVAL-mode liquid crystal cell (reported in LCD International 98).

The OCB-mode liquid crystal cell is a liquid crystal display using a liquid crystal cell of bend alignment mode where rod-like liquid crystalline molecules are aligned substantially in opposite directions (symmetrically) between the upper part and the lower part of the liquid crystal cell, and this is disclosed in U.S. Pat. Nos. 4,583,825 and 5,410,422. Since rod-like liquid crystalline molecules are aligned symmetrically between the upper part and the lower part of the liquid crystal cell, the liquid crystal cell of bend alignment mode has a self-optically compensating ability. Accordingly, this liquid crystal mode is also called an OCB (optically compensatory bend) liquid crystal mode. A liquid crystal display of bend alignment mode is advantageous in that the response speed is fast.

In the ECB-mode liquid crystal cell, rod-like liquid crystalline molecules are oriented substantially in a horizontal alignment at the time of not applying a voltage. This is most popularly used as a color TFT liquid crystal display and is described in a large number of publications such as *EL, PDP, LCD Display*, Toray Research Center (2001).

EXAMPLES

The present invention is described in greater detail below by referring to Examples, but the present invention should not be construed as being limited thereto. Unless otherwise indicated, the "parts" and "%" are on the mass (weight) basis.

Example 1

(Synthesis of Perfluoroolefin Copolymer (1))

Perfluoroolefin Copolymer (1):

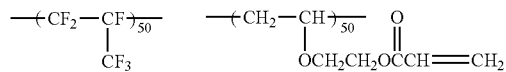

(50:50 indicates a molar ratio)

In a stainless steel-made autoclave having an inner volume of 100 ml and equipped with a stirrer, 40 ml of ethyl acetate, 14.7 g of hydroxyethyl vinyl ether and 0.55 g of dilauroyl peroxide were charged, and the inside of the system was degassed and displaced with nitrogen gas. Furthermore, 25 g of hexafluoropropylene (HFP) was introduced into the autoclave, and the temperature was elevated to 65° C. The pressure when the temperature in the autoclave reached 65° C. was 0.53 MPa (5.4 kg/cm$^2$). The reaction was continued for 8 hours while keeping this temperature and when the pressure reached 0.31 MPa (3.2 kg/cm$^2$), the heating was stopped and the system was allowed to cool. At the time when the inner temperature dropped to room temperature, the unreacted monomer was expelled and the autoclave was opened to take out the reaction solution. The obtained reaction solution was poured in a large excess of hexane and after removing the solvent by decantation, the precipitated polymer was taken out. This polymer was dissolved in a small amount of ethyl acetate, and the residual monomer was completely removed by performing reprecipitation twice from hexane. After drying, 28 g of a polymer was obtained. Subsequently, 20 g of this polymer was dissolved in 100 ml of N,N-dimethylacetamide, and 11.4 g of acrylic acid chloride was added dropwise thereto under ice cooling, followed by stirring at room temperature for 10 hours. Thereafter, ethyl acetate was added to the reaction solution, and the resulting solution was washed with water. The organic layer was extracted and then concentrated, and the obtained polymer was reprecipitated from hexane to obtain 19 g of Perfluoroolefin Copolymer (1). The refractive index of the obtained polymer was 1.421.

(Preparation of Sol Solution a)

In a reaction vessel equipped with a stirrer and a reflux condenser, 120 parts of methyl ethyl ketone, 100 parts of acryloyloxypropyltrimethoxysilane (KBM-5103, produced by Shin-Etsu Chemical Co., Ltd.) and 3 parts of diisopropoxyaluminum ethyl acetate were added and mixed and after adding 30 parts of ion-exchanged water, the reaction was allowed to proceed at 60° C. for 4 hours. The reaction solution was cooled to room temperature to obtain Sol Solution a. The mass average molecular weight was 1,600 and out of the oligomer or higher components, the proportion of the components having a molecular weight of 1,000 to 20,000 was 100%. Also, the gas chromatography analysis revealed that the raw material acryloyloxypropyltrimethoxysilane was not remaining at all.

| (Preparation of Coating Solution A for Light-Scattering Layer) | |
|---|---|
| PET-30 | 40.0 g |
| DPHA | 6.0 g |
| IRGACURE 184 | 1.7 g |
| MX-600 (30%) | 21.5 g |
| SP-13 | 0.06 g |
| KBM-5103 | 6.0 g |
| MIBK | 18.0 g |
| MEK | 6.0 g |
| (Preparation of Coating Solution B for Light-Scattering Layer) | |
| PET-30 | 37.0 g |
| DPHA | 5.0 g |
| IRGACURE 184 | 1.7 g |
| MX-600 (30%) | 33.5 g |
| SP-13 | 0.06 g |
| KBM-5103 | 6.0 g |
| MIBK | 18.0 g |
| MEK | 6.0 g |
| (Preparation of Coating Solution C for Light-Scattering Layer) | |
| PET-30 | 45.0 g |
| DPHA | 5.0 g |
| IRGACURE 184 | 2.0 g |

-continued

| | |
|---|---|
| SX-350 (30%) | 1.7 g |
| Crosslinked acryl-styrene particle (30%) | 13.3 g |
| SP-13 | 0.06 g |
| KBM-5103 | 10.0 g |
| Toluene | 30.5 g |
| Cyclohexanone | 8.0 g |
| (Preparation of Coating Solution D for Hardcoat Layer) | |
| PET-30 | 49.5 g |
| DPHA | 5.0 g |
| IRGACURE 184 | 3.0 g |
| SP-13 | 0.06 g |
| KBM-5103 | 10.0 g |
| Toluene | 36.0 g |
| Cyclohexanone | 13.0 g |
| (Preparation of Coating Solution E for Light-Scattering Layer) | |
| PET-30 | 48.5 g |
| IRGACURE 127 | 2.5 g |
| MX-500 (30%) | 42.7 g |
| SP-13 | 0.08 g |
| MIBK | 1.6 g |
| MEK | 53.8 g |
| (Preparation of Coating Solution F for Light-Scattering Layer) | |
| PET-30 | 53.3 g |
| IRGACURE 184 | 2.0 g |
| MX-500 (30%) | 26.6 g |
| SYLYSIA 445 (30%) | 1.5 g |
| SP-13 | 0.08 g |
| MIBK | 28.5 g |
| MEK | 5.6 g |
| (Preparation of Coating Solution G for Light-Scattering Layer) | |
| PET-30 | 48.5 g |
| IRGACURE 184 | 2.5 g |
| MX-500 (30%) | 42.7 g |
| MEK-ST | 53.8 g |
| SP-13 | 0.08 g |
| MIBK | 1.6 g |
| (Preparation of Coating Solution H for Hardcoat Layer) | |
| PET-30 | 45.9 g |
| SYLYSIA 445 (30%) | 1.5 g |
| IRGACURE 184 | 1.5 g |
| SP-13 | 0.5 g |
| MIBK | 30.0 g |
| MEK | 10.0 g |

As for Coating Solutions A to C and E to G for Light-Scattering Layer and Coating Solutions D and H for Hardcoat Layer, each composition above was stirred and then filtered through a polypropylene-made filter having a pore size of 1 µm to prepare a coating solution for light-scattering layer or hardcoat layer. The refractive index of the layer formed of each of Coating Solutions A to C, E and F for Light-scattering layer and Coating Solutions D and H for Hardcoat Layer was 1.52. The refractive index of the layer formed of Coating Solution G for Light-Scattering Layer was 1.505.

The compounds used are as follows.

PET-30:

A mixture of pentaerythritol triacrylate and pentaerythritol tetraacrylate (produced by Nippon Kayaku Co., Ltd.).

DPHA:

A mixture of dipentaerythritol pentaacrylate and dipentaerythritol hexaacrylate (refractive index: 1.52, produced by Nippon Kayaku Co., Ltd.)

KBM-5103:

A silane coupling agent (produced by Shin-Etsu Chemical Co., Ltd.)

IRGACURE 184:

A polymerization initiator (produced by Ciba Specialty Chemicals Corp.)

IRGACURE 127:

A polymerization initiator (produced by Ciba Specialty Chemicals Corp.)

MX-600:

A PMMA particle having an average particle diameter of 6 µm (refractive index: 1.49, produced by Soken Kagaku K.K., a 30% MIBK liquid dispersion, used after dispersion in a polytron dispersing machine at 10,000 rpm for 20 minutes)

MX-500:

A PMMA particle having an average particle diameter of 5 µm (refractive index: 1.49, produced by Soken Kagaku K.K., a 30% MIBK liquid dispersion, used after dispersion in a polytron dispersing machine at 10,000 rpm for 20 minutes)

SX-350

A crosslinked polystyrene particle having an average particle diameter of 3.5 µm (refractive index: 1.61, produced by Soken Kagaku K.K., a 30% toluene liquid dispersion, used after dispersion in a polytron dispersing machine at 10,000 rpm for 20 minutes)

Crosslinked Acryl-Styrene Particle:

Average particle diameter of 3.5 µm (refractive index: 1.55, produced by Soken Kagaku K.K., a 30% toluene liquid dispersion, used after dispersion in a polytron dispersing machine at 10,000 rpm for 20 minutes)

SYLYSIA 445:

A silica particle having an average particle diameter of 6.2 µm (refractive index: 1.45, produced by Fuji Silysia Chemical Ltd., a 30% MEK liquid dispersion, used after dispersion in a polytron dispersing machine at 10,000 rpm for 20 minutes)

MEK-ST:

A colloidal silica dispersion (average particle diameter: 10 to 20 nm, solid content concentration: 30 mass %, produced by Nissan Chemicals Industries, Ltd.)

SP-13

Fluorine-containing polymer described in the specification (Preparation of Coating Solution A for Low Refractive Index Layer)

A thermal crosslinking fluorine-containing polymer (JTA113, solid content concentration: 6%, produced by JSR Corp.) containing polysiloxane and a hydroxyl group and having a refractive index of 1.44 (13 g), 1.3 g of colloidal silica liquid dispersion MEK-ST-L (trade name, produced by Nissan Chemicals Industries, Ltd., average particle diameter: 45 nm, refractive index: 1.45, solid content concentration: 30%), 0.6 g of Sol Solution a, 5 g of methyl ethyl ketone and 0.6 g of cyclohexanone were added and after stirring, the resulting solution was filtered through a polypropylene-made filter having a pore size of 1 µm to prepare Coating Solution A for Low Refractive Index Layer. The refractive index of the layer formed of this coating solution was 1.450.

(Preparation of Coating Solution B for Low Refractive Index Layer)

(Liquid Dispersion A)

Acryloyloxypropyltrimethoxysilane (produced by Shin-Etsu Chemical Co., Ltd.) (30 g) and 1.5 g of diisopropoxy-aluminum ethyl acetate were added and mixed to 500 g of a hollow silica fine particle sol (isopropyl alcohol silica sol, produced according to Preparation Example 4 of JP-A-2002-

79616 by changing the size, average particle diameter: 60 nm, shell thickness: 10 nm, silica concentration: 20 mass %, refractive index of silica particle: 1.31) and after adding thereto 9 g of ion-exchanged water, the reaction was allowed to proceed at 60° C. for 8 hours. The reaction solution was then cooled to room temperature and 1.8 g of acetylacetone was added thereto. While adding cyclohexanone to 500 g of the obtained liquid dispersion to keep constant the silica content, the solvent was displaced by reduced-pressure distillation at a pressure of 20 kPa. No foreign matter was generated in the liquid dispersion and when the solid content concentration was adjusted to 20 mass % with cyclohexanone, the viscosity at 25° C. was 5 mPa·s. The amount of residual isopropyl alcohol in Liquid Dispersion A obtained was analyzed by gas chromatography and found to be 1.5%.

(Coating Solution B)

195 Parts by mass (39.0 parts by mass as the solid content of silica+surface treating agent) of Liquid Dispersion A, 30.0 parts by mass (9.0 parts by mass as the solid content) of a colloidal silica dispersion (silica, MEK-ST differing in the particle diameter, average particle diameter: 45 nm, solid content concentration: 30%, produced by Nissan Chemicals Industries, Ltd.), and 17.2 parts by mass (5.0 parts by mass as the solid content) of Sol Solution a were added to 783.3 parts by mass (47.0 parts by mass) of Opstar JTA113 (a thermally crosslinking fluorine-containing polymer composition (solid content: 6%) produced by JSR Corp.). The resulting solution was diluted with cyclohexane and methyl ethyl ketone such that the solid content concentration of the entire coating solution became 6 mass % and the ratio between cyclohexane and methyl ethyl ketone became 10:91. In this way, Coating Solution B for Low Refractive Index Layer was prepared. The refractive index of the layer formed of this coating solution was 1.390.

(Preparation of Coating Solution C for Low Refractive Index Layer)

240 Parts by mass (48.0 parts by mass as the solid content of silica+surface treating agent) of Liquid Dispersion A and 17.2 parts by mass (5.0 parts by mass as the solid content) of Sol Solution a were added to 783.3 parts by mass (47.0 parts by mass) of Opstar JN7228 (a thermally crosslinking fluorine-containing polymer composition (solid content: 6%) produced by JSR Corp.). The resulting solution was diluted with cyclohexane and methyl ethyl ketone such that the solid content concentration of the entire coating solution became 6 mass % and the ratio between cyclohexane and methyl ethyl ketone became 10:90. In this way, Coating Solution C for Low Refractive Index Layer was prepared. The refractive index of the layer formed of this coating solution was 1.365.

(Preparation of Coating Solution D for Low Refractive Index Layer)

Coating Solution D for Low Refractive Index Layer was prepared in the same manner as Coating Solution C for Low Refractive Index Layer except that 43 parts by mass of Perfluoroolefin Copolymer (1), 2 parts by mass of reactive silicone X-22-164B (trade name, produced by Shin-Etsu Chemical Co., Ltd.), 7.3 g of Sol Solution a, and 2 parts by mass of a photopolymerization initiator (IRGACURE 907 (trade name), produced by Ciba Specialty Chemicals Corp.) were used in place of 47 parts by mass as the solid content of Opstar JN7228 in Coating Solution C for Low Refractive Index Layer. The refractive index of the layer formed of this coating solution was 1.370.

(Preparation of Coating Solution E for Low Refractive Index Layer)

Coating Solution E for Low Refractive Index Layer was prepared in the same manner as Coating Solution D for Low Refractive Index Layer except that in Coating Solution D for Low Refractive Index Layer, 320 parts by mass (64.0 parts by mass as the solid content of silica+surface treating agent) of Liquid Dispersion A and 22.9 parts by mass (6.7 parts by mass as the solid content) of Sol Solution a were used in place of 240 parts by mass (48.0 parts by mass as the solid content of silica+surface treating agent) of Liquid Dispersion A and 17.2 parts by mass (5.0 parts by mass as the solid content) of Sol Solution a. The refractive index of the layer formed of this coating solution was 1.320.

Example 1

(1) Coating of Light-Scattering Layer

A 80 μm-thick triacetyl cellulose film (TAC-TD80U, produced by Fuji Photo Film Co., Ltd., refractive index: 1.49) in a roll form was unrolled as the transparent support, and Coating Solution A for Light-Scattering Layer was coated thereon by the die coating method shown in Constitution of Apparatus and Coating Conditions below and after drying at 30° C. for 15 seconds and at 90° C. for 20 seconds, irradiated with an ultraviolet ray at an irradiation dose of 90 mJ/cm$^2$ by using an air-cooled metal halide lamp (manufactured by Eye Graphics Co., Ltd.) of 160 W/cm under nitrogen purging (for adjusting the oxygen concentration to 0.05 volume %), whereby the coated layer was cured and a 12 μm-thick light-scattering layer having antiglare property was formed. The resulting film was taken up.

Basic Conditions:

A slot die 13 where the upstream lip land length $I_{UP}$ is 0.5 mm, the downstream lip land length $I_{LO}$ is 50 μm, the length of the opening of the slot 16 in the web running direction is 150 μm and the length of the slot 16 is 50 mm, was used. The gap between the upstream lip land 18a and the web W was set 50 μm longer than the gap between the downstream lip land 18b and the web W (hereinafter referred to a 50-μm overbite length), and the gap $G_L$ between the downstream lip land 18b and the web W was set to 50 μm. The gap $G_s$ between the side plate 40b of the low-pressure chamber 40 and the web W and the gap $G_B$ between the back plate 40a and the web W both were set to 200 μm. The coating was performed by setting the conditions according to liquid properties of each coating solution, that is, the light-scattering layer was coated under the conditions such that the coating speed was 20 m/min and the wet coated amount was 17.5 ml/m$^2$ in the case of Coating Solutions A, C, E, F and G for Light-Scattering Layer and Coating Solution D for Hardcoat Layer, and the coating speed was 40 m/min and the wet coated amount was 21.0 ml/m$^2$ in the case of Coating Solution B for Light-Scattering Layer; the hard coat layer was coated under the conditions such that the coating speed was 30 m/min and the wet coated amount was 13.8 ml/m$^2$ in the case of Coating Solution H for Hardcoat Layer; and the low refractive index layer was coated under the conditions such that the coating speed was 40 m/min and the wet coated amount was 5.0 ml/m$^2$. The coating width was 1,300 mm and the effective width was 1,280 mm.

(2) Coating of Low Refractive Index Layer

The triacetyl cellulose film in which the light-scattering layer was provided by applying Coating Solution A for Light-Scattering Layer, was again unrolled, and Coating Solution A for Low Refractive Index Layer was coated thereon under the above-described basic conditions and after drying at 120° C. for 150 seconds and further at 140° C. for 8 minutes, irradiated with an ultraviolet ray at an irradiation dose of 300 mJ/cm² by using an air-cooled metal halide lamp of 240 W/cm (manufactured by Eye Graphics Co., Ltd.) under nitrogen purging (for adjusting the oxygen concentration to 0.05 volume %), thereby forming a low refractive index layer having a thickness of 95 nm. The resulting film was taken up.

(3) Saponification Treatment of Light-Scattering Film

After the formation of the low refractive index layer, the sample was subjected to the following treatment.

An aqueous 1.5 mol/l sodium hydroxide solution was prepared and kept at a temperature of 55° C. Separately, an aqueous 0.01 mol/l dilute sulfuric acid solution was prepared and kept at a temperature of 35° C. The light-scattering film produced was dipped in the aqueous sodium hydroxide solution for 2 minutes and then dipped in water to thoroughly wash out the aqueous sodium hydroxide solution. Subsequently, the film was dipped in the aqueous dilute sulfuric acid solution for 1 minute and then dipped in water to thoroughly wash out the aqueous dilute sulfuric acid solution. Finally, the sample was thoroughly dried at 120° C. In this way, a saponified light-scattering film was produced. This is designated as Sample 1-1.

The coating and curing of coating solutions for light-scattering layer and/or hardcoat layer or low refractive index layer and the saponification treatment were performed in the same manner as in Example 1-1 except that the coating solution for light-scattering layer and/or the coating solution for hardcoat layer or the coating solution for low refractive layer and the film thickness of each layer were changed as shown in Tables 1, 2, 3 and 4. The coating and curing conditions of the coating solution for hardcoat layer were the same as those of Coating Solution A for Light-Scattering Layer of Sample 1-1. Also, light-scattering films were produced in the same coating and curing conditions as those of Coating Solution C for Low Refractive Index Layer of Example 1-9 except that only Coating Solution E for Low Refractive Index Layer was used, the drying after coating was changed to 120° C.×90 seconds, and the irradiation dose of ultraviolet ray was changed to 900 mJ/cm².

(Evaluation of Light-Scattering Film)

The films obtained were evaluated on the following items. The results are shown in Tables 5 and 6.

(1) Specular Reflectance, a*, b*

The back surface of the film was roughened with sand paper and then treated with black ink to eliminate the back surface reflection and in this state, the specular reflectance for the outgoing angle of −5° at an incident angle of 5° (an incident angle us between incident light and the normal line of the film surface) was measured on the front surface side in the wavelength region of 380 to 780 nm by using a spectrophotometer (manufactured by JASCO Corp.), and an average specular reflectance (Rs) in the range of 450 to 650 nm was calculated. Furthermore, the a* value and the b* value of the CIE1976 L*a*b* color space indicating the color tint of regularly reflected light for 5° incident light of a CIE standard illuminant D65 were calculated from the reflection spectrum measured, and the color tint of reflected light was evaluated.

(2) Integrated Reflectance

The back surface of the film was roughened with sand paper and then treated with black ink to eliminate the back surface reflection and in this state, the integration value (integrated reflectance) of reflectances for all outgoing angles at an incident angle of 5° was measured on the front surface side in the wavelength region of 380 to 780 nm by using a spectrophotometer (manufactured by JASCO Corp.) while fixing a standard white plate to the outgoing angle of −5°, whereby the integrated spectral reflectance was measured. The average integrated reflectance in the range of 450 to 650 nm was calculated.

(3) Scattering Coefficient A (1) Measurement of Reflection Intensity

As shown in FIG. 8A, white parallel rays of about 5 mmφ were made incident on the surface of Light-scattering Film Sample A at an incident angle of 5°, and the angle dependency of reflected light intensity was measured by continuously changing in 0.1° steps the angle of the light-receiving part G in the plane C containing the incident light direction E and the film normal line direction D. The measuring device used was an automatic goniophotometer "Model GP-5" manufactured by Murakami Color Research Laboratory. FIG. 8B is a three-dimensional view showing the measuring method.

In calculating the reflectance, the light quantity IO of the light source determined by directly measuring the incident light without the sample was designated as 100% intensity. Assuming that the reflection intensity at each reflection angle is I(θ), the reflectance R(θ) can be calculated by I(θ)/IO. Furthermore, the relative reflectance Rrel(θ) was calculated as a ratio of the reflectance at each reflection angle to the reflectance R(5) at the reflection angle (5°) of regular reflection, that is, Rrel=R(θ)/R(5). The variation |dRrel(θ)/dθ| of the relative reflectance with respect to the reflection angle θ (the range of θ is from 0 to 45 degrees) was calculated as an absolute value of the gradient a of the 10-point average values on both sides of each point in the data measured in 0.1° steps and from |dRrel(θ)/dθ|max which is a maximum value of |dRrel(θ)/dθ|, the scattering coefficient A was calculated according to (formula 1). The 10-point average value was used as the processing for removing noises of the data.

FIG. 9 schematically shows the calculation of |dRrel(θ)/dθ|max. The abscissa is the angle θ (unit: °) of the light-receiving part with respect to the film normal line and the ordinate is the relative reflectance Rrel(θ) normalized by the peak intensity. The tangent line H is one of tangent lines at respective points in the graph showing the angle dependency of the relative reflectance. The gradient of the tangent line is |dRrel(θ)/dθ| and its maximum value is |dRrel(θ)/dθ|max. From the thus-determined |dRrel(θ)/dθ|, the scattering coefficient A was calculated according to (formula 1).

$$\text{Scattering coefficient } A = (1/(10 \times |dRrel(\theta)/d\theta|\max)) \quad \text{(Formula 1)}$$

(4) Reflection Coefficient B

The reflection coefficient was calculated from the specular reflectance Rs and the scattering coefficient B according to (formula 2).

$$\text{Reflection coefficient } B = 2.2 \times \log 10(Rs) - 7.5 \times \log 10(A) + 5.9$$

(5) Haze

The entire haze (H), internal haze (Hi) and surface haze (Hs) of the obtained film were determined by the following measurements.

1. The entire haze value (H) of the obtained film was measured according to JIS-K7136.

2. After adding several silicone oil drops on the low refractive index side surface and back surface of the obtained film, the film was sandwiched from front and back by two 1 mm-thick glass plates (Microslide Glass No. S 9111, produced by Matsunami K.K.) and put into optically complete contact with two glass plates to provide a surface haze-removed state, and the haze was measured. From this value, the haze separately measured by interposing only the silicone oil between two glass plates was subtracted, and the value obtained was calculated as the internal haze (Hi).

3. The internal haze (Hi) determined in 2 above was subtracted from the entire haze (H) measured in 1 above, and the obtained value was calculated as the surface haze (Hs) of the film.

Incidentally, the haze value as used in the present invention means the entire haze (H) obtained by the method described above.

(6) Centerline Average Roughness Ra

The centerline average roughness Ra was measured according to JIS-B0601.

(7) Average Peak-Trough Distance Sm

The average value Sm of peak-trough periodic intervals was determined from the intersections of the roughness curve with the centerline according to JIS-B0601. In the Table, the mark "-" denotes immeasurable.

(8) Average Tilt Angle

The light-scattering film of the present invention has a fine irregularity structure on the surface. In the present invention, the average tilt angle is determined by the following method. Assuming that a triangular apex having an area of 0.5 to 2 square micrometers is the transparent film substrate surface, the angle between the normal line of a triangular face formed by connecting three points at which three perpendicular lines upward vertically extended from those points of the apex intersect with the film surface, and the perpendicular line upward vertically extending from the support is defined as the tilt angle on the surface and the average value at all measurement points formed by dividing the area of 250,000 square micrometers (0.25 square millimeter) or more on the substrate into those triangles is calculated as the average tilt angle.

Figure 11A:
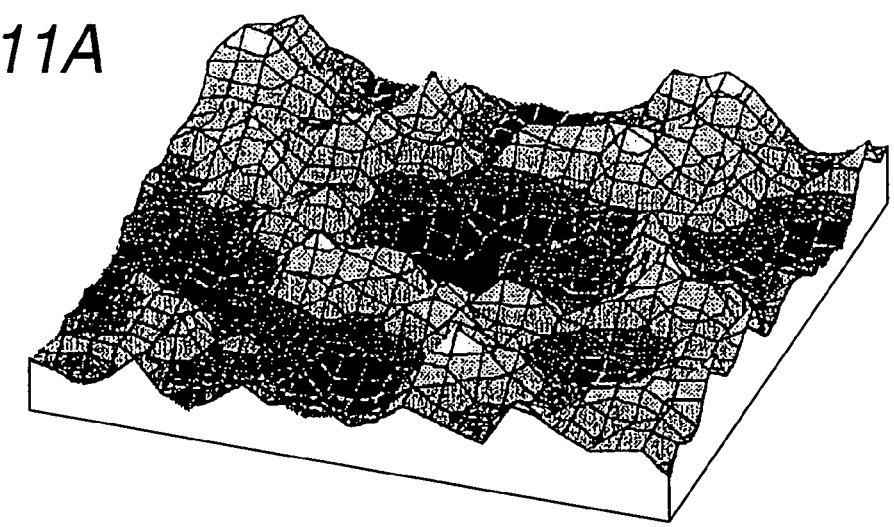
FIGS. 11A to 11C are views showing the method for measuring the average tilt angle.
Figure 11B:
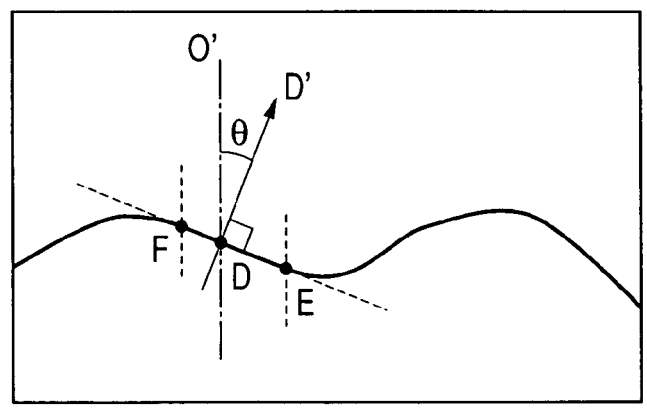
Figure 11C:
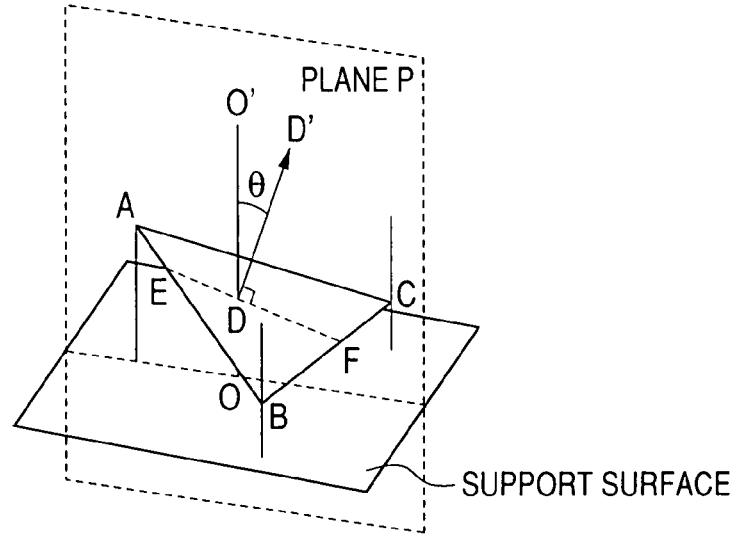

The method for measuring the tilt angle is described in more detail. The film is divided into meshes having an area of 0.5 to 2 square micrometers as shown in FIG. 11A. FIG. 11C is a view where three points of the divided meshes are extracted. Perpendicular lines are upward vertically extended from these three points on the support and the points where these three points intersect with the surface are designated as A, B and C. The angle θ between the normal line DD' of the triangular ABC face and the perpendicular line OO' upward vertically extended from the support is defined as the tilt angle. FIG. 11B is a cross-sectional view of the film cut at the plane P containing the points O'DD'. The line segment EF is an intersection line between the triangle ABC and the plane P. The measurement area is preferably 250,000 square micrometers (0.25 square millimeters) or more on the support, and this face is divided into triangles on the support and measured to determine the tilt angle. Some measuring devices are known, but one example is described here. The measurement using Model SXM520-AS150 manufactured by Micromap Corp. (U.S.A.) as the measuring device is described. For example, when the objective lens has a magnification of 10 times, the measuring unit of the tilt angle is 0.8 square micrometers and the measurement range is 500,000 square micrometers (0.5 square millimeters). When the magnification of the objective lens is increased, the measurement unit and the measurement range become small in proportion thereto. The measurement data are analyzed using a software such as MAT-LAB, whereby the tilt angle distribution can be calculated. The average tilt angle can be calculated based on the data obtained.

(9) Reflection

Polarizing plates were stacked using an adhesive on both sides of a glass in 300 mm (width)×300 mm (height)×0.7 mm (thickness) to make 90° between respective absorption axes, and the light-scattering film of the present invention was stacked on one polarizing plate by applying an adhesive to the tack film side. The antireflection film of the present invention was placed to stand upright in a bright room and a human face was reflected on the surface of the light-scattering film of the present invention from the 5-m distant position. The level of reflection was evaluated according to the following criteria.
  A: The outline is not recognized at all.
  B: The outline is scarcely recognized.
  C: The outline is recognized but not annoying.
  D: The outline is annoying.

(10) Light Brownish Looking

A bare fluorescent lamp without louver (8,000 cd/m$^2$) was reflected from an angle of −60° on the light-scattering film surface of the sample using the glass plate employed in the evaluation of reflection and the light brownish looking on the light-scattering film surface when observed from the direction at 45° was evaluated according to the following criteria.
  A: Not light brownish at all
  B: Scarcely light brownish.
  C: Light brownish but not annoying.
  D: Annoying light brownish.

(11) Aggregated State of Light-transmitting Fine Particles

The sample was photographed at a magnification of 400 times in the transmission observation mode of an optical microscope, and the aggregated state of light-transmitting fine particles was evaluated according to the following criteria. In the Table, the mark "-" means that the particle was not present and the observation was impossible.
  A: A plurality of aggregated parts are present and particles are overlapped in the aggregated part.
  B: Particles are overlapped but an aggregated part is not present.
  C: Particles are not overlapped.

TABLE 1

| Sample No. | Remarks | Substrate | First Layer | | | | Second Layer | |
| | | | Coating Solution | Average Film Thickness (μm) | Average Particle Diameter of Light-transmitting Particle (μm) | Average Film Thickness/Average Particle Diameter | Overcoat Coating Solution | Average Film Thickness (μm) |
|---|---|---|---|---|---|---|---|---|
| 1-1 | Invention | TD80U | A for Light-scattering layer | 12 | 6 | 2.00 | — | — |
| 1-2 | Comparative Example | TD80U | B for Light-scattering layer | 5.5 | 6 | 0.92 | — | — |

TABLE 1-continued

| | | | First Layer | | | | Second Layer | |
|---|---|---|---|---|---|---|---|---|
| Sample No. | Remarks | Substrate | Coating Solution | Average Film Thickness (μm) | Average Particle Diameter of Light-transmitting Particle (μm) | Average Film Thickness/Average Particle Diameter | Overcoat Coating Solution | Average Film Thickness (μm) |
| 1-3 | Invention | TD80U | B for Light-scattering layer | 5.5 | 6 | 0.92 | D for Overcoat Layer | 5.5 |
| 1-4 | Invention | TD80U | C for Light-scattering layer | 5 | 3.5 | 1.43 | — | — |
| 1-5 | Comparative Example | TD80U | C for Light-scattering layer | 4 | 3.5 | 1.14 | — | — |
| 1-6 | Comparative Example | TD80U | D for Hardcoat Layer | 12 | — | — | — | — |

TABLE 2

| Sample No. | Remarks | Substrate | Coating Solution for Low Refractive Index Layer | Average Film Thickness (nm) | Refractive Index |
|---|---|---|---|---|---|
| 1-7 | Invention | Sample 1-1 | A | 95 | 1.450 |
| 1-8 | Invention | Sample 1-1 | B | 98 | 1.390 |
| 1-9 | Invention | Sample 1-1 | C | 100 | 1.365 |
| 1-10 | Comparative Example | Sample 1-2 | A | 95 | 1.450 |
| 1-11 | Comparative Example | Sample 1-2 | B | 98 | 1.390 |
| 1-12 | Comparative Example | Sample 1-2 | C | 100 | 1.365 |
| 1-13 | Invention | Sample 1-3 | A | 95 | 1.450 |
| 1-14 | Invention | Sample 1-3 | B | 98 | 1.390 |
| 1-15 | Invention | Sample 1-3 | C | 100 | 1.365 |
| 1-16 | Invention | Sample 1-4 | A | 95 | 1.450 |
| 1-17 | Invention | Sample 1-4 | B | 98 | 1.390 |
| 1-18 | Invention | Sample 1-4 | C | 100 | 1.365 |
| 1-19 | Comparative Example | Sample 1-5 | A | 95 | 1.450 |
| 1-20 | Comparative Example | Sample 1-5 | B | 98 | 1.390 |
| 1-21 | Comparative Example | Sample 1-5 | C | 100 | 1.365 |
| 1-22 | Comparative Example | Sample 1-6 | A | 95 | 1.450 |
| 1-23 | Comparative Example | Sample 1-6 | B | 98 | 1.390 |
| 1-24 | Comparative Example | Sample 1-6 | C | 100 | 1.365 |

TABLE 3

| | | | First Layer | | | | Second Layer | |
|---|---|---|---|---|---|---|---|---|
| Sample No. | Remarks | Substrate | Coating Solution | Average Film Thickness (μm) | Average Particle Diameter of Light-Transparent Particle (μm) | Average Film Thickness/Average Particle Diameter | Overcoat Coating Solution | Average Film Thickness (μm) |
| 1-26 | Invention | TD80U | E for Light-Scattering Layer | 10 | 5 | 2.00 | — | — |
| 1-27 | Invention | TD80U | F for Light-Scattering Layer | 10 | 5 | 2.00 | — | — |
| 1-28 | Invention | TD80U | G for Light-Scattering Layer | 10 | 5 | 2.00 | — | — |
| 1-29 | Invention | TD80U | E for Light-Scattering Layer | 10 | 5 | 2.00 | H for Hardcoat Layer | 8 |

TABLE 4

| Sample No. | Remarks | Substrate | Coating Solution for Low Refractive Index Layer | Average Film Thickness (nm) | Refractive Index |
|---|---|---|---|---|---|
| 1-30 | Invention | Sample 1-26 | E | 103 | 1.320 |
| 1-31 | Invention | Sample 1-27 | E | 103 | 1.320 |
| 1-32 | Invention | Sample 1-28 | E | 103 | 1.320 |
| 1-33 | Invention | Sample 1-29 | E | 103 | 1.320 |

TABLE 5

| Sample No. | Remarks | Specular Reflectance (%) | Integrated Reflectance (%) | Integrated − Specular (%) | a* | b* | Scattering Coefficient A | Reflection Coefficient B |
|---|---|---|---|---|---|---|---|---|
| 1-1 | Invention | 4.1 | 4.6 | 0.5 | 0.0 | −0.3 | 2.3 | 4.5 |
| 1-2 | Comparative Example | 1.4 | 4.6 | 3.2 | 0.1 | −0.5 | 4.2 | 1.5 |
| 1-3 | Invention | 4.3 | 4.6 | 0.3 | 0.0 | −0.6 | 2.0 | 5.0 |
| 1-4 | Invention | 1.9 | 4.6 | 2.7 | 0.1 | −0.2 | 3.0 | 2.9 |
| 1-5 | Comparative Example | 1.5 | 4.6 | 3.1 | 0.0 | −0.4 | 4.0 | 1.8 |
| 1-6 | Comparative Example | 4.5 | 4.6 | 0.1 | 0.0 | −0.1 | 1.1 | 7.0 |
| 1-7 | Invention | 2.1 | 2.7 | 0.6 | 1.9 | −1.5 | 2.2 | 4.0 |
| 1-8 | Invention | 1.1 | 1.5 | 0.4 | 2.0 | −2.0 | 2.1 | 3.6 |
| 1-9 | Invention | 0.8 | 1.2 | 0.4 | 2.9 | −1.3 | 2.2 | 3.1 |
| 1-10 | Comparative Example | 0.9 | 2.7 | 1.8 | 1.5 | −2.8 | 4.1 | 1.2 |
| 1-11 | Comparative Example | 0.5 | 1.5 | 1.0 | 2.2 | −2.6 | 4.0 | 0.7 |
| 1-12 | Comparative Example | 0.4 | 1.2 | 0.8 | 3.0 | −4.0 | 4.0 | 0.5 |
| 1-13 | Invention | 2.4 | 2.7 | 0.3 | 2.0 | −2.1 | 2.0 | 4.5 |
| 1-14 | Invention | 1.2 | 1.5 | 0.3 | 2.0 | −1.6 | 1.8 | 4.2 |
| 1-15 | Invention | 0.9 | 1.2 | 0.3 | 3.2 | −3.6 | 1.9 | 3.7 |
| 1-16 | Invention | 1.6 | 2.7 | 1.1 | 2.4 | −2.2 | 2.9 | 2.9 |
| 1-17 | Invention | 0.8 | 1.5 | 0.7 | 2.1 | −3.0 | 2.8 | 2.3 |
| 1-18 | Invention | 0.6 | 1.2 | 0.6 | 2.8 | −3.5 | 2.8 | 2.1 |
| 1-19 | Comparative Example | 1.0 | 2.7 | 1.7 | 1.5 | −3.5 | 3.9 | 1.5 |
| 1-20 | Comparative Example | 0.6 | 1.5 | 0.9 | 2.0 | −3.2 | 3.9 | 1.0 |
| 1-21 | Comparative Example | 0.5 | 1.2 | 0.7 | 3.2 | −4.2 | 3.8 | 0.9 |
| 1-22 | Comparative Example | 2.6 | 2.7 | 0.1 | 2.5 | −2.8 | 1.1 | 6.5 |
| 1-23 | Comparative Example | 1.4 | 1.5 | 0.1 | 2.5 | −3.2 | 1.1 | 5.9 |
| 1-24 | Comparative Example | 1.1 | 1.2 | 0.1 | 2.6 | −3.9 | 1.1 | 5.7 |
| 1-26 | Invention | 4.3 | 4.6 | 0.3 | 0.0 | −0.2 | 2.2 | 4.7 |
| 1-27 | Invention | 4.0 | 4.6 | 0.6 | 0.1 | −0.3 | 2.7 | 4.0 |
| 1-28 | Invention | 4.2 | 4.5 | 0.3 | 0.0 | −0.3 | 2.2 | 4.7 |
| 1-29 | Invention | 4.1 | 4.6 | 0.5 | 0.0 | −0.4 | 2.4 | 4.4 |
| 1-30 | Invention | 0.9 | 1.2 | 0.3 | 3.3 | −3.9 | 2.1 | 3.4 |
| 1-31 | Invention | 0.6 | 1.2 | 0.6 | 3.1 | −4.1 | 2.6 | 2.3 |
| 1-32 | Invention | 0.9 | 1.2 | 0.6 | 3.2 | −4.1 | 2.1 | 3.4 |
| 1-33 | Invention | 0.7 | 1.2 | 0.5 | 2.8 | −3.8 | 2.3 | 2.8 |

TABLE 6

| Sample No. | Remarks | Entire Haze (%) | Surface Haze (%) | Internal Haze (%) | Ra (μm) | Sm (μm) | Average Tilt Angle (°) | Aggregated State of Particles | Reflection | Light Brownish Looking |
|---|---|---|---|---|---|---|---|---|---|---|
| 1-1 | Invention | 30 | 2 | 28 | 0.09 | 90 | 1.0 | A | B | B |
| 1-2 | Comparative Example | 51 | 29 | 22 | 0.48 | 68 | 6.5 | C | A | D |
| 1-3 | Invention | 22 | 1 | 21 | 0.08 | 130 | 0.6 | A | C | A |
| 1-4 | Invention | 42 | 7 | 35 | 0.20 | 75 | 2.5 | A | B | C |
| 1-5 | Comparative Example | 54 | 25 | 29 | 0.43 | 65 | 6.0 | C | A | D |
| 1-6 | Comparative Example | 1 | 0 | 1 | 0.02 | — | 0.1 | — | D | A |
| 1-7 | Invention | 28 | 1 | 27 | 0.08 | 92 | 1.0 | A | B | B |
| 1-8 | Invention | 30 | 1 | 29 | 0.10 | 100 | 0.9 | A | B | B |
| 1-9 | Invention | 29 | 1 | 28 | 0.08 | 95 | 1.0 | A | B | B |
| 1-10 | Comparative Example | 47 | 25 | 22 | 0.45 | 68 | 6.5 | C | A | D |
| 1-11 | Comparative Example | 46 | 24 | 22 | 0.46 | 60 | 6.2 | C | A | D |
| 1-12 | Comparative Example | 47 | 26 | 21 | 0.47 | 65 | 6.0 | C | A | D |
| 1-13 | Invention | 22 | 1 | 21 | 0.08 | 130 | 0.6 | A | B | B |
| 1-14 | Invention | 23 | 1 | 22 | 0.09 | 150 | 0.6 | A | B | B |
| 1-15 | Invention | 21 | 1 | 20 | 0.07 | 140 | 0.5 | A | B | B |
| 1-16 | Invention | 38 | 5 | 33 | 0.18 | 75 | 2.1 | A | B | C |
| 1-17 | Invention | 38 | 4 | 34 | 0.23 | 80 | 2.2 | A | B | C |
| 1-18 | Invention | 38 | 4 | 34 | 0.20 | 77 | 2.5 | A | B | C |

TABLE 6-continued

| Sample No. | Remarks | Entire Haze (%) | Surface Haze (%) | Internal Haze (%) | Ra (μm) | Sm (μm) | Average Tilt Angle (°) | Aggregated State of Particles | Reflection | Light Brownish Looking |
|---|---|---|---|---|---|---|---|---|---|---|
| 1-19 | Comparative Example | 48 | 20 | 28 | 0.40 | 65 | 5.9 | C | A | D |
| 1-20 | Comparative Example | 48 | 21 | 27 | 0.45 | 68 | 5.8 | C | A | D |
| 1-21 | Comparative Example | 47 | 20 | 27 | 0.41 | 60 | 6.0 | C | A | D |
| 1-22 | Comparative Example | 1 | 0 | 1 | 0.02 | — | 0.1 | — | D | A |
| 1-23 | Comparative Example | 1 | 0 | 1 | 0.02 | — | 0.1 | — | D | A |
| 1-24 | Comparative Example | 1 | 0 | 1 | 0.01 | — | 0.1 | — | D | A |
| 1-26 | Invention | 22 | 1 | 21 | 0.09 | 49 | 1.1 | B | C | A |
| 1-27 | Invention | 34 | 7 | 27 | 0.21 | 63 | 2.4 | A | A | C |
| 1-28 | Invention | 14 | 1 | 13 | 0.09 | 51 | 1.1 | B | C | A |
| 1-29 | Invention | 26 | 3 | 23 | 0.18 | 101 | 1.7 | B | B | B |
| 1-30 | Invention | 22 | 1 | 21 | 0.08 | 56 | 1.1 | B | C | A |
| 1-31 | Invention | 33 | 6 | 27 | 0.17 | 68 | 2.4 | A | A | C |
| 1-32 | Invention | 14 | 1 | 13 | 0.07 | 59 | 1.1 | B | C | A |
| 1-33 | Invention | 25 | 2 | 23 | 0.18 | 120 | 1.7 | B | B | B |

Also, a light-scattering film was produced in the same manner as in Example 1-9 except that Coating Solution C for Low Refractive Index Layer was replaced by Coating Solution D for Low Refractive Index Layer, the drying after coating was changed to 120° C.×90 seconds, and the irradiation dose of ultraviolet ray was changed to 900 mJ/cm$^2$, as a result, the scratch resistance could be enhanced while keeping the optical performance at the same level.

As seen from the results above, the light-scattering film of the present invention exhibited excellent performance that the reflection was reduced and the light brownish looking was not generated.

Example 2

(Production of Polarizing Plate)

A 80 μm-thick triacetyl cellulose film (TAC-TD80U, produced by Fuji Photo Film Co., Ltd., hereinafter referred to as "TAC film") which had been dipped in an aqueous 1.5 mol/liter NaOH solution at 55° C. for 2 minutes, neutralized and then washed with water, and the light-scattering film (Samples 1-1 to 1-24 and 1-26 to 1-33, already saponified) produced in Example 1 were bonded for protection to both surfaces of a polarizer produced by adsorbing iodine to polyvinyl alcohol and stretching the film, where by a polarizing plate was produced. Incidentally, the transparent support surface of the light-scattering film produced in Example 1 was bonded to the polarizer. These polarizing plates were designated as Samples 2-1 to 2-24 and 2-26 to 2-33, respectively.

Also, a polarizing plate was produced by using the saponified triacetyl cellulose film described above for the protective films on both surfaces and designated as Sample 2-25.

Example 3

(Evaluation of Polarizing Plate)

A part of the polarizing plate on the viewing side of a 32-inch liquid crystal television, TH32LX500, manufactured by Panasonic (IPS system, dark-room contrast ratio: 750) was removed and the polarizing plate produced in Example 2 (Samples 2-1 to 2-33) was instead stacked thereto. These were designated as Samples 3-1 to 3-33, respectively. The obtained displays were evaluated on the following items. The results are shown in Tables 7 and 8.

(1) Reflection

The obtained liquid crystal television was placed in a bright room and a human face was reflected on the surface of the light-scattering film of the present invention from the 5-m distant position and the level of reflection was evaluated according to the following criteria:

A: The outline is not recognized at all.

B: The outline is scarcely recognized.

C: The outline is recognized but not annoying.

D: The outline is annoying.

(2) Bright-Room Contrast (Condition A)

The liquid crystal television was placed in a bright-room environment giving an illuminance of 250 1x on the liquid crystal television surface and in the state that a black thing of 0.0125 cd was present at the regular reflection position, the brightness at black display (black brightness) and the brightness at white display (white brightness) were measured from the position shifted at an angle of 5° from the perpendicular direction of the display. The bright-room contrast was calculated as a ratio of the white brightness to the black brightness. In the measurement of brightness, a radiation brightness meter (BM-5, manufactured by TOPCON Corp.) was used.

(3) Bright-Room Contrast (Condition B, Accentuated Reference Data)

The black brightness and the white brightness were measured and the bright-room contrast was calculated by the same method as in (Condition A) except that a white thing of 46.25 cd was placed at the regular reflection position of the radiation brightness meter to create an accentuated condition of giving very bad bright-room contrast.

(4) Glaring

In a full-green display state of an LCD panel having a definition and an image size shown in the Table, to what extent the partial enlargement/shrinkage of each of B, G and R picture elements is non-uniformly viewed (glaring) was evaluated with an eye according to the following criteria.

A: Glaring is not annoying.

B: Glaring is slightly annoying.

C: Glaring is annoying.

TABLE 7

| Sample No. | Remarks | Polarizing Plate | Reflection | Bright-Room Contrast (Condition A) | Bright-Room Contrast (Condition B), reference data | Glaring |
|---|---|---|---|---|---|---|
| 3-1 | Invention | Sample 2-1 | B | 235 | 80 | A |
| 3-2 | Comparative Example | Sample 2-2 | A | 122 | 80 | A |
| 3-3 | Invention | Sample 2-3 | C | 244 | 85 | A |
| 3-4 | Invention | Sample 2-4 | B | 205 | 82 | A |
| 3-5 | Comparative Example | Sample 2-5 | A | 118 | 78 | A |
| 3-6 | Comparative Example | Sample 2-6 | D | 268 | 82 | A |
| 3-7 | Invention | Sample 2-7 | B | 225 | 81 | A |
| 3-8 | Invention | Sample 2-8 | B | 240 | 131 | A |
| 3-9 | Invention | Sample 2-9 | B | 243 | 148 | A |
| 3-10 | Comparative Example | Sample 2-10 | A | 153 | 101 | A |
| 3-11 | Comparative Example | Sample 2-11 | A | 195 | 132 | A |
| 3-12 | Comparative Example | Sample 2-12 | A | 199 | 140 | A |
| 3-13 | Invention | Sample 2-13 | B | 247 | 100 | A |
| 3-14 | Invention | Sample 2-14 | B | 246 | 132 | A |
| 3-15 | Invention | Sample 2-15 | B | 242 | 148 | A |
| 3-16 | Invention | Sample 2-16 | B | 193 | 97 | A |
| 3-17 | Invention | Sample 2-17 | B | 212 | 128 | A |
| 3-18 | Invention | Sample 2-18 | B | 223 | 140 | A |
| 3-19 | Comparative Example | Sample 2-19 | A | 160 | 95 | A |
| 3-20 | Comparative Example | Sample 2-20 | A | 196 | 126 | A |
| 3-21 | Comparative Example | Sample 2-21 | A | 199 | 143 | A |
| 3-22 | Comparative Example | Sample 2-22 | D | 268 | 96 | A |
| 3-23 | Comparative Example | Sample 2-23 | D | 263 | 127 | A |
| 3-24 | Comparative Example | Sample 2-24 | D | 265 | 144 | A |
| 3-25 | Comparative Example | Sample 2-25 | D | 275 | 85 | A |

TABLE 8

| Sample No. | Remarks | Polarizing Plate | Reflection | Bright-Room Contrast (Condition A) | Bright-Room Contrast (Condition B), reference data | Glaring |
|---|---|---|---|---|---|---|
| 3-26 | Invention | Sample 2-26 | C | 234 | 80 | A |
| 3-27 | Invention | Sample 2-27 | A | 206 | 79 | A |
| 3-28 | Invention | Sample 2-28 | C | 235 | 81 | A |
| 3-29 | Invention | Sample 2-29 | B | 232 | 80 | A |
| 3-30 | Invention | Sample 2-30 | C | 244 | 151 | A |
| 3-31 | Invention | Sample 2-31 | A | 213 | 139 | A |
| 3-32 | Invention | Sample 2-32 | C | 248 | 127 | A |
| 3-33 | Invention | Sample 2-33 | B | 240 | 140 | A |

The results shown in Table 7 reveal the followings.

The light-scattering film of the present invention is free of reflection problem, exhibits an excellent contrast value of 200 or more in the bright-room contrast (Condition A) which is the practical condition, and can satisfy both reduction of reflection and bright-room contrast at a high level. Also, improvement of glaring can be achieved at the same time. Furthermore, as seen from the results of Condition B which is an accentuated condition, among samples having a bright-room contrast (Condition A) of 200 or more, Examples 3-8, 3-9, 3-14, 3-15, 3-17, 3-18 and 3-30 to 3-33 are excellent in the bright-room contrast, Examples 3-9, 3-15, 3-18, 3-30 and 3-33 are more excellent, and Examples 3-9, 3-15 and 3-33 are still more excellent.

Example 4

Samples 4-7 to 4-9 and 4-13 to 4-15 were produced by the same method as Samples 1-7 to 1-9 and 1-13 to 1-15 except that PET with an easy adhesion layer (COSMOSHINE A4100, produced by Toyobo Co., Ltd., film thickness: 188 μm) was used as the transparent support. The surface film of a 42-inch plasma display with no front panel (PDU-42H6A1 in the direct color filter system, manufactured by Pioneer Corp.) was removed and each of Samples 4-7 to 4-9 and 4-13 to 4-15 was instead stacked thereto using an adhesive by arranging the low refractive index layer to come outside, as a result, good properties in terms of reflection, bright-room contrast and tinting were exhibited.

Example 5

Circularly polarizing plates (Samples 5-7 to 5-9 and 5-13 to 5-15) were produced by laminating a λ/4 plate using an adhesive to the surface on the side opposite the low refractive index layer of Samples 2-7 to 2-9 and 2-13 to 2-15. Each of Samples 5-7 to 5-9 and 5-13 to 5-15 was stacked using an adhesive to the surface of an organic EL display by arranging the low refractive index layer to come outside, as a result, good properties in terms of reflection, bright-room contrast and tinting were exhibited.

Example 6

Each of Samples 5-7 to 5-9 and 5-13 to 5-15 was used as the polarizing plate on the surface of a reflective or transflective liquid crystal display by arranging the low refractive index layer to come outside, as a result, good properties in terms of reflection, bright-room contrast and tinting were exhibited.

Example 7

Each of Samples 5-7 to 5-9 and 5-13 to 5-15 was stacked using an adhesive to the surface glass of the plasma display used in Example 4, as a result, the white brightness was reduced, but the contrast was remarkably enhanced and good properties in terms of reflection, bright-room contrast and tinting were exhibited.

It will be apparent to those skilled in the art that various modifications and variations can be made to the described embodiments of the invention without departing from the spirit or scope of the invention. Thus, it is intended that the invention cover all modifications and variations of this invention consistent with the scope of the appended claims and their equivalents.

The present application claims foreign priority based on Japanese Patent Application No. JP2006-089032 filed Mar. 28 of 2006, the contents of which are incorporated herein by reference.

What is claimed is:

1. A light-scattering film comprising: a transparent support; and a light-scattering layer, wherein when substantially parallel light is incident on a surface of the light-scattering film at an incident angle of 5°, Reflection coefficient B represented by formula 2 is from 2.0 to 5.0:

$$\text{Reflection coefficient } B = 2.2 \times \log 10(Rs) - 7.5 \times \log 10(A) + 5.9 \quad \text{Formula 2}$$

wherein Rs is a 5° specular reflectance, and A is Scattering coefficient A represented by formula 1:

$$\text{Scattering coefficient } A = 1/(10 \times |dR\text{rel}(\theta)/d\theta|\max) \quad \text{Formula 1}$$

wherein $R(\theta)$ is a reflectance at an angle $\theta$ with respect to a normal line to the light-scattering film and in a plane defined the normal line and an incident direction of the substantially parallel incident light, and $R\text{rel}(\theta)$ is a value obtained by normalizing $R(\theta)$ by the reflectance of regular reflection.

2. The light-scattering film of claim 1, wherein the Reflection coefficient B is from 3.5 to 4.5.

3. The light-scattering film of claim 1, wherein the Scattering coefficient A is from 1.0 to 3.0.

4. The light-scattering film of claim 1, wherein the 5° specular reflectance Rs is from 0.1 to 2.0%.

5. The light-scattering film of claim 1, having an integrated reflectance of 0.2 to 2.0% with respect to the substantially parallel light incident on the light scattering film at the incident angle of 5°.

6. The light-scattering film of claim 5, wherein a difference between the integrated reflectance and the 5° specular reflectance Rs is from 0.1 to 1.0%.

7. The light-scattering film of claim 1, wherein a* and b* values in CIE1976 L*a*b* color space of regularly reflected light for the substantially parallel light incident on the light scattering film at the incident angle of 5°, the substantially parallel light being from a CIE standard illuminant D65 and having a wavelength of 380 to 780 nm, are $-7 \leq a^* \leq 7$ and $-10 \leq b^* \leq 10$, respectively.

8. The light-scattering film of claim 1, wherein the light-scattering layer comprises light-transmitting fine particles, and a ratio of an average film thickness of the light-scattering layer to an average particle diameter of the light-transmitting fine particles is from 1.5 to 2.5.

9. The light-scattering film of claim 1, wherein the light-scattering layer comprises light-transmitting fine particles and a plurality of aggregations comprising the light-transmitting fine particles, the aggregations each having a three-dimensional steric structure and a surface irregularity shape.

10. The light-scattering film of claim 1, wherein the light-scattering layer comprises at least two layers, and a layer other than a top layer of the at least two layers comprises light-transmitting fine particles.

11. The light-scattering film of claim 1, having a centerline average roughness Ra of 0.05 to 0.15 μm.

12. The light-scattering film of claim 1, having an average pea-to-trough distance Sm of 50 to 150 μm.

13. The light-scattering film of claim 1, having an average tilt angle of surface irregularities of 0.2 to 2.0°.

14. The light-scattering film of claim 1, further comprising a low refractive index layer having a refractive index lower than that of the transparent support, the light-scattering film having the transparent support, the light-scattering layer and the low refractive index layer in this order.

15. The light-scattering film of claim 14, wherein the refractive index of the low refractive index layer is from 1.20 to 1.40.

16. The light-scattering film of claim 14, wherein the low refractive index layer is formed by curing a curable composition comprising a fluorine-containing compound and inorganic fine particles having a refractive index of 1.40 or less, and the low refractive index layer has the inorganic fine particles in an amount of 30 to 55 mass % based on the total solid content concentration of the low refractive index layer.

17. The light-scattering film of claim 14, wherein the 5° specular reflectance Rs is from 0.1 to 1.5%, an integrated reflectance of the light-scattering film with respect to the substantially parallel light incident on the light scattering film at the incident angle of 5° is from 0.2 to 2.0%, a difference between the integrated reflectance and the 5° specular reflectance Rs is from 0.25 to 1.0%, and the refractive index of the low refractive index layer is from 1.20 to 1.40.

18. The light-scattering film of claim 17, having a centerline average roughness Ra of 0.05 to 0.15 μm, an average peak-to-trough distance Sm of 50 to 150 μm, and an average tilt angle of surface irregularities of 0.2 to 2.0°.

19. The light-scattering film of claim 1, comprising: the transparent support; a light-scattering layer; and a low refractive index layer having a refractive index lower than that of the transparent support, in this order, wherein the light-scattering layer comprises light-transmitting fine particles, and a ratio of an average film thickness of the light-scattering layer to an average particle diameter of the light-transmitting fine particles is from 1.5 to 2.5.

20. A polarizing plate comprising: a polarizer; and a pair of protective films, the polarizer being between the pair of protective films, wherein at least one of the pair of protective films is a light-scattering film of claim 1.

21. An image display comprising a light-scattering film of claim 1.

22. A light-scattering film comprising: a transparent support; and a light-scattering layer, wherein when substantially parallel light is incident on a surface of the light-scattering film at an incident angle of 5°, Reflection coefficient B represented by formula 2 is from 2.0 to 5.0:

$$\text{Reflection coefficient } B = 2.2 \times \log 10(Rs) - 7.5 \times \log 10(A) + 5.9 \quad \text{Formula 2}$$

wherein Rs is a 5° specular reflectance, and A is Scattering coefficient A represented by formula 1:

$$\text{Scattering coefficient } A = 1/(10 \times |dR\text{rel}(\theta)/d\theta|\max) \quad \text{Formula 1}$$

wherein $R(\theta)$ is a reflectance at an angle $\theta$ with respect to a normal line to the light-scattering film and in a plane defined the normal line and an incident direction of the substantially parallel light, and $R\text{rel}(\theta)$ is a value obtained by normalizing $R(\theta)$ by the reflectance of regular reflection, and wherein the 5° specular reflectance Rs is from 0.1 to 2.0%, an integrated reflectance with respect to the substantially parallel light is from 0.2 to 2.0%, and a difference between the integrated reflectance and the 5° specular reflectance Rs is from 0.1 to 1.0%.

* * * * *